(12) United States Patent
Zhou et al.

(10) Patent No.: US 12,414,044 B2
(45) Date of Patent: Sep. 9, 2025

(54) DYNAMIC SIGNALING FOR ENERGY SAVING IN WIRELESS COMMUNICATIONS

(71) Applicant: Comcast Cable Communications, LLC, Philadelphia, PA (US)

(72) Inventors: Hua Zhou, Vienna, VA (US); Hyoungsuk Jeon, Centreville, VA (US); Esmael Hejazi Dinan, McLean, VA (US); Ali Cagatay Cirik, Chantilly, VA (US); Nazanin Rastegardoost, McLean, VA (US); Mohammad Ghadir Khoshkholgh Dashtaki, Burnaby (CA); Hyukjin Chae, Fairfax, VA (US); Bing Hui, Herndon, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 438 days.

(21) Appl. No.: 18/145,415

(22) Filed: Dec. 22, 2022

(65) Prior Publication Data

US 2023/0199659 A1  Jun. 22, 2023

Related U.S. Application Data

(60) Provisional application No. 63/292,791, filed on Dec. 22, 2021.

(51) Int. Cl.
*H04W 52/02* (2009.01)
*H04W 56/00* (2009.01)
*H04W 72/23* (2023.01)

(52) U.S. Cl.
CPC ..... *H04W 52/0235* (2013.01); *H04W 56/001* (2013.01); *H04W 72/23* (2023.01)

(58) Field of Classification Search
CPC ........... H04W 52/0235; H04W 56/001; H04W 72/23; H04L 5/0064; H04L 5/0048;
(Continued)

(56) References Cited

U.S. PATENT DOCUMENTS

2011/0170466 A1  7/2011  Kwun
2014/0302855 A1  10/2014  Nory et al.
(Continued)

FOREIGN PATENT DOCUMENTS

WO   2012092066 A1   7/2012

OTHER PUBLICATIONS

Panu Lahdekorpi et al., "Energy efficiency of 5G mobile networks with base station sleep modes", IEEE Conference on Standards for Communications and Networking, Sep. 18, 2017.
(Continued)

*Primary Examiner* — Kyaw Z Soe
(74) *Attorney, Agent, or Firm* — Banner & Witcoff, Ltd.

(57) ABSTRACT

Downlink signals, such as synchronization signals and/or reference signals, may be used for facilitating communications between communication devices. The downlink signals may be dynamically reconfigured, for reduced resource consumption, using control channel signaling with reduced resource overhead. Reconfiguration of downlink signals may be based on determined traffic volume in the communication network to minimize any impact of the reconfiguration on network performance.

20 Claims, 53 Drawing Sheets

(58) Field of Classification Search
CPC ............... H04L 5/0053; H04L 5/0094; H04L 5/0078; Y02D 30/70
See application file for complete search history.

(56) References Cited

U.S. PATENT DOCUMENTS

| | | | |
|---|---|---|---|
| 2015/0009877 | A1 | 1/2015 | Chiang et al. |
| 2016/0174150 | A1 | 6/2016 | Comsa et al. |
| 2018/0279343 | A1 | 9/2018 | Zhou et al. |
| 2020/0100179 | A1 | 3/2020 | Zhou et al. |
| 2020/0119800 | A1 | 4/2020 | Rune et al. |
| 2021/0258900 | A1 | 8/2021 | Park et al. |
| 2021/0336687 | A1 | 10/2021 | Pezeshki et al. |
| 2023/0344592 | A1* | 10/2023 | Zhou ................ H04W 52/0235 |
| 2024/0276406 | A1* | 8/2024 | Babaei ................ H04L 5/0053 |
| 2024/0334538 | A1* | 10/2024 | Zhou ................ H04W 52/0216 |

OTHER PUBLICATIONS

Yu-Ngok Ruyue Li et al., "Power Saving Techniques for 5G and Beyond", IEEE Access, vol. 8, Jun. 9, 2020.
May 15, 2003—European Search Report—EP App. No. 22216068.1.
3GPP TR 36.887 V12.0.0 (Jun. 2014), 3rd Generation Partnership Project; Technical Specification Group Radio Access Network; Evolved Universal Terrestrial Radio Access Network (E-UTRAN); Study on energy saving enhancement for E-UTRAN (Release 12).
3GPP TR 36.927 V16.0.0 (Jul. 2020), 3rd Generation Partnership Project; Technical Specification Group Radio Access Network; Evolved Universal Terrestrial Radio Access (E-UTRA); Potential solutions for energy saving for E-UTRAN (Release 16).
3GPP TS 38.212 V16.4.0 (Dec. 2020) 3rd Generation Partnership Project; Technical Specification Group Radio Access Network; NR; Multiplexing and channel coding (Release 16).
3GPP TS 38.213 V16.4.0 (Dec. 2020) 3rd Generation Partnership Project; Technical Specification Group Radio Access Network; NR; Physical layer procedures for control (Release 16).
3GPP TS 38.214 V16.4.0 (Dec. 2020) 3rd Generation Partnership Project; Technical Specification Group Radio Access Network; NR; Physical layer procedures for data (Release 16).
3GPP TS 38.300 V16.3.0 (Sep. 2020) 3rd Generation Partnership Project; Technical Specification Group Radio Access Network; NR; NR and NG-RAN Overall Description; Stage 2 (Release 16).
3GPP TS 38.321 V16.3.0 (Dec. 2020) 3rd Generation Partnership Project; Technical Specification Group Radio Access Network; NR; Medium Access Control (MAC) protocol specification (Release 16).
3GPP TS 38.331 V16.3.1 (Jan. 2021) 3rd Generation Partnership Project; Technical Specification Group Radio Access Network; NR; Radio Resorce Control (RRC) protocol specification (Release 16).
R3-212523 3GPP TSG-RAN WG3 Meeting #112-e, E-meeting, May 17-27, 2021, Source: Huawei, Title: Further discussions on detailed procedure and potential specification impacts of energy saving.
RP-211663 3GPP TSG RAN Meeting #93-e, Electronic Meeting, Sep. 13-17, 2021, Source: Huawei, HiSilicon, Title: Moderator's summary for discussion [RAN93e-R18Prep-13] Network energy savings.
RP-212669 3GPP TSG RAN Meeting #94-e, Electronic Meeting, Dec. 6-17, 2021, Source: Huawei, Title: Moderator's summary for [RAN94e-R18Prep-09] Network energy savings.
RP-212709 3GPP TSG RAN Meeting #94e, Electronic Meeting, Dec. 6-17, 2021, Source: Moderator (Huawei), Title: New study on network energy savings for 5G.
RWS-210064 3GPP TSG RAN Rel-18 workshop, Electronic Meeting, Jun. 28-Jul. 2, 2021, Source: Spreadtrum Communications, Title: UE power saving enhancements for R18.
RWS-210106 3GPP TSG RAN Rel-18 Workshop, Jun. 28-Jul. 2, 2021, Source: MediaTek Inc., Title: [x-area] System Energy Enhancements.
RWS-210110 3GPP TSG RAN Rel-18 Workshop, Electronic Meeting, Jun. 28-Jul. 2, 2021, Source: MediaTek Inc., Title: Draft WID: System Energy Efficiency Enhancements.
RWS-210118 RAN Rel-18 Workshop, Jun. 28-Jul. 2, 2021, Source: Nokia, Nokia Shanghai Bell, Title: Network Energy Efficiency in Rel-18.
RWS-210152 3GPP TSG RAN Rel-18 workshop, Electronic Meeting, Jun. 28-Jul. 2, 2021, Source: China Telecom, Title: Draft SID on NR network energy saving enhancement.
RWS-210153 3GPP TSG RAN Rel-18 workshop, Electronic Meeting, Jun. 28-Jul. 2, 2021, Source: China Telecom, Title: NR network energy saving enhancement for Rel-18.
"RWS-210168 3GPP TSG RAN Rel-18 workshop, Electronic Meeting, Jun. 28-Jul. 2, 2021, Source: vivo, Spreadtrum communications, Guangdong Genius, Title: Motivation for new study item on ultra-low power wake up signal in Rel-18".
RWS 210281 3GPP Rel-18 Workshop: 5G Advanced, Electronic Meeting, Jun. 28-Jul. 2, 2021, Source: LGU, Title: LG Uplus views on Rel-18 Non eMBB area.
RWS-210310 3GPP TSG RAN Rel-18 workshop, Electronic Meeting Jun. 28-Jul. 2, 2021, Source: Ericsson, Title: Motivation for Network Energy Saving in Rel-18.
RWS-210311 3GPP TSG RAN Rel-18 workshop, Electronic Meeting, Jun. 28-Jul. 2, 2021, Source: Ericsson, Title: New SID on NR Network Energy Saving.
RWS-210312 3GPP TSG RAN Rel-18 workshop, Electronic Meeting, Jun. 28-Jul. 2, 2021, Source: Ericsson, Title: Views on NR UE Power Saving in Rel-18.
RWS-210358 3GPP TSG RAN Rel-18 workshop, Electronic Meeting, Jun. 28-Jul. 2, 2021, Source: CMCC, Title: Network energy saving.
RWS-210363 3GPP TSG RAN Rel-18 workshop, Electronic Meeting, Jun. 28-Jul. 2, 2021, Title: KT's View on cross functionalities for Release-18.
RWS-210398 3GPP TSG RAN Rel-18 workshop, Electronic Meeting, Jun. 28-Jul. 2, 2021, Source: Lenovo, Motorola Mobility, Title: Network Power Savings in NR.
RWS-210415 3GPP TSG RAN Rel-18 workshop, Electronic Meeting, Jun. 28-Jul. 2, 2021, Source: CATT, Title: On energy saving in Rel-18.
RWS-210438 3GPP TSG RAN Meeting #92-e, Electronic Meeting, Jun. 28-Jul. 2, 2021, Source: Huawei, HiSilicon, Title: Nr FR2 enhancements.
RWS-210447 3GPP TSG RAN Rel-18 workshop, Electronic Meeting, Jun. 28-Jul. 2, 2021, Source: Huawei, HiSilicon, Title: Network energy saving and green operation for NR.
RWS-210462 3GPP TSG RAN Rel-18 workshop, Electronic Meeting, Jun. 28-Jul. 2, 2021, Source: Vodafone, Title: Energy Efficiency Improvements.
RWS-210486 3GPP TSG RAN Rel-18 workshop, Electronic Meeting, Jun. 28-Jul. 2, 2021, Source: ZTE, Sanechips, Title: Discussion on network power saving for 5G Advanced.

* cited by examiner

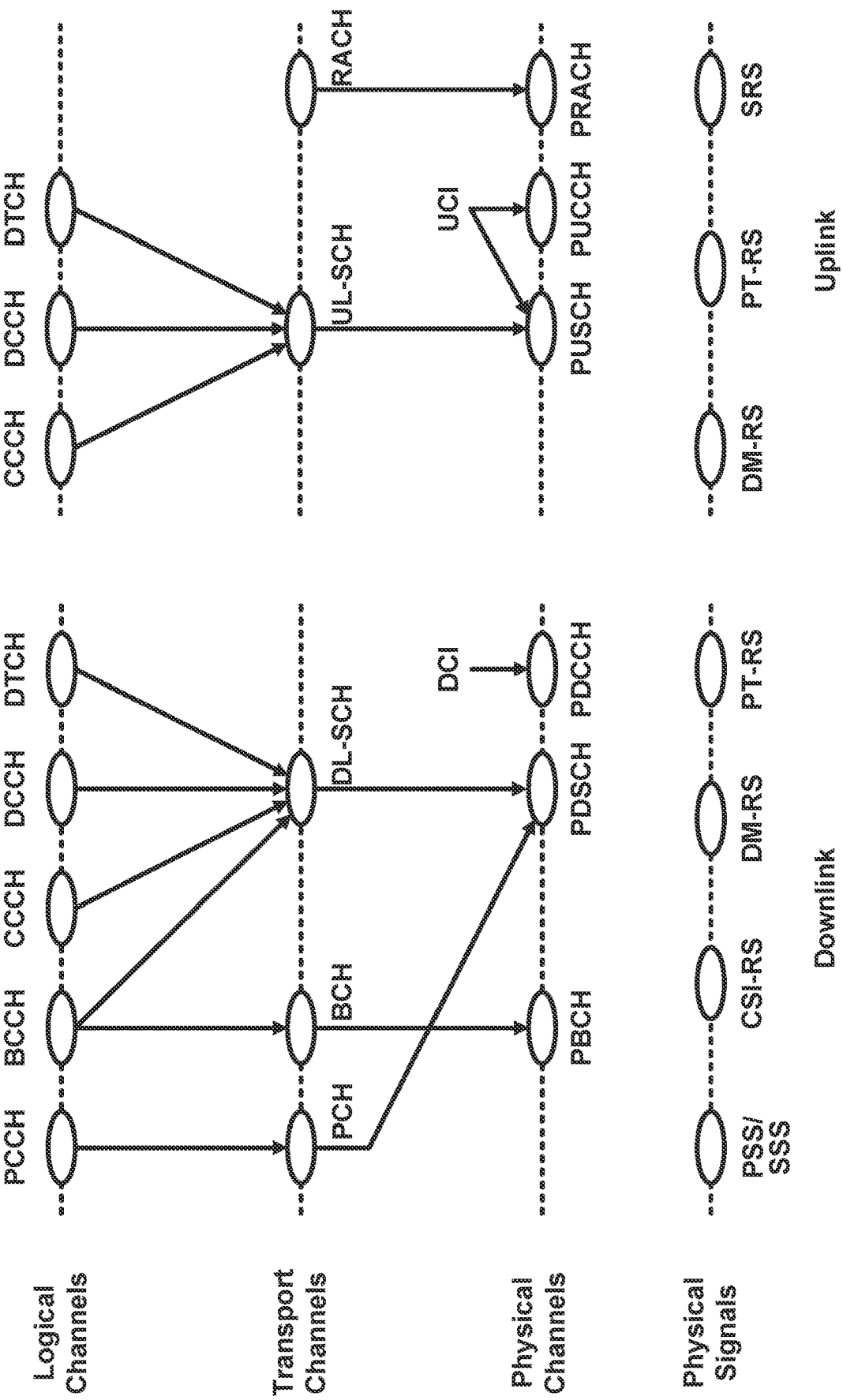

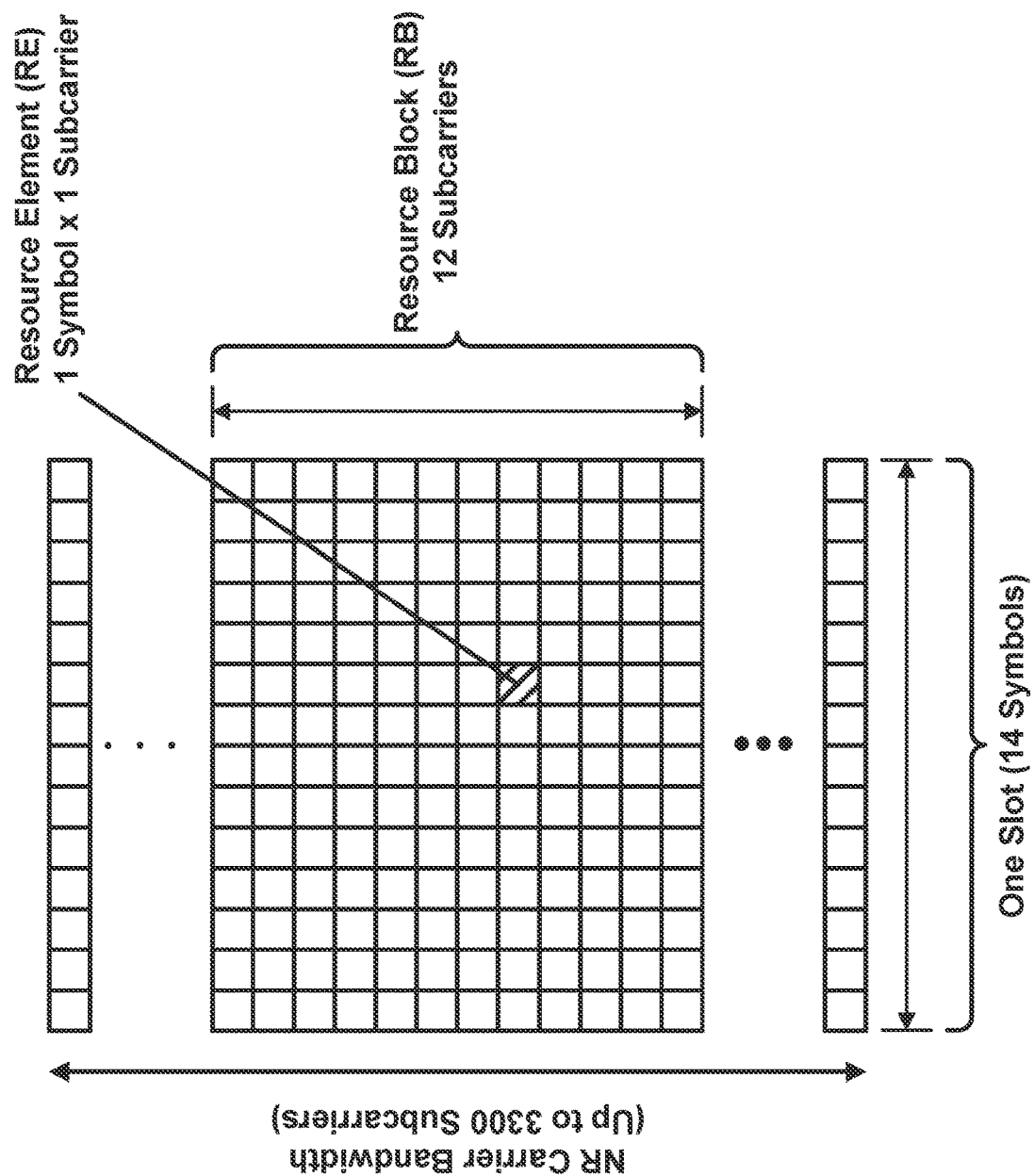
FIG. 8
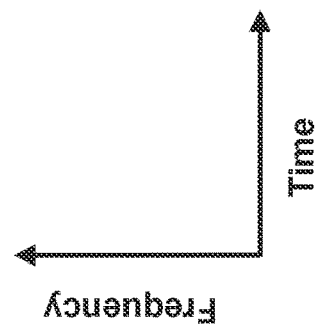

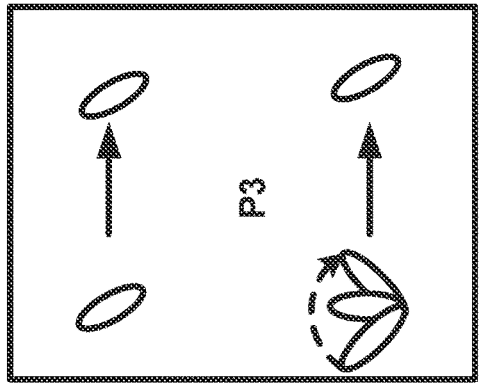
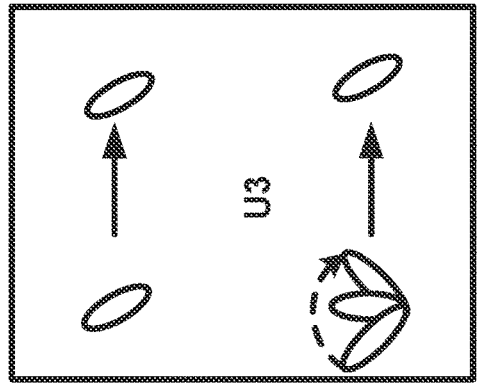
FIG. 12A
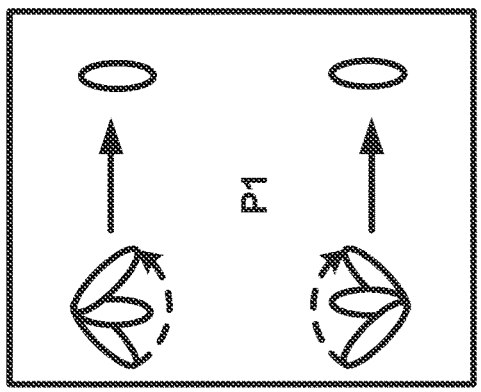
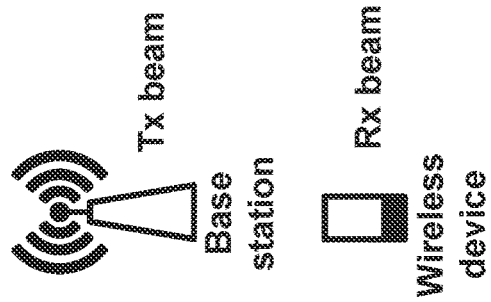
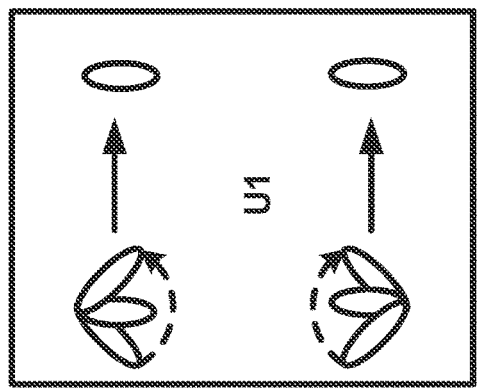
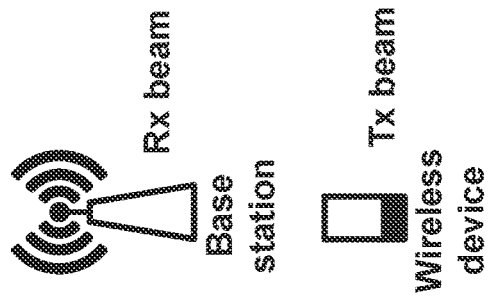
FIG. 12B

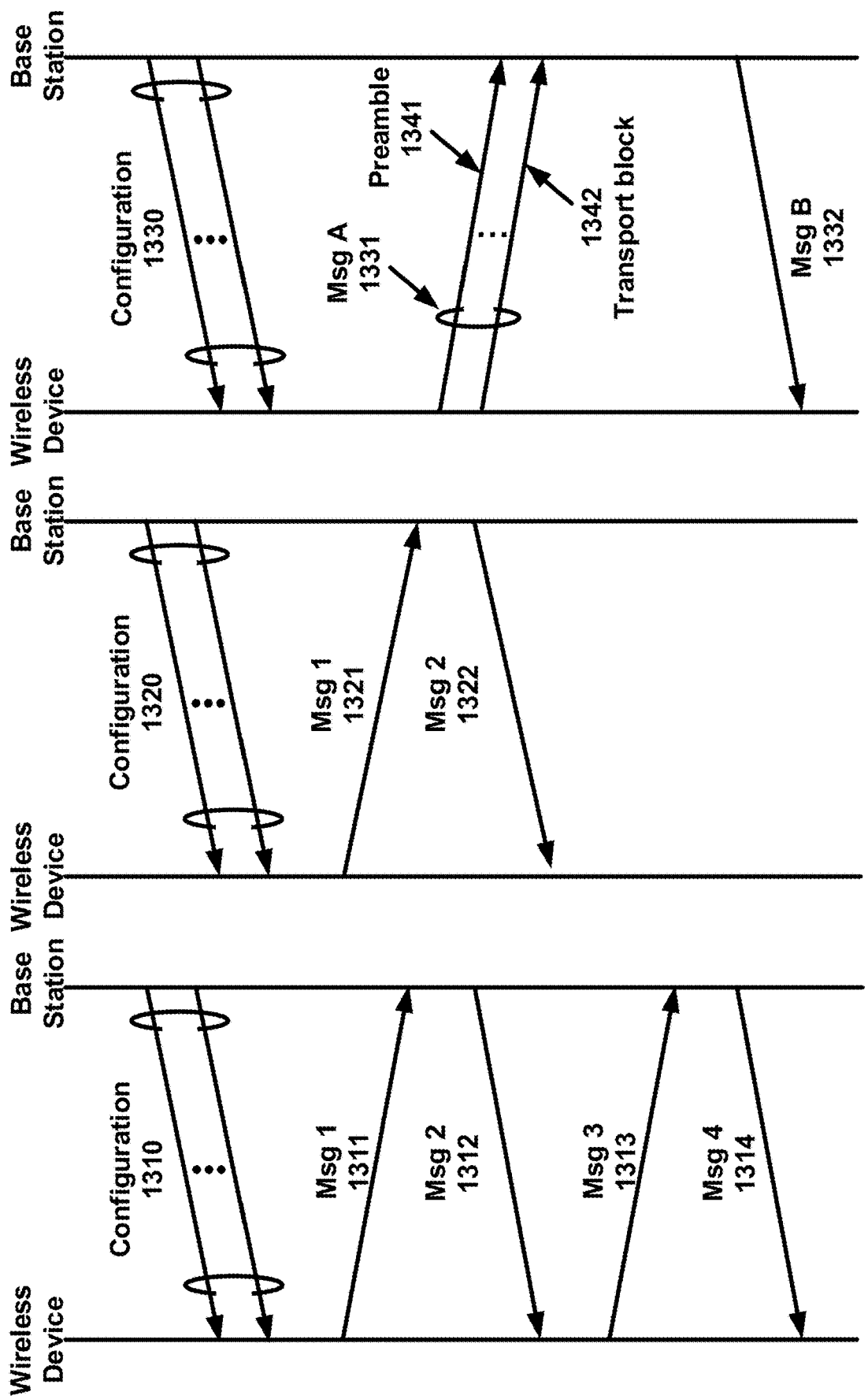

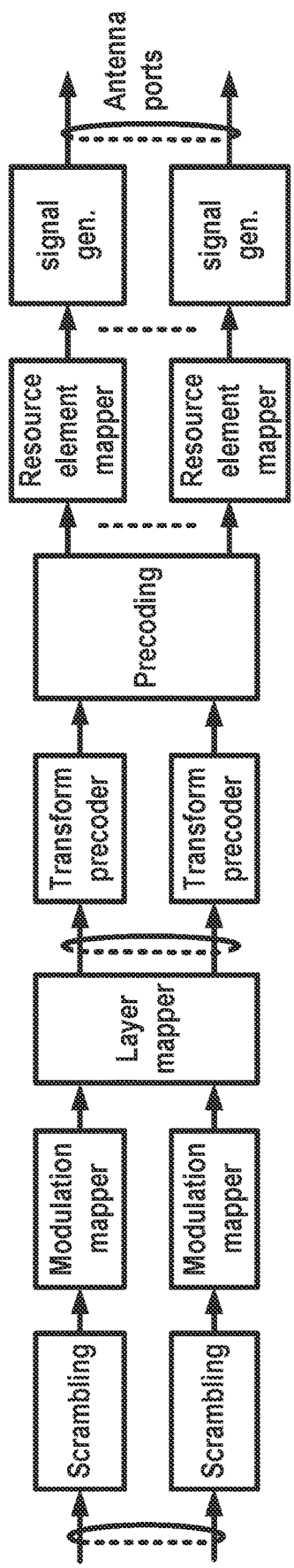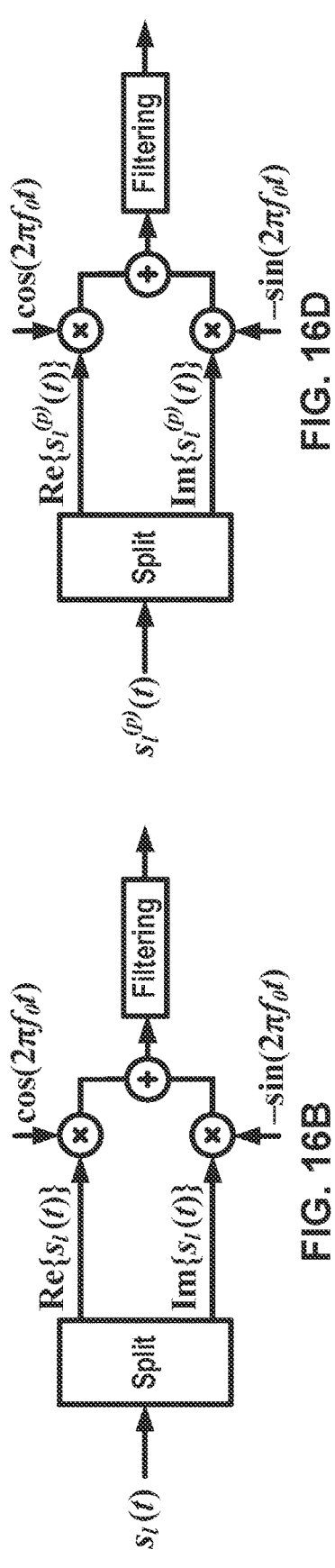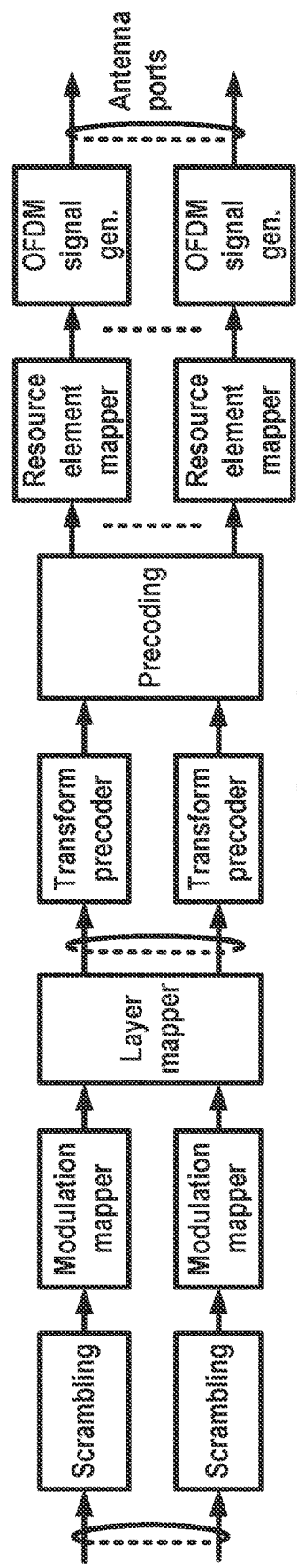

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 23

```
MIB ::=                       SEQUENCE {
    systemFrameNumber            BIT STRING (SIZE (6)),
    subCarrierSpacingCommon      ENUMERATED {scs15or60, scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed, notAllowed},
    spare                        BIT STRING (SIZE (1))}

PDCCH-ConfigSIB1 ::=          SEQUENCE {
    controlResourceSetZero       ControlResourceSetZero,
    searchSpaceZero              SearchSpaceZero}
```

FIG. 24A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| ... | ... | ... | ... | ... |

FIG. 24C

```
SIB1 ::=        SEQUENCE {
    cellSelectionInfo           SEQUENCE {
        q-RxLevMin              Q-RxLevMin,
        q-RxLevMinOffset        INTEGER (1..8) ...}
    cellAccessRelatedInfo       CellAccessRelatedInfo,
    connEstFailureControl       ConnEstFailureControl
    si-SchedulingInfo           SI-SchedulingInfo
    servingCellConfigCommon         ServingCellConfigCommonSIB
    ims-EmergencySupport        ENUMERATED {true}
    eCallOverIMS-Support        ENUMERATED {true}
    ue-TimersAndConstants       UE-TimersAndConstants
    uac-BarringInfo             SEQUENCE { ...}
    useFullResumeID             ENUMERATED {true}
    lateNonCriticalExtension    OCTET STRING
    nonCriticalExtension        SIB1-v16xy-IEs }

ServingCellConfigCommonSIB ::=  SEQUENCE {
    downlinkConfigCommon        DownlinkConfigCommonSIB,
    uplinkConfigCommon          UplinkConfigCommonSIB
    supplementaryUplink         UplinkConfigCommonSIB
    n-TimingAdvanceOffset       ENUMERATED { n0, n25600, n39936 }
    ssb-PositionsInBurst        SEQUENCE {
        inOneGroup              BIT STRING (SIZE (8)),
        groupPresence           BIT STRING (SIZE (8)) },
    ssb-PeriodicityServingCell  ENUMERATED {ms5, ms10, ms20, ms40, ms80, ms160},
    tdd-UL-DL-ConfigurationCommon   TDD-UL-DL-ConfigCommon
    ss-PBCH-BlockPower          INTEGER (-60..50),
    ...,}

DownlinkConfigCommonSIB ::=     SEQUENCE {
    frequencyInfoDL             FrequencyInfoDL-SIB,
    initialDownlinkBWP          BWP-DownlinkCommon,
    bcch-Config                 BCCH-Config,
    pcch-Config                 PCCH-Config, ...}

PCCH-Config ::=         SEQUENCE {
    defaultPagingCycle          PagingCycle,
    nAndPagingFrameOffset       CHOICE {
        oneT                    NULL,
        halfT                   INTEGER (0..1), ...},
    ns                          ENUMERATED {four, two, one},
    firstPDCCH-MonitoringOccasionOfPO   CHOICE {
        sCS15KHZoneT    SEQUENCE (SIZE (1..maxPO-perPF)) OF INTEGER (0..139),...}
    ...,
    [[ nrofPDCCH-MonitoringOccasionPerSSB-InPO-r16  INTEGER (2..4) ]]
}
```

FIG. 25

```
BWP-DownlinkCommon ::=          SEQUENCE {
    genericParameters           BWP,
    pdcch-ConfigCommon          SetupRelease { PDCCH-ConfigCommon }
    pdsch-ConfigCommon          SetupRelease { PDSCH-ConfigCommon }
    ...}

PDCCH-ConfigCommon ::=          SEQUENCE {
    controlResourceSetZero          ControlResourceSetZero
    commonControlResourceSet        ControlResourceSet
    searchSpaceZero                 SearchSpaceZero
    commonSearchSpaceList           SEQUENCE (SIZE(1..4)) OF SearchSpace
    searchSpaceSIB1                 SearchSpaceId
    searchSpaceOtherSystemInformation   SearchSpaceId
    pagingSearchSpace               SearchSpaceId
    ra-SearchSpace                  SearchSpaceId
    [[
    firstPDCCH-MonitoringOccasionOfPO   CHOICE {
        sCS15KHZoneT    SEQUENCE (SIZE (1..maxPO-perPF)) OF INTEGER (0..139),
        ...
    }OPTIONAL    -- Cond OtherBWP
    ]]
    ...,}

PDCCH-ServingCellConfig ::=     SEQUENCE {
    slotFormatIndicator             SetupRelease { SlotFormatIndicator }...,
    [[
    availabilityIndicator-r16       SetupRelease {AvailabilityIndicator-r16}
    searchSpaceSwitchTimer-r16      INTEGER (1..80)
    ]]
}

SearchSpaceSwitchConfig-r16 ::= SEQUENCE {
    cellGroupsForSwitchList-r16     SEQUENCE(SIZE (1..4)) OF CellGroupForSwitch-r16
    searchSpaceSwitchDelay-r16      INTEGER (10..52)
}
CellGroupForSwitch-r16 ::= SEQUENCE(SIZE (1..16)) OF ServCellIndex ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                 SEQUENCE {
            reg-BundleSize              ENUMERATED {n2, n3, n6},
            interleaverSize             ENUMERATED {n2, n3, n6},
            shiftIndex                  INTEGER(0..maxNrofPhysicalResourceBlocks-1)},
        nonInterleaved              NULL},
    precoderGranularity             ENUMERATED {sameAsREG-bundle, allContiguousRBs},
    pdcch-DMRS-ScramblingID         INTEGER (0..65535)
    ..., }
```

FIG. 26

```
SearchSpace ::=                       SEQUENCE {
  searchSpaceId                       SearchSpaceId,
  controlResourceSetId                ControlResourceSetId
  monitoringSlotPeriodicityAndOffset  CHOICE {
    sl1                               NULL,
    sl2                               INTEGER (0..1),...}
  duration                            INTEGER (2..2559)
  monitoringSymbolsWithinSlot         BIT STRING (SIZE (14))
  nrofCandidates                      SEQUENCE {
    aggregationLevel1                 ENUMERATED {n0, n1, n2, ... n8},
    aggregationLevel2                 ENUMERATED {n0, n1, n2, ... n8},
    ...}
  searchSpaceType                     CHOICE {
    common                            SEQUENCE {
      dci-Format0-0-AndFormat1-0        SEQUENCE {...}
      dci-Format2-0                     SEQUENCE {
        nrofCandidates-SFI                SEQUENCE {
          aggregationLevel1                 ENUMERATED {n1, n2}
          aggregationLevel2                 ENUMERATED {n1, n2}...},
        ...}
      dci-Format2-1                     SEQUENCE {...}
      ...
    },
    ue-Specific                       SEQUENCE {
      dci-Formats     ENUMERATED {formats0-0-And-1-0, formats0-1-And-1-1},
      ...}
  }
}

SearchSpaceExt-r16 ::=                SEQUENCE {
  controlResourceSetId-r16            ControlResourceSetId-r16
  searchSpaceType-r16                 SEQUENCE {
    common-r16                        SEQUENCE {
      dci-Format2-4-r16                 SEQUENCE {
        nrofCandidates-CI-r16             SEQUENCE {
          aggregationLevel1-r16             ENUMERATED {n1, n2}...},...}
      dci-Format2-5-r16                 SEQUENCE {
        nrofCandidates-IAB-r16            SEQUENCE {
          aggregationLevel1-r16             ENUMERATED {n1, n2}...},...}
      dci-Format2-6-r16                 SEQUENCE {...}
      ...}
  }
  searchSpaceGroupIdList-r16          SEQUENCE (SIZE (1..2)) OF INTEGER (0..1)
  freqMonitorLocations-r16            BIT STRING (SIZE (5))
}

SearchSpaceSwitchTrigger-r16 ::= SEQUENCE {
  servingCellId-r16           ServCellIndex,
  positionInDCI-r16
INTEGER(0..maxSFI-DCI-PayloadSize-1)
}
```

FIG. 27

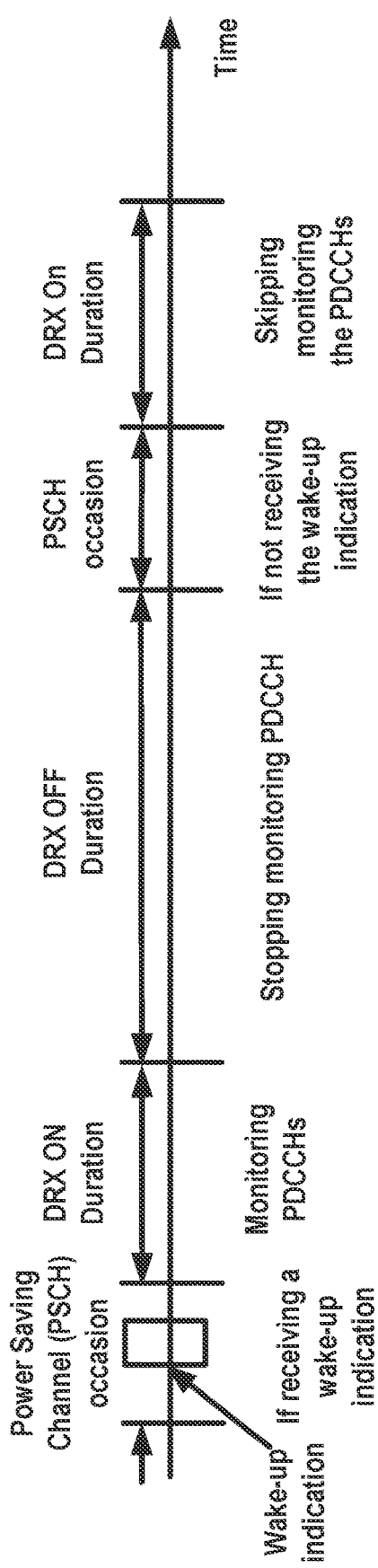
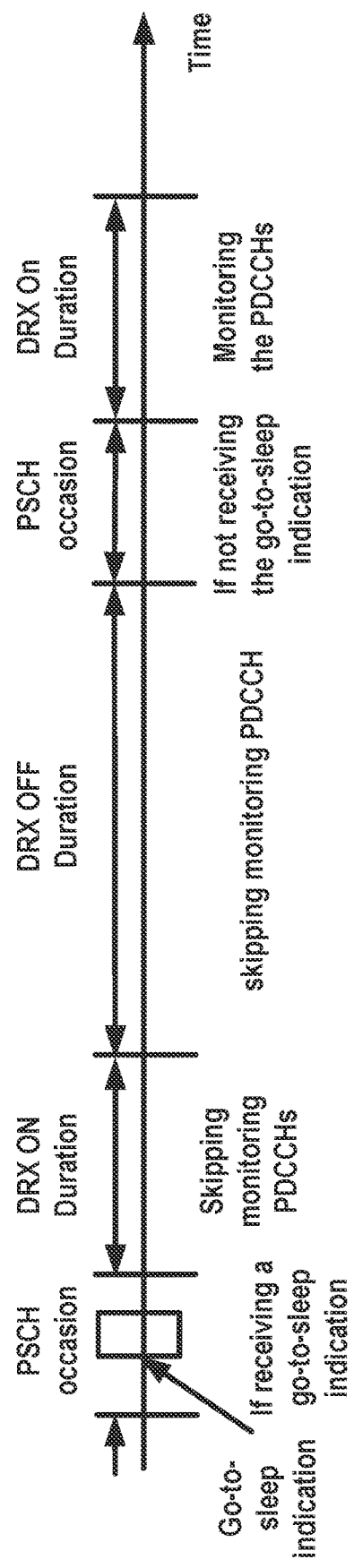
FIG. 29A
FIG. 29B

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 66 – 254 | ... | ... | ... | ... | ... | ... | ... | ... | ... | ... | ... | ... | ... | ... |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

FIG. 33

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | $\{2,8\}+14n$ | n=0,1 | n=0,1,2,3 | Not Applicable (NA) |
| CaseB: 30 KHz | $\{4,8,16,20\}+28n$ | n=0 | n=0,1 | NA |
| CaseC: 30 KHz | $\{2,8\}+14n$ | n=0,1 | n=0,1,2,3 | NA |
| CaseD: 120 KHz | $\{4,8,16,20\}+28n$ | NA | NA | n=0,1,2,3,5,6,7,8,10,11,12,13,15,16,17,18 |
| CaseE: 240 KHz | $\{8,12,16,20,32,36,40,44\}+56n$ | NA | NA | n=0,1,2,3,5,6,7,8 |

FIG. 35

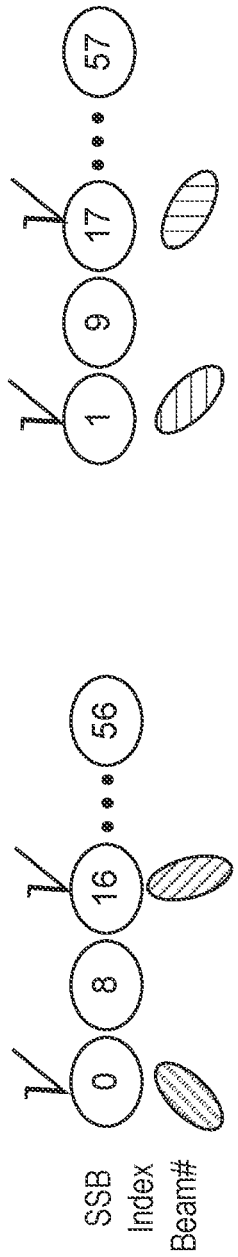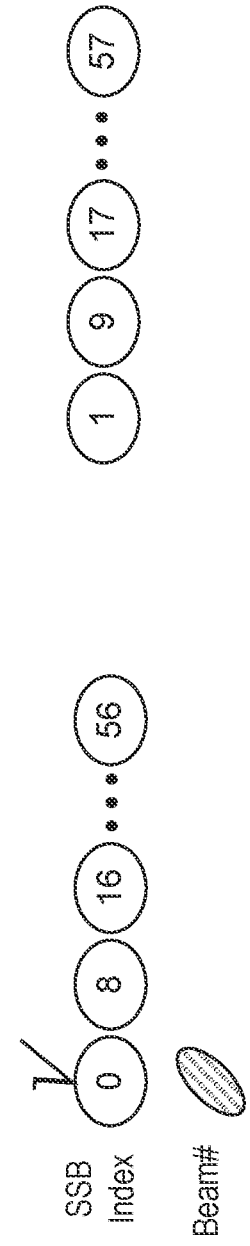
FIG. 44

DYNAMIC SIGNALING FOR ENERGY SAVING IN WIRELESS COMMUNICATIONS

CROSS-REFERENCE TO RELATED APPLICATIONS

This application claims the benefit of U.S. Provisional Application No. 63/292,791, filed on Dec. 22, 2021. The above-referenced application is hereby incorporated by reference in its entirety.

BACKGROUND

A base station transmits downlink signals that are monitored and/or measured by a wireless device. The wireless device performs signal transmission and/or reception based on the measurements.

SUMMARY

The following summary presents a simplified summary of certain features. The summary is not an extensive overview and is not intended to identify key or critical elements.

Some signals, such as synchronization signals and/or reference signals, may be used to facilitate communications between devices. For example, synchronization signals and/or reference signals may be used, by wireless devices, for time and/or frequency synchronization, phase tracking, positioning measurements, pathloss measurements, and/or any other synchronization. The signals (e.g., which may be downlink, uplink, and/or sidelink signals) may be transmitted in the form of bursts (e.g., with a configured periodicity and quantity of transmissions per burst). In at least some scenarios, modifying signal parameters (e.g., a reduction in periodicity of bursts and transmissions per burst) may enable reduced resource utilization (e.g., reduced power and/or channel utilization) without significantly impacting network performance. Resource efficient operation (e.g., with reduced periodicity of bursts and transmissions per burst) for the network may be triggered based on determined traffic patterns (e.g., low traffic volume) in the network to ensure that network performance is not significantly impacted. Dynamic control signaling (e.g., downlink control information (DCI), uplink control information (UCI), and/or sidelink control information (SCI)) may be used to efficiently modify burst signal parameters and initiate the resource efficient operation. The dynamic control signaling may be sent via control channels (e.g., search spaces) configured for energy saving operation. Use of dynamic control signaling, which have low resource utilization, for modifying burst signaling parameters may provide advantages such as reduced resource overhead and/or more efficient wireless communications.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 8 shows an example resource configuration of one or more carriers.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 19 shows example logical channel identifier (LCID) values.

FIG. 20 shows example LCID values.

FIG. 23 shows examples of various downlink control information (DCI) formats.

FIG. 24A shows an example master information block (MIB) message.

FIG. 24B shows an example configuration of a CORESET.

FIG. 24C shows an example of configuration of a search space.

FIG. 25 shows an example of a system information block (SIB).

FIG. 26 shows example RRC configuration parameters.

FIG. 27 shows an example configuration of a search space.

FIG. 29A and FIG. 29B show example power saving operations.

FIG. 33 shows an example slot format indication.

FIG. 35 shows example SSB configurations.

FIG. 44 shows an example indication of selective transmission of SSB.

DETAILED DESCRIPTION

Figure 1A:
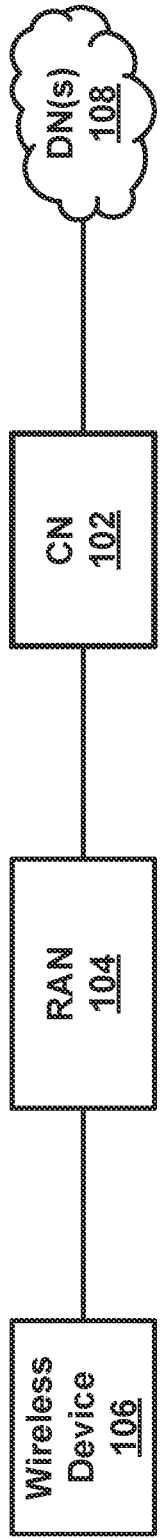
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to signaling for resource conservation.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS)

and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
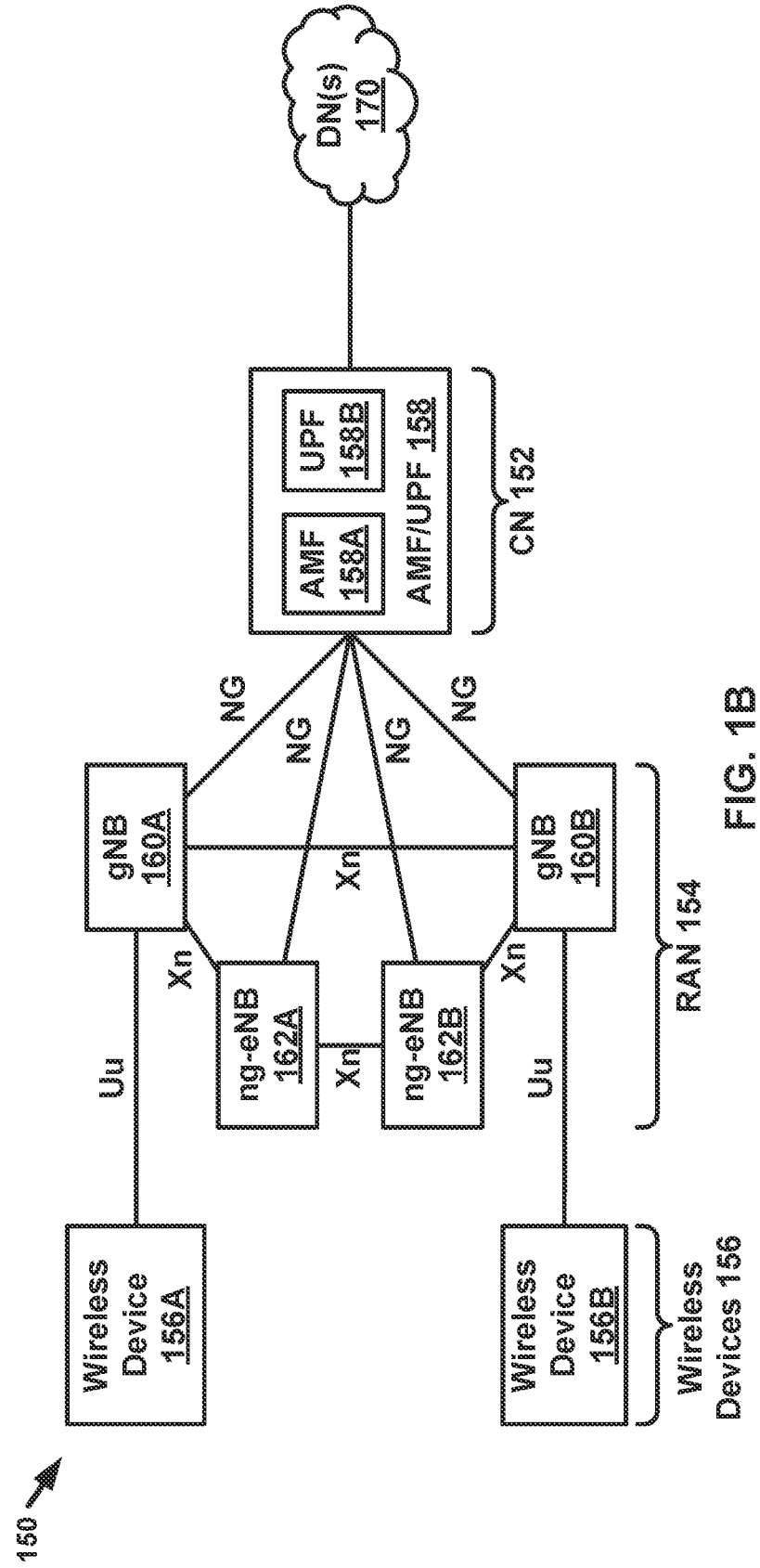

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
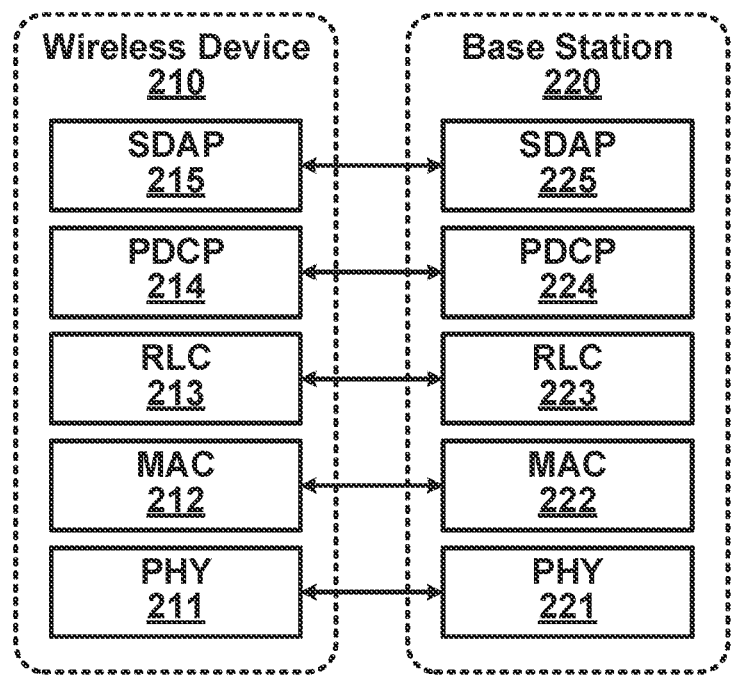
FIG. 2A shows an example user plane.
Figure 2B:
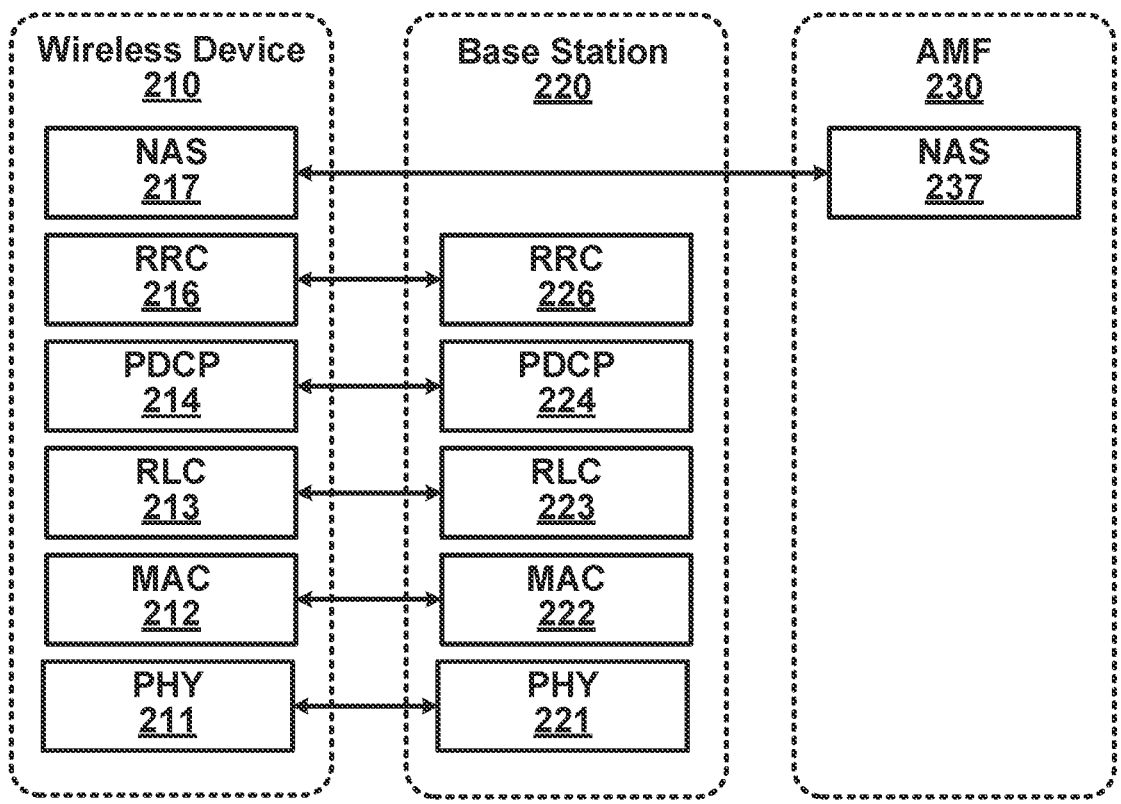
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
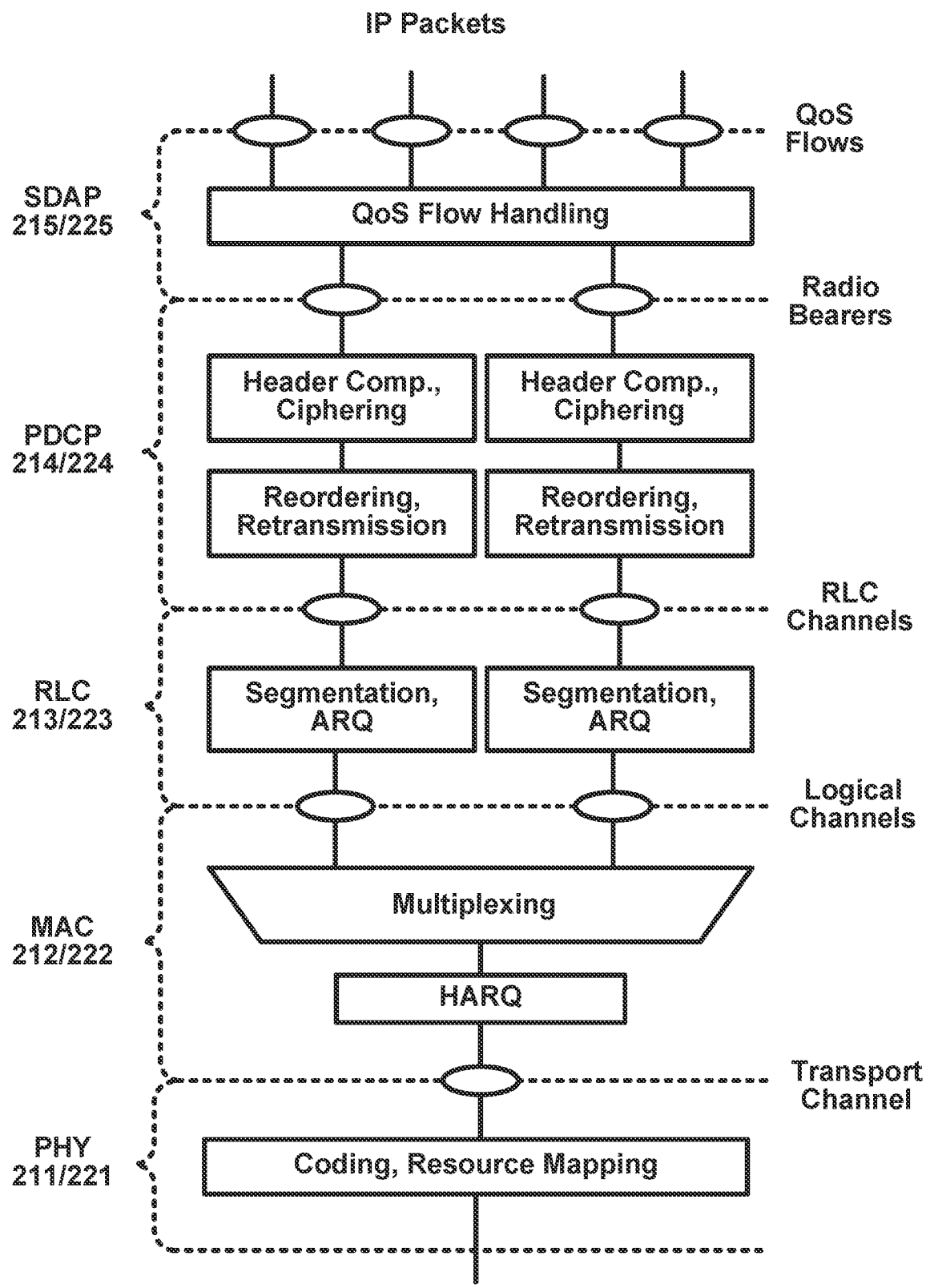
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
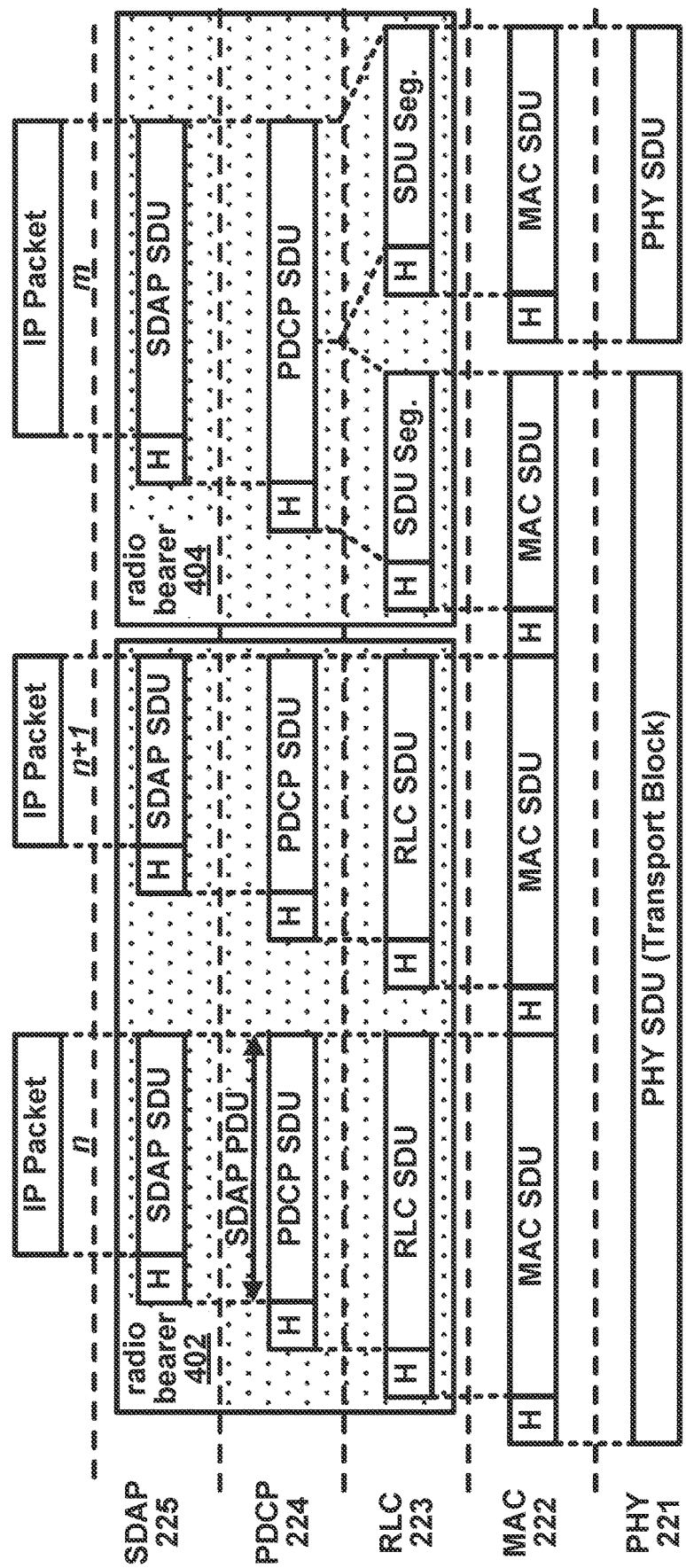
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
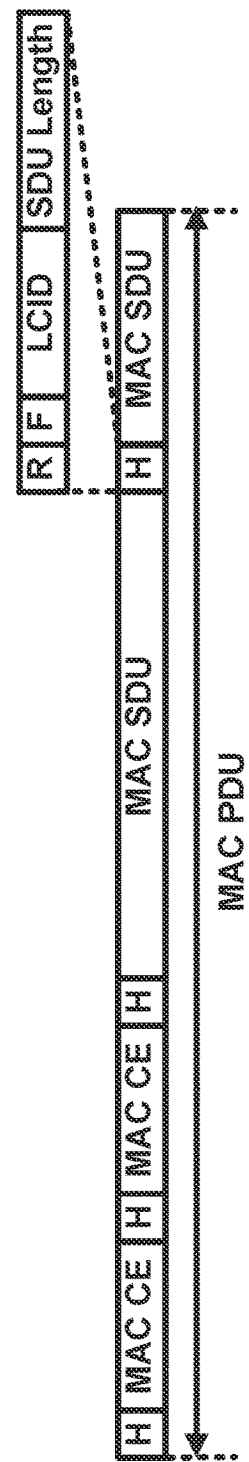
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
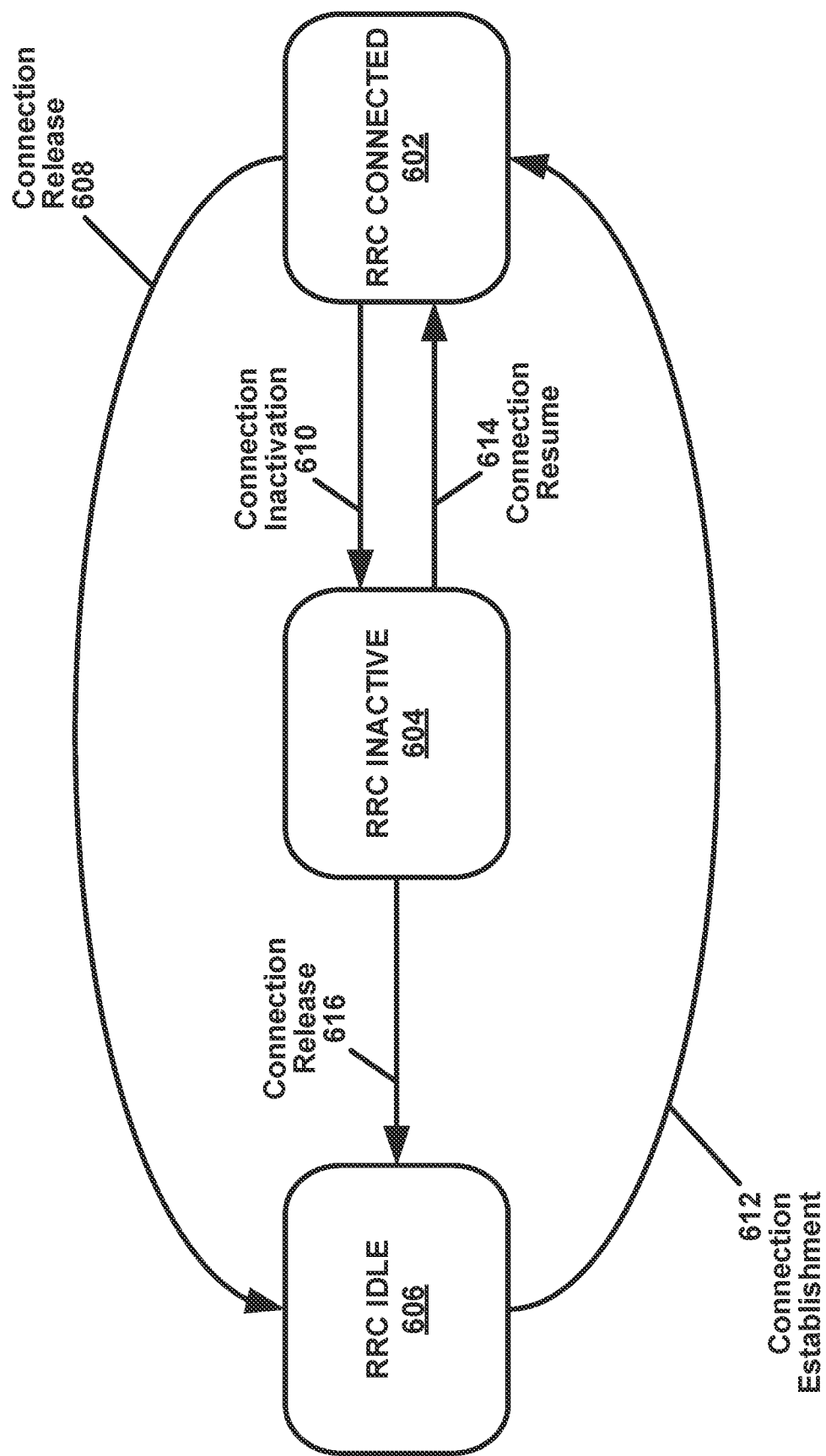
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
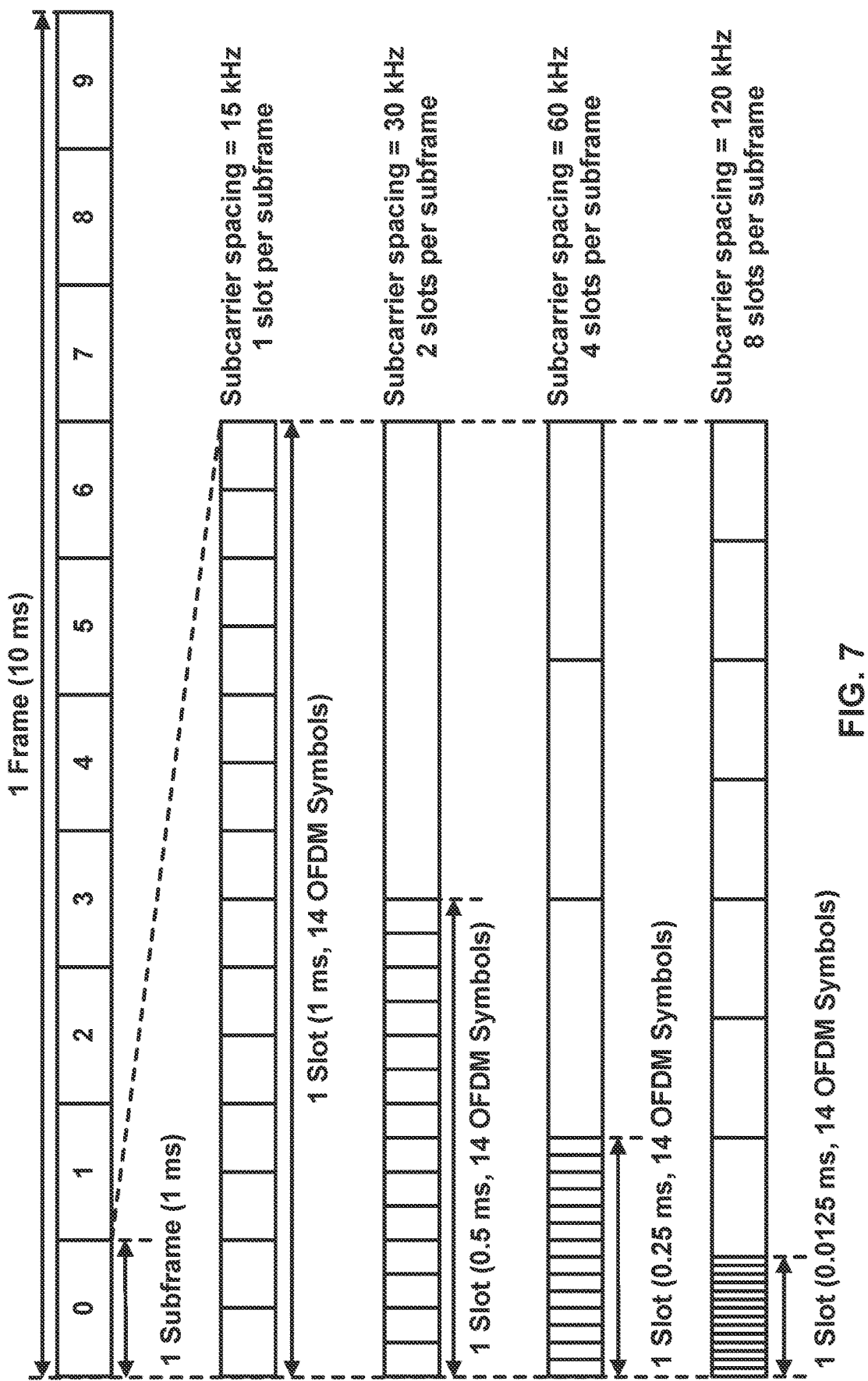
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
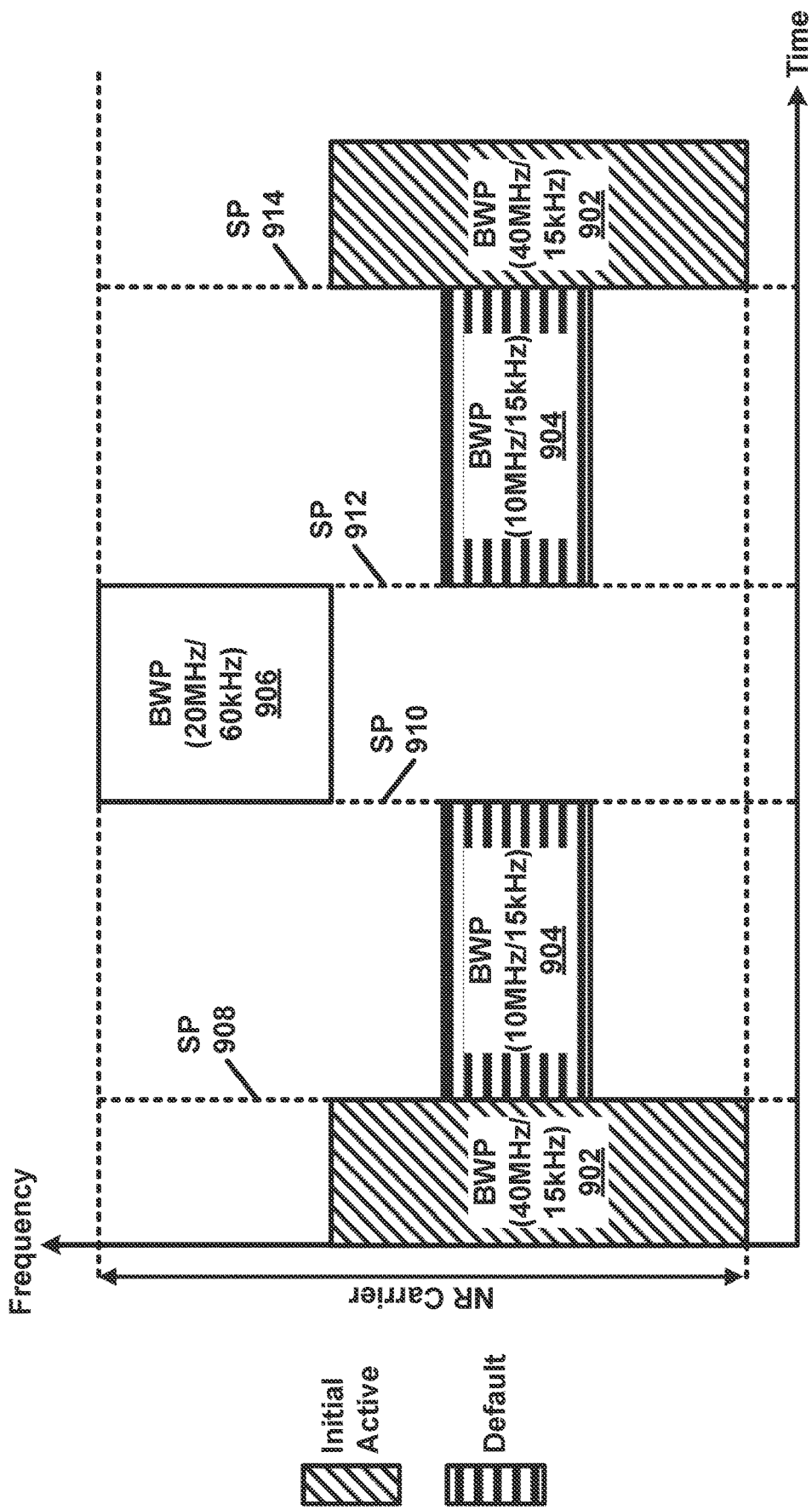
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
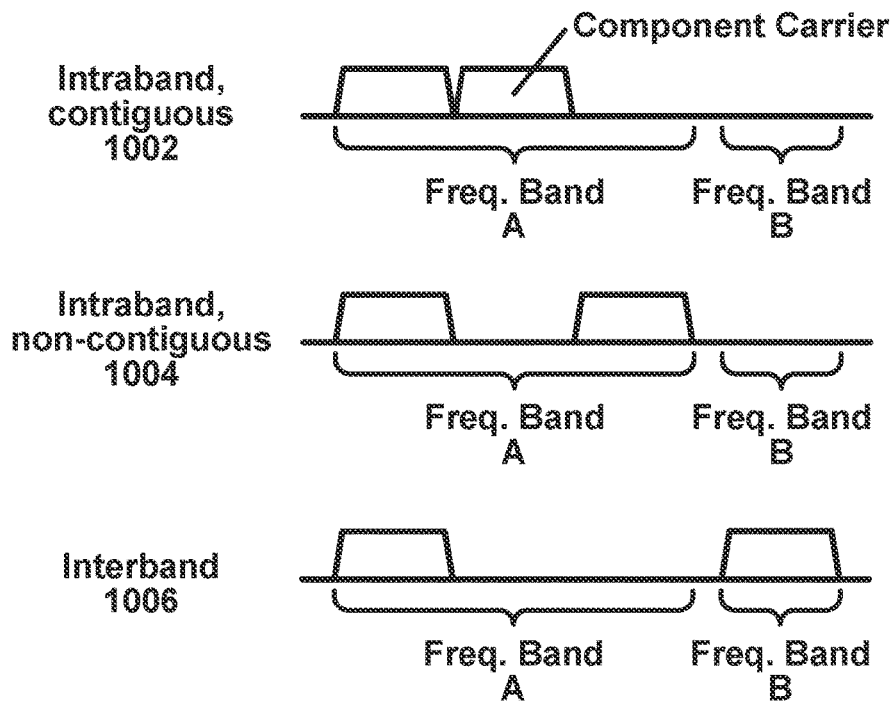
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or accesses to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
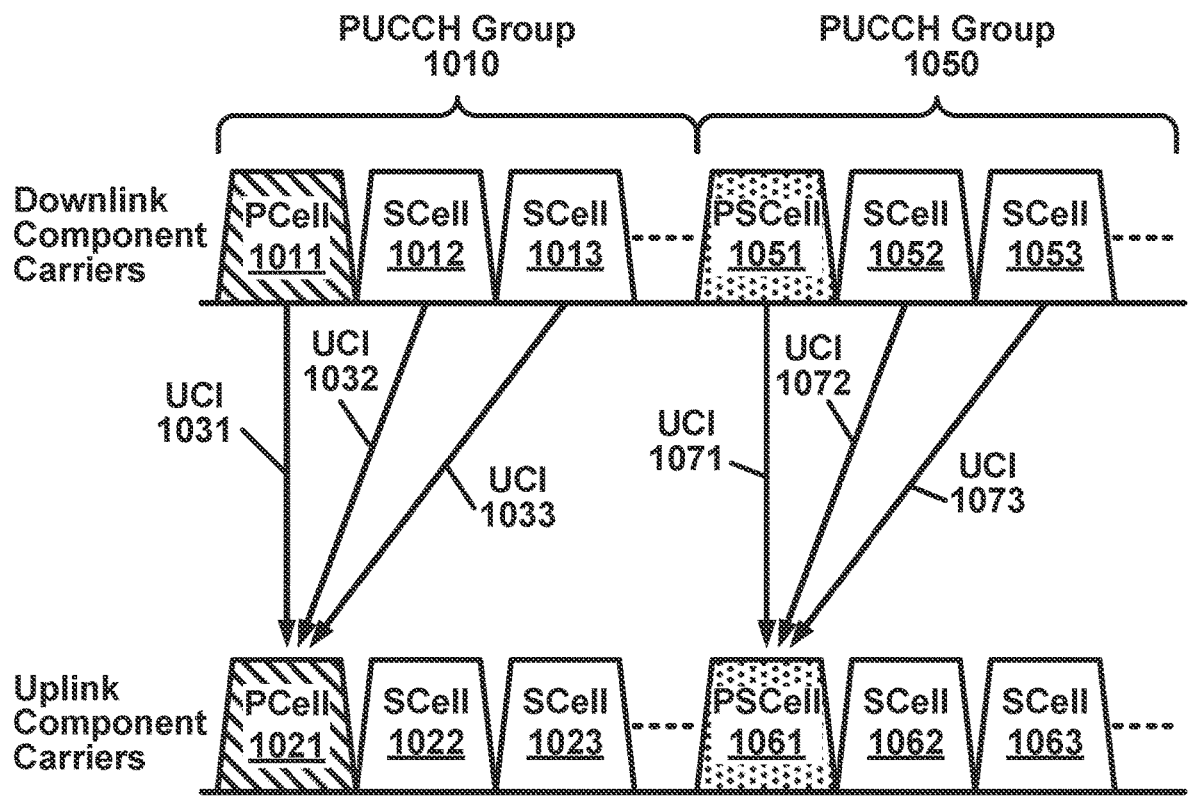
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
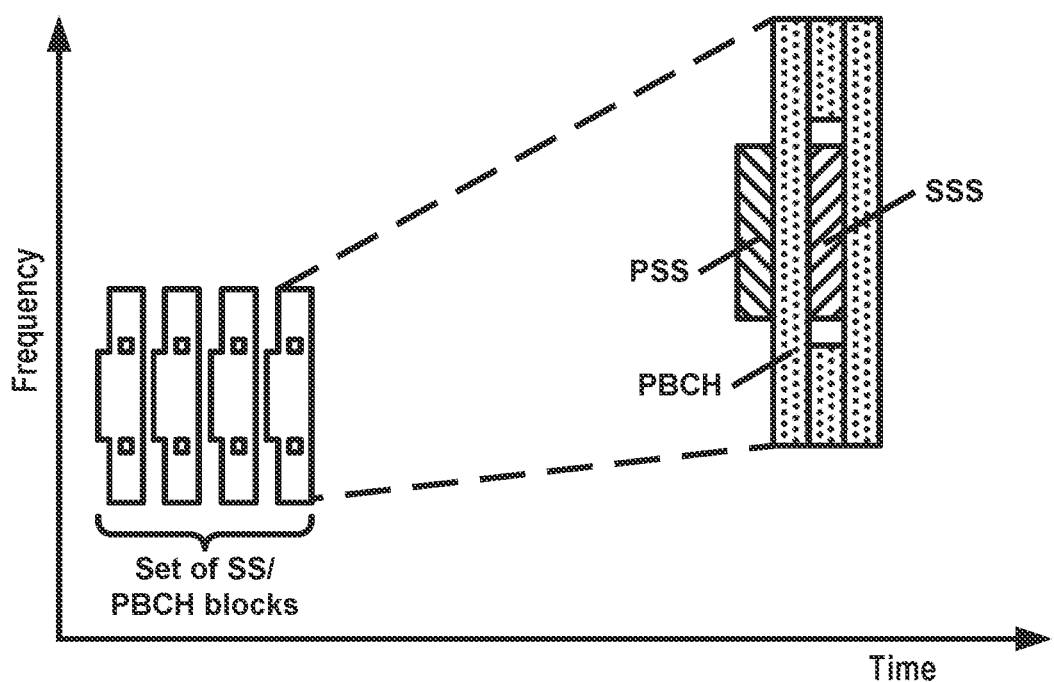
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
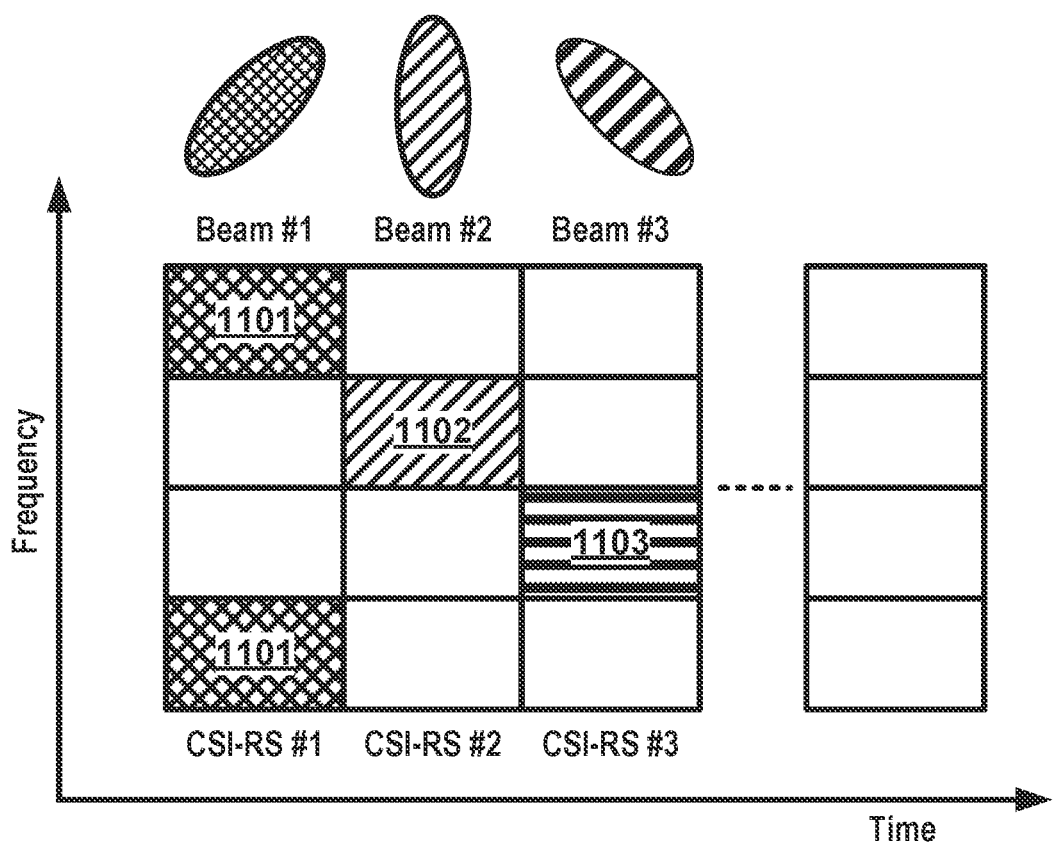
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
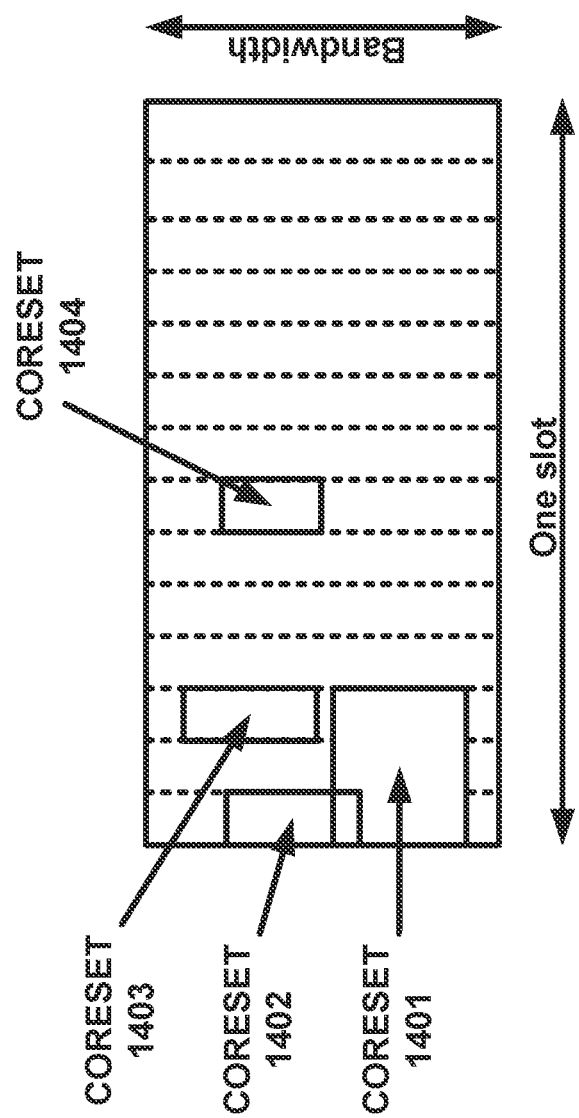
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
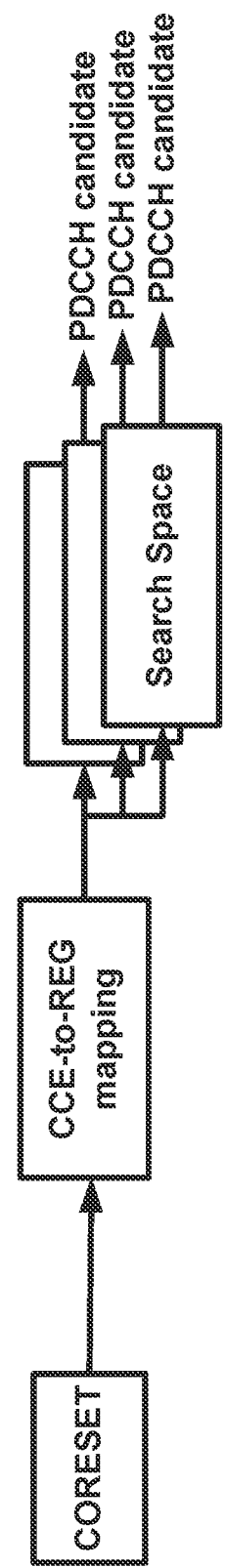
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
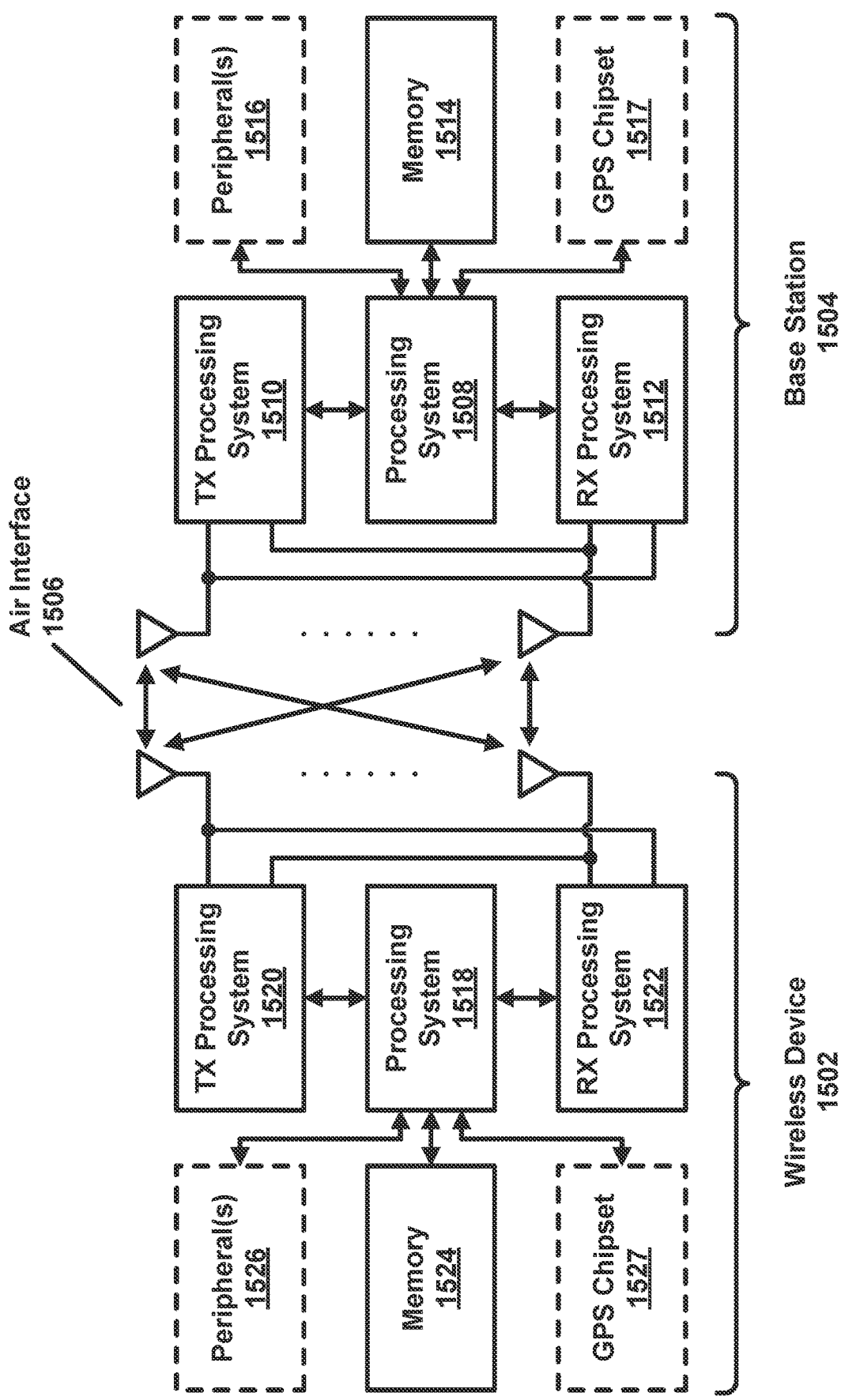
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
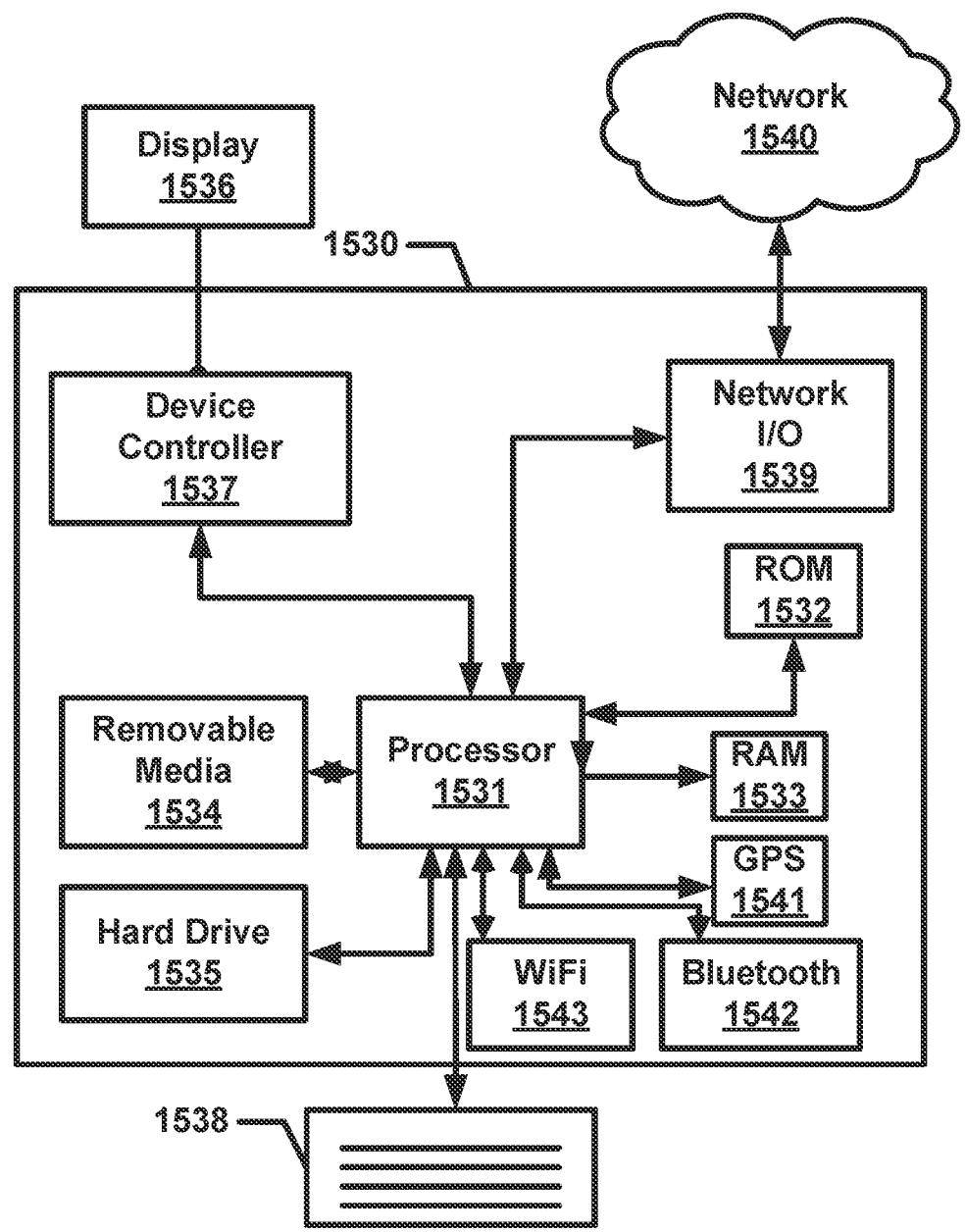
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., aligned to a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be comprised in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, and/or a combination thereof. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; an L field with a multi-bit length; and/or a combination thereof, for example, if the MAC subheader corresponds to a MAC SDU, a variable-sized MAC CE, or padding.

Figure 17A:
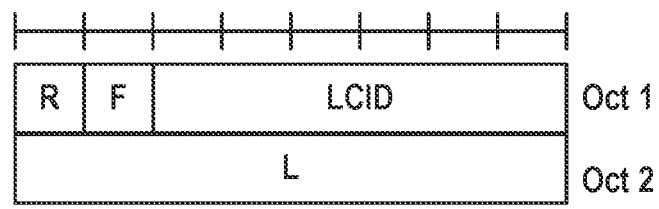
FIG. 17A, FIG. 17B, and FIG. 17C show example MAC subheaders.
Figure 17B:
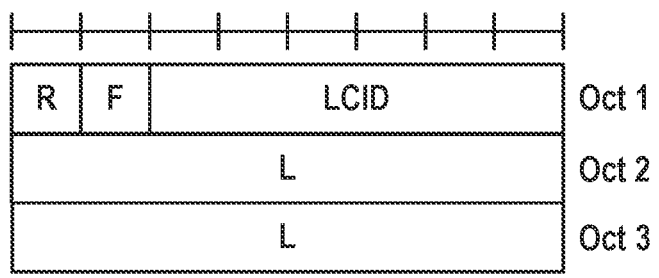
Figure 17C:
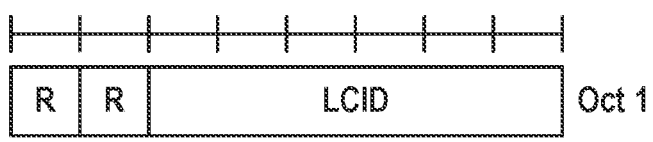

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
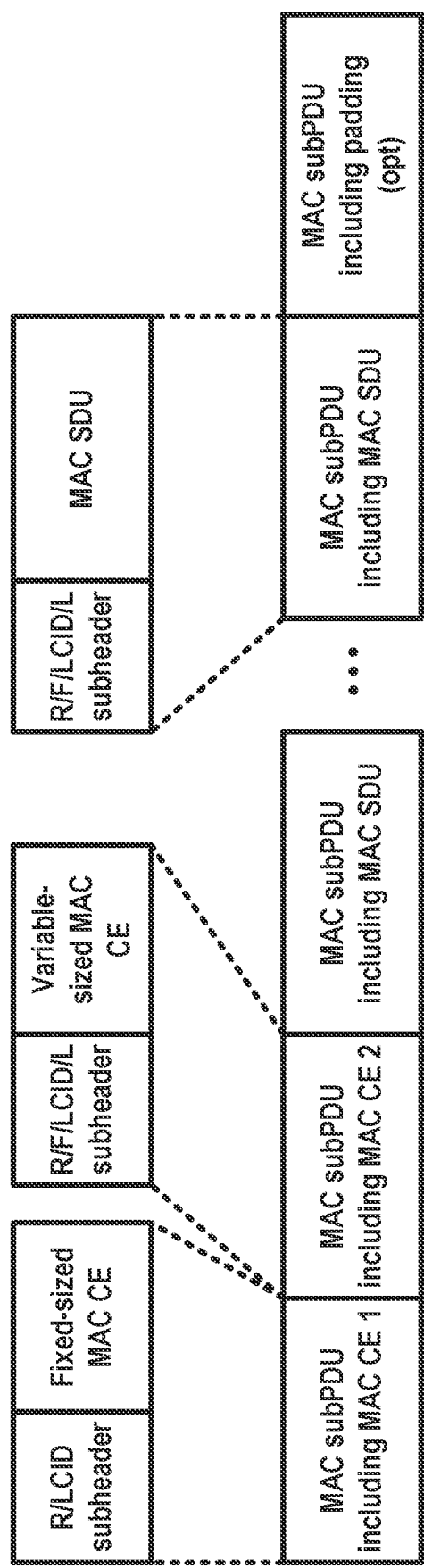
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
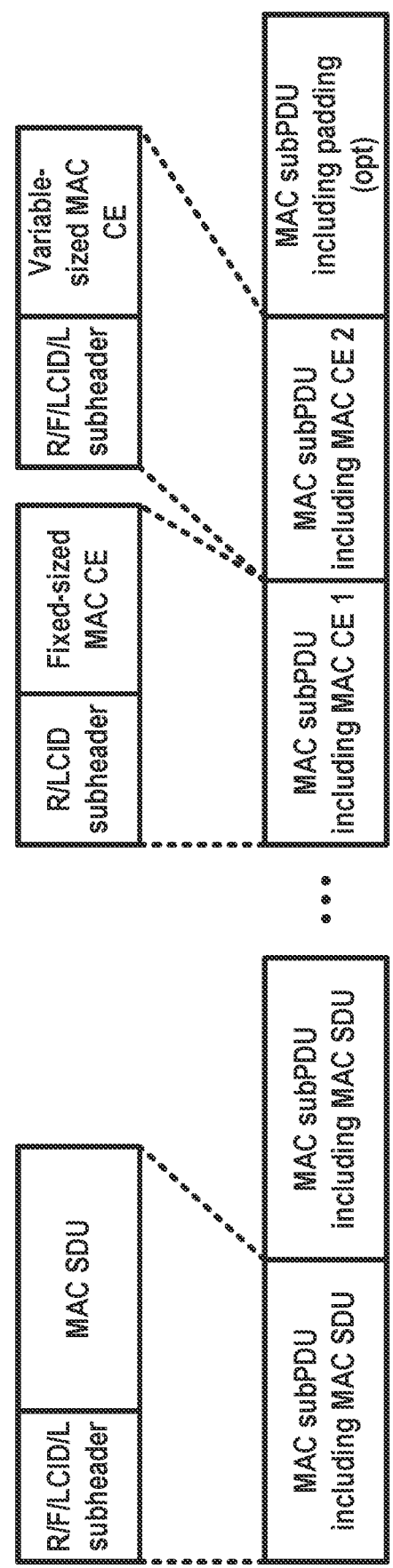

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the corresponding MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more component carriers (CCs) may be aggregated, such as in carrier aggregation (CA).

A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
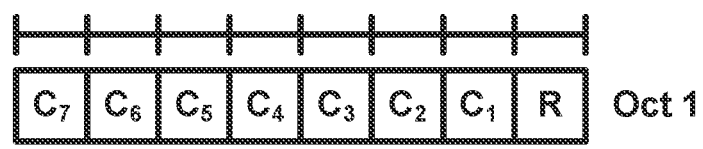
FIG. 21A and FIG. 21B show example secondary cell (SCell) Activation/Deactivation MAC control elements (CEs).

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
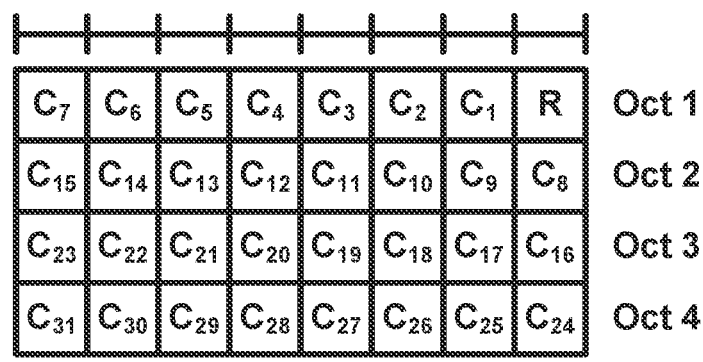

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may configure a wireless device with uplink (UL) bandwidth parts (BWPs) and downlink (DL) BWPs to enable bandwidth adaptation (BA) on a PCell. The base station may further configure the wireless device with at least DL BWP(s) (i.e., there may be no UL BWPs in the UL) to enable BA on an SCell, for example, if carrier aggregation is configured. An initial active BWP may be a first BWP used for initial access, for example, for a PCell. A first active BWP may be a second BWP configured for the wireless device to operate on a SCell upon the SCell being activated. A base station and/or a wireless device may independently switch a DL BWP and an UL BWP, for example, in paired spectrum (e.g., FDD). A base station and/or a wireless device may simultaneously switch a DL BWP and an UL BWP, for example, in unpaired spectrum (e.g., TDD).

A base station and/or a wireless device may switch a BWP between configured BWPs using a DCI message or a BWP inactivity timer. The base station and/or the wireless device may switch an active BWP to a default BWP based on (e.g., after or in response to) an expiry of the BWP inactivity timer associated with the serving cell, for example, if the BWP inactivity timer is configured for a serving cell. The default BWP may be configured by the network. One UL BWP for an uplink carrier (e.g., each uplink carrier) and one DL BWP may be active at a time in an active serving cell, for example, if FDD systems are configured with BA. One DL/UL BWP pair may be active at a time in an active serving cell, for example, for TDD systems. Operating on the one UL BWP and the one DL BWP (or the one DL/UL pair) may improve wireless device battery consumption. BWPs other than the one active UL BWP and the one active DL BWP that the wireless device may work on may be deactivated. The wireless device may not monitor PDCCH transmission, for example, on deactivated BWPs. The wireless device may not send (e.g., transmit) on PUCCH, PRACH, and UL-SCH, for example, on deactivated BWPs.

A serving cell may be configured with at most a first number/quantity (e.g., four) of BWPs. There may be one active BWP at any point in time, for example, for an activated serving cell. A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by a BWP inactivity timer (e.g., bwp-InactivityTimer). The BWP switching may be controlled by a wireless device (e.g., a MAC entity of the wireless device) based on (e.g., after or in response to) initiating a Random Access procedure. One BWP may be initially active without receiving a PDCCH transmission indicating a downlink assignment or an uplink grant, for example, upon addition of an SpCell or activation of an SCell. The active BWP for a serving cell may be indicated by configuration parameter(s) (e.g., parameters of RRC message) and/or PDCCH transmission. A DL BWP may be paired with a UL BWP for unpaired spectrum, and BWP switching may be common for both UL and DL.

Figure 22:
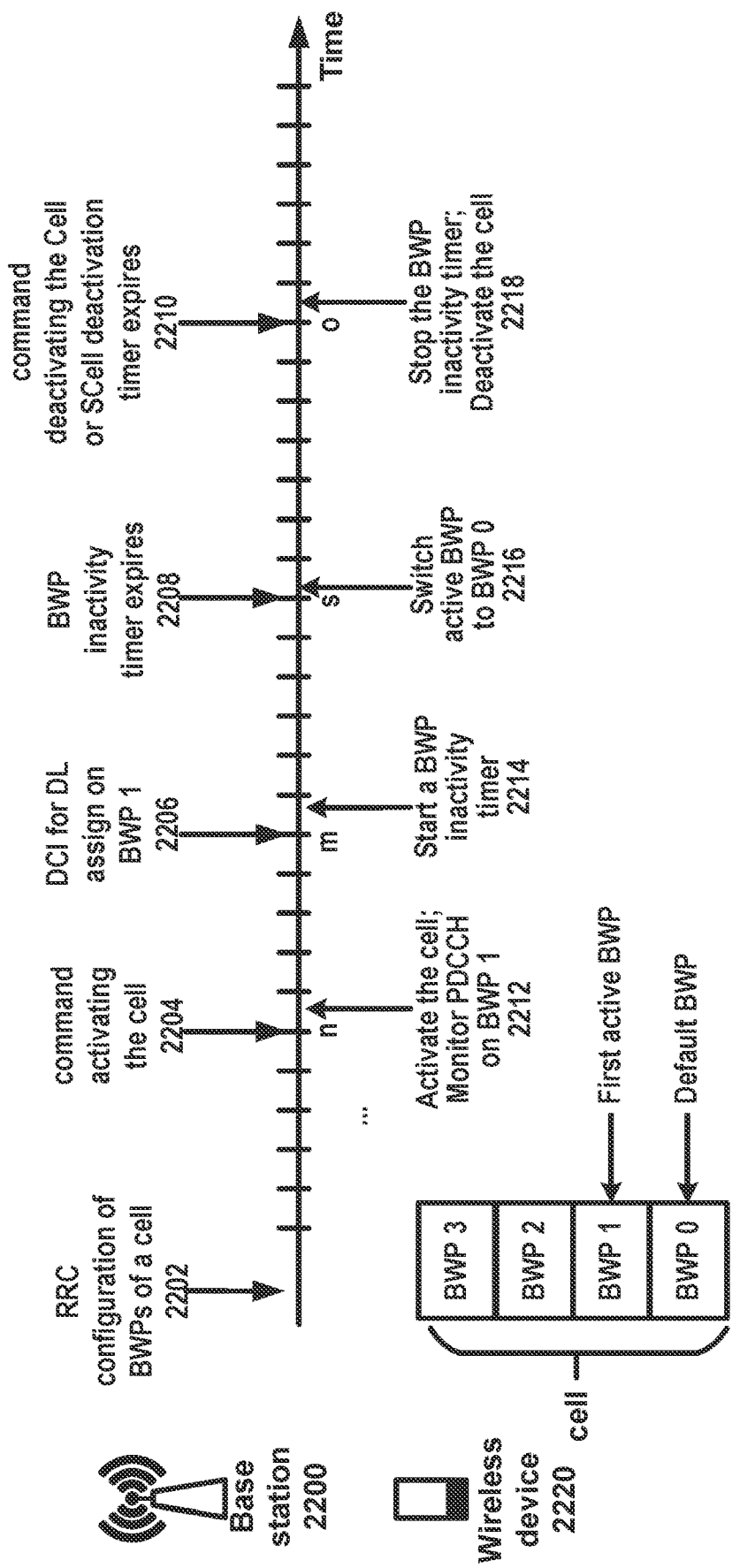
FIG. 22 shows an example of BWP activation/deactivation.

FIG. 22 shows an example of BWP activation/deactivation. The BWP activation/deactivation may be on a cell (e.g., PCell or SCell). The BWP activation/deactivation may be associated with BWP switching (e.g., BWP switching may comprise the BWP activation/deactivation). A wireless device 2220 may receive (e.g., detect) at step 2202, (e.g., from a base station 2200), at least one message (e.g., RRC message) comprising parameters of a cell and one or more BWPs associated with the cell. The RRC message may comprise at least one of: RRC connection reconfiguration message (e.g., RRCReconfiguration), RRC connection reestablishment message (e.g., RRCRestablishment), and/or RRC connection setup message (e.g., RRCSetup). Among the one or more BWPs, at least one BWP may be configured as the first active BWP (e.g., BWP 1), one BWP as the default BWP (e.g., BWP 0). The wireless device 2220 may receive (e.g., detect) a command at step 2204 (e.g., RRC message, MAC CE or DCI message) to activate the cell at an nth slot. The wireless device 2220 may not receive (e.g., detect) a command activating a cell, for example, a PCell. The wireless device 2220 may activate the PCell at step 2212, for example, after the wireless device 2220 receives/detects RRC message comprising configuration parameters of the PCell. The wireless device 2220 may start monitoring a PDCCH transmission on BWP 1 based on (e.g., after or in response to) activating the PCell at step 2212.

The wireless device 2220 may start (or restart) at step 2214, a BWP inactivity timer (e.g., bwp-InactivityTimer) at an mth slot based on (e.g., after or in response to) receiving a DCI message 2206 indicating DL assignment on BWP 1. The wireless device 2220 may switch back at step 2216 to the default BWP (e.g., BWP 0) as an active BWP, for example, if the BWP inactivity timer expires at step 2208, at sth slot. At step 2210, the wireless device 2220 may deactivate the cell and/or stop the BWP inactivity timer, for example, if a secondary cell deactivation timer (e.g., sCell-DeactivationTimer) expires at step 2210 (e.g., if the cell is a SCell). The wireless device 2220 may not deactivate the cell and may not apply or use a secondary cell deactivation timer (e.g., sCellDeactivationTimer) on the PCell, for example, based on the cell being a PCell.

A wireless device (e.g., a MAC entity of the wireless device) may apply or use various operations on an active BWP for an activated serving cell configured with a BWP. The various operations may comprise at least one of: sending (e.g., transmitting) on UL-SCH, sending (e.g., transmitting) on RACH, monitoring a PDCCH transmission, sending (e.g., transmitting) PUCCH, receiving DL-SCH, and/or (re-)initializing any suspended configured uplink grants of configured grant Type 1 according to a stored configuration, if any.

A wireless device (e.g., a MAC entity of the wireless device) may not perform certain operations, for example, on an inactive BWP for an activated serving cell (e.g., each activated serving cell) configured with a BWP. The certain operations may include at least one of sending (e.g., transmit) on UL-SCH, sending (e.g., transmit) on RACH, monitoring a PDCCH transmission, sending (e.g., transmit) PUCCH, sending (e.g., transmit) SRS, or receiving DL-SCH. The wireless device (e.g., the MAC entity of the wireless device) may clear any configured downlink assignment and configured uplink grant of configured grant Type 2, and/or suspend any configured uplink grant of configured Type 1, for example, on the inactive BWP for the activated serving cell (e.g., each activated serving cell) configured with the BWP.

A wireless device may perform a BWP switching of a serving cell to a BWP indicated by a PDCCH transmission, for example, if a wireless device (e.g., a MAC entity of the wireless device) receives/detects the PDCCH transmission for the BWP switching and a random access procedure associated with the serving cell is not ongoing. A bandwidth part indicator field value may indicate the active DL BWP, from the configured DL BWP set, for DL receptions, for example, if the bandwidth part indicator field is configured in DCI format 1_1. A bandwidth part indicator field value may indicate the active UL BWP, from the configured UL BWP set, for UL transmissions, for example, if the bandwidth part indicator field is configured in DCI format 0_1.

A wireless device may be provided by a higher layer parameter such as a default DL BWP (e.g., Default-DL-BWP) among the configured DL BWPs, for example, for a primary cell. A default DL BWP is the initial active DL BWP, for example, if a wireless device is not provided with the default DL BWP by the higher layer parameter (e.g., Default-DL-BWP). A wireless device may be provided with a higher layer parameter such as a value of a timer for the primary cell (e.g., bwp-InactivityTimer) The wireless device may increment the timer, if running, every interval of 1 millisecond for frequency range 1 or every 0.5 milliseconds for frequency range 2, for example, if the wireless device may not detect a DCI format 1_1 for paired spectrum operation or if the wireless device may not detect a DCI format 1_1 or DCI format 0_1 for unpaired spectrum operation during the interval.

Procedures of a wireless device on the secondary cell may be same as on the primary cell using a timer value for a secondary cell and the default DL BWP for the secondary cell, for example, if the wireless device is configured for the secondary cell with a higher layer parameter (e.g., Default-DL-BWP) indicating a default DL BWP among the configured DL BWPs and the wireless device is configured with a higher layer parameter (e.g., bwp-InactivityTimer) indicating the timer value. A wireless device may use an indicated DL BWP and an indicated UL BWP on a secondary cell respectively as a first active DL BWP and a first active UL BWP on the secondary cell or carrier, for example, if the wireless device is configured by a higher layer parameter (e.g., Active-BWP-DL-SCell) associated with the first active DL BWP and by a higher layer parameter (e.g., Active-BWP-UL-SCell) associated with the first active UL BWP on the secondary cell or carrier.

A set of PDCCH candidates for a wireless device to monitor may be referred to as PDCCH search space sets. A search space set may comprise a CSS set or a USS set. A wireless device may monitor PDCCH transmission candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by paging- SearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device may determine a PDCCH transmission monitoring occasion on an active DL BWP based on one or more PDCCH transmission configuration parameters (e.g., as described with respect to FIG. 27) comprising at least one of: a PDCCH transmission monitoring periodicity, a PDCCH transmission monitoring offset, or a PDCCH transmission monitoring pattern within a slot. For a search space set (SS s), the wireless device may determine that a PDCCH transmission monitoring occasion(s) exists in a slot with number/quantity $n_{s,f}^{\mu}$ in a frame with number/quantity $n_f$ if $(n_f \cdot N_{slot}^{frame,\mu} + n_{s,f}^{\mu} - o_s) \bmod k_s = 0 N_{slot}^{frame,\mu}$ is a number/quantity of slots in a frame if numerology $\mu$ is configured. $o_s$ is a slot offset indicated in the PDCCH transmission configuration parameters. $k_s$ is a PDCCH transmission monitoring periodicity indicated in the PDCCH transmission configuration parameters. The wireless device may monitor PDCCH transmission candidates for the search space set for $T_s$ consecutive slots, starting from slot $n_{s,f}^{\mu}$, and may not monitor PDCCH transmission candidates for search space set s for the next $k_s - T_s$ consecutive slots. A USS at CCE aggregation level $L \in \{1, 2, 4, 8, 16\}$ may be defined by a set of PDCCH transmission candidates for CCE aggregation level L.

A wireless device may decide, for a search space set s associated with CORESET p, CCE indexes for aggregation level L corresponding to PDCCH transmission candidate $m_{s,n_{CI}}$ of the search space set in slot $n_{s,f}^{\mu}$ for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{S,max}^{(L)}} \right\rfloor + n_{CI} \right) \bmod \lfloor N_{CCE,p}/L \rfloor \right\} + i,$$

where, $Y_{p,n_{s,f}^{\mu}} = 0$ for any CSS; $Y_{p,n_{s,f}^{\mu}} = (A_p \cdot Y_{p,n_{s,f}^{\mu}-1}) \bmod D$ for a USS, $Y_{p,-1_{RNTI}} \neq 0$, $A_p = 39827$ for p mod 3=0, $A_p = 39829$ for p mod 3=1, $A_p = 39839$ for p mod 3=2, and D=65537; i=0, ..., L-1; $N_{CCE,p}$ is the number/quantity of CCEs, numbered/quantified from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH transmission is monitored; otherwise, including for any CSS, $n_{CI}=0$; $m_{s,n_{CI}}=0, \ldots, M_{s,n_{CI}}^{(L)}-1$, where $M_{s,n_{CI}}^{(L)}$ is the number/quantity of PDCCH transmission candidates the wireless device is configured to monitor for aggregation level L of a search space set s for a serving cell corresponding to $n_{CI}$; for any CSS, $M_{s,max}^{(L)} = M_{s,0}^{(L)}$; for a USS, $M_{s,max}^{(L)}$ is the maximum of $M_{s,n_{CI}}^{(L)}$ over configured $n_{CI}$ values for a CCE aggregation level L of search space set s; and the RNTI value used for $n_{RNTI}$ is the C-RNTI.

A wireless device may monitor a set of PDCCH transmission candidates according to configuration parameters of a search space set comprising a plurality of search spaces. The wireless device may monitor a set of PDCCH transmission candidates in one or more CORESETs for detecting one or more DCI messages. A CORESET may be configured, for example, as described with respect to FIG. 26. Monitoring may comprise decoding one or more PDCCH transmission candidates of the set of the PDCCH transmission candidates according to the monitored DCI formats. Monitoring may comprise decoding a DCI content of one or more PDCCH transmission candidates with possible (or configured) PDCCH transmission locations, possible (or configured) PDCCH transmission formats (e.g., number/quantity of CCEs, number/quantity of PDCCH transmission candidates in common search spaces, and/or number/quantity of PDCCH transmission candidates in the UE-specific search spaces) and possible (or configured) DCI formats. The decoding may be referred to as blind decoding. The possible DCI formats may be based on examples of FIG. 23.

FIG. 23 shows examples of various DCI formats. The various DCI formats may be used, for example, by a base station to send (e.g., transmit) control information (e.g., to a wireless device and/or to be used by the wireless device) for PDCCH transmission monitoring. Different DCI formats may comprise different DCI fields and/or have different DCI payload sizes. Different DCI formats may have different signaling purposes. DCI format 0_0 may be used to schedule PUSCH transmission in one cell. DCI format 0_1 may be used to schedule one or multiple PUSCH transmissions in one cell or indicate CG-DFI (configured grant-Downlink Feedback Information) for configured grant PUSCH transmission, etc. The DCI format(s), that the wireless device may monitor for reception via a search space, may be configured.

FIG. 24A shows an example MIB message. FIG. 24A shows example configuration parameters of a MIB of a cell. The cell may be a PCell (or any other cell). A wireless device may receive a MIB via a PBCH. The wireless device may receive the MIB, for example, based on receiving a PSS and/or an SSS. The configuration parameters of a MIB may comprise/indicate a SFN (e.g., indicated via a higher layer parameter systemFrameNumber), subcarrier spacing indication (e.g., indicated via a higher layer parameter subCarrierSpacingCommon), a frequency domain offset (e.g., indicated via a higher layer parameter ssb-SubcarrierOffset) between SSB and overall resource block grid in number of subcarriers, a parameter indicating whether the cell is barred (e.g., indicated via a higher layer parameter cellBarred), a DMRS position indication (e.g., indicated via a higher layer parameter dmrs-TypeA-Position) indicating position of DMRS, parameters of a CORESET and a search space of a PDCCH (e.g., indicated via a higher layer parameter pdcch-ConfigSIB1) comprising a common CORESET, a common search space and necessary PDCCH parameters, etc. Each of the higher layer parameters may be indicated via one or bits. For example, the SFN may be indicated using 6 bits (or any other quantity of bits).

A configuration parameter (e.g., pdcch-ConfigSIB1) may comprise a first parameter (e.g., controlResourceSetZero) indicating a common CORESET of an initial BWP of the cell. The common CORESET may be associated with an indicator/index (e.g., 0, or any other indicator). For example, the common CORESET may be CORESET 0. The first parameter may be an integer between 0 and 15 (or any other integer). Each integer (e.g., between 0 and 15, or any other integer) may indicate/identify a configuration of CORESET 0.

FIG. 24B shows an example configuration of a CORESET. The CORESET may be CORESET 0 (or any other CORESET). A wireless device may determine an SSB and CORESET 0 multiplexing pattern, a quantity/number of RBs for CORESET 0, a quantity/number of symbols for CORESET 0, an RB offset for CORESET 0, for example, based on a value of the first parameter (e.g., controlResourceSetZero).

A higher layer parameter (e.g., pdcch-ConfigSIB1) may comprise a second parameter (e.g., searchSpaceZero). The second parameter may indicate a common search space of the initial BWP of the cell. The common search space may be associated with an indicator/index (e.g., 0, or any other indicator). For example, the common search space may be search space 0. The second parameter may be an integer between 0 and 15 (or any other integer). Each integer (e.g., between 0 and 15, or any other integer) may identify a configuration of search space 0.

FIG. 24C shows an example configuration of a search space. The search space may be search space 0 (or any other search space). A wireless device may determine one or more parameters (e.g., O, M) for slot determination for PDCCH monitoring, a first symbol indicator/index for PDCCH monitoring, and/or a quantity of search spaces per slot, for example, based on a value of the second parameter (e.g., searchSpaceZero). For example, for operation without shared spectrum channel access and for the SS/PBCH block and CORESET multiplexing pattern 1, the wireless device may monitor PDCCH (e.g., in the Type0-PDCCH CSS set) over two slots. For SS/PBCH block with index i, the wireless device may determine an index of slot $n_0$ as $n_0 = (O \cdot 2^\mu + \lfloor i \cdot M \rfloor)$ mod $N_{slot}^{frame,\mu}$. Slot $n_0$ is may be in a frame with a SFN $SFN_C$ that satisfies the condition $SFN_c$ mod 2=0 (e.g., if $\lfloor (O \cdot 2^\mu + \lfloor i \cdot M \rfloor)/N_{slot}^{frame,\mu} \rfloor$ mod 2=0), or in a frame with a SFN that $SFN_C$ satisfies the condition $SFN_c$ mod 2=1 (e.g., if $\lfloor (O \cdot 2^\mu + \lfloor i \cdot M \rfloor)/N_{slot}^{frame,\mu} \rfloor$ mod 2=1), where $\mu \in \{0,1,2,3,5,6\}$ based on the SCS for PDCCH receptions in the CORESET.

A wireless device may monitor a PDCCH for receiving DCI. The wireless device may monitor a search space 0 of a CORESET 0 for receiving the DCI. The DCI may schedule a SIB1. For example, a SIB1 message may be similar to as described with respect to FIG. 25. The wireless device may receive the DCI with CRC scrambled with a system information radio network temporary identifier (SI-RNTI) dedicated for receiving the SIB1.

FIG. 25 shows an example SIB. The SIB may comprise one or more configuration parameters (e.g., RRC configuration parameters). A SIB (e.g., SIB1) may be sent/transmitted to one or more wireless devices. For example, the SIB may be broadcasted to multiple wireless devices. The SIB may contain information for evaluating/determining whether a wireless device is allowed to access a cell, information of paging configuration, and/or scheduling configuration of other system information. A SIB may comprise radio resource configuration information that may be common for multiple wireless devices and barring information applied to a unified access control. A base station may send/transmit, to a wireless device (or a plurality of wireless devices), one or more SIB information messages. As shown in FIG. 25, parameters of the one or more SIB information messages may comprise: one or more parameters for cell selection related to a serving cell (e.g., cellSelectionInfo), one or more configuration parameters of a serving cell (e.g., in ServingCellConfigCommonSIB information element (IE)), and/or one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and/or other parameters.

A DownlinkConfigCommonSIB IE may comprise parameters of an initial downlink BWP (e.g., indicated via initialDownlinkBWP IE) of the serving cell (e.g., SpCell). The parameters of the initial downlink BWP may be comprised in a BWP-DownlinkCommon IE (e.g., as shown in FIG. 26). The BWP-DownlinkCommon IE may be used to configure common parameters of a downlink BWP of the serving cell. The base station may configure a parameter (e.g., locationAndBandwidth) such that the initial downlink BWP may comprise an entire CORESET (e.g., CORESET 0) of the serving cell in the frequency domain. The wireless device may apply the parameter locationAndBandwidth based on reception of the parameter. The wireless device may use/apply the parameter locationAndBandwidth to determine the frequency position of signals in relation to the frequency as indicated via locationAndBandwidth. The wireless device may keep CORESET 0, for example, until after reception of an RRC setup message (e.g., RRCSetup), RRC resume message (e.g., RRCResume) and/or an RRC re-establishment message (e.g., RRCReestablishment).

The DownlinkConfigCommonSIB IE may comprise parameters of a paging channel configuration. The parameters may comprise a paging cycle value (T, e.g., indicated by defaultPagingCycle IE), a parameter indicating total number (N) of paging frames (PFs) (e.g., indicated by nAndPagingFrameOffset IE) and paging frame offset in a paging DRX cycle (e.g., indicated by parameter PF_offset), a quantity/number (Ns) for total paging occasions (POs) per PF, a first PDCCH monitoring occasion indication parameter (e.g., firstPDCCH-MonitoringOccasionofPO IE) indicating a first PDCCH monitoring occasion for paging of each PO of a PF. The wireless device may monitor a PDCCH for receiving a paging message, for example, based on parameters of a PCCH configuration.

A parameter (e.g., first-PDCCH-MonitoringOccasionOfPO) may be signaled in SIB1 for paging in initial DL BWP. The parameter first-PDCCH-MonitoringOccasionOPO may be signaled in the corresponding BWP configuration, for example, for paging in a DL BWP other than the initial DL BWP.

FIG. 26 shows example RRC configuration parameters. The configuration parameters may be RRC configuration parameters for a downlink BWP of a serving cell. The configuration parameters may be indicated via a higher layer parameter BWP-DownlinkCommon IE. A base station may send/transmit to a wireless device (or a plurality of wireless devices) one or more configuration parameters of a downlink BWP (e.g., initial downlink BWP) of a serving cell. The one or more configuration parameters of the downlink BWP may comprise: one or more generic BWP parameters of the downlink BWP, one or more cell-specific parameters for PDCCH of the downlink BWP (e.g., in pdcch-ConfigCommon IE), one or more cell specific parameters for the PDSCH of the BWP (e.g., in pdsch-ConfigCommon IE), and/or one or more other parameters. A pdcch-ConfigCommon IE may comprise parameters of CORESET 0 (e.g., indicated via parameter controlResourceSetZero) which may be used in any common or wireless device-specific search spaces. A value of the controlResourceSetZero may be interpreted in the same manner as the corresponding bits in MIB parameter pdcch-ConfigSIB1. A pdcch-ConfigCommon IE may comprise parameters (e.g., in commonControlResourceSet) of an additional common control resource set which may be configured and used for any common or wireless device-specific search space. The network may use a parameter ControlResourceSetId other than 0 for this ControlResourceSet, for example, if the network configures commonControlResourceSet. The network may configure the commonControlResourceSet in SIB1 such that the SIB1 is contained within the bandwidth of CORESET 0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., via parameter pagingSearchSpace), a search space for random access procedure (e.g., via parameter ra-SearchSpace), a search space for SIB1 message (e.g., via parameter searchSpaceSIB1), a common search space0 (e.g., via parameter searchSpaceZero), and/or one or more other search spaces.

A CORESET may be associated with a CORESET indicator/index (e.g., indicated via parameter ControlResourceSetId). A CORESET may be implemented based on examples described with respect to FIG. 14A and/or FIG. 14B. The CORESET index 0 may identify a common CORESET configured in MIB and in ServingCellConfigCommon (e.g., indicated via controlResourceSetZero). The CORESET index 0 may not be used in the ControlResourceSet IE. The CORESET index with other values may identify CORESETs configured by dedicated signaling or in SIB1. The controlResourceSetId may be unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET (e.g., in terms of a quantity/number of symbols). Configuration parameters of a CORESET may comprise at least one of: frequency resource indication (e.g., frequencyDomainResources), a CCE-REG mapping type indicator (e.g., cce-REG-MappingType), a plurality of TCI states, and/or an indicator indicating whether a TCI is present in a DCI, etc. The frequency resource indication (e.g., comprising a quantity/number of bits, such as 45 bits, or any other quantity of bits) may indicate frequency domain resources. Each bit of the frequency resource indication may correspond to a group of RBs (e.g., 6 RBs, or any other quantity of RBs), with the grouping starting from the first RB group in a BWP of a cell (e.g., SpCell, SCell). For example, the first (e.g., left-most, most significant) bit may correspond to the first RB group in the BWP, with the other bits sequentially corresponding to other RB groups. A bit that is set to 1 may indicate that an RB group, corresponding to the bit, is contained in the frequency domain resource of the CORESET. Bits corresponding to a group of RBs not fully contained in the BWP within which the CORESET is configured may be set to zero.

FIG. 27 shows an example configuration of a search space. The configuration of the search space may be within a SearchSpace IE. One or more search space configuration parameters of a search space may comprise at least one of: a search space ID (e.g., searchSpaceId), a CORESET indicator (ID) (e.g., controlResourceSetId), a monitoring slot periodicity and offset parameter (e.g., monitoringSlotPeriodicityAndOffset), a search space time duration value (e.g., duration), a monitoring symbol indication (e.g., monitoringSymbolsWithinSlot), a quantity/number of candidates for an aggregation level (e.g., nrofCandidates), and/or a search space type indicating a common search space type or a wireless device-specific search space type (e.g., searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate symbol(s), of a slot, in which a wireless device may monitor a PDCCH on the search space. The control resource set ID may indicate/identify a CORESET on which a search space may be located.

A wireless device, in an RRC idle state (e.g., RRC_IDLE) or in an RRC inactive state (e.g., RRC_INACTIVE), may periodically monitor POs for receiving paging message(s) for the wireless device. The wireless device, in an RRC idle state or an RRC inactive state and before monitoring the POs, may wake up at a time before each PO for preparation and/or to activate (e.g., turn on) all components in preparation of data reception (e.g., warm up stage). The gap between the waking up and the PO may be set to be sufficient to accommodate all the processing requirements. The wireless device may perform, after the warming up, timing acquisition from SSB and coarse synchronization, frequency and time tracking, time and frequency offset compensation, and/or calibration of local oscillator. The wireless device, after warm up, may monitor a PDCCH for a paging DCI via one or more PDCCH monitoring occasions. The wireless device may monitor the PDCCH, for example, based on configuration parameters of the PCCH configuration (e.g., as configured in SIB1). The configuration parameters of the PCCH configuration may be as described with respect to FIG. 25.

Figure 28:
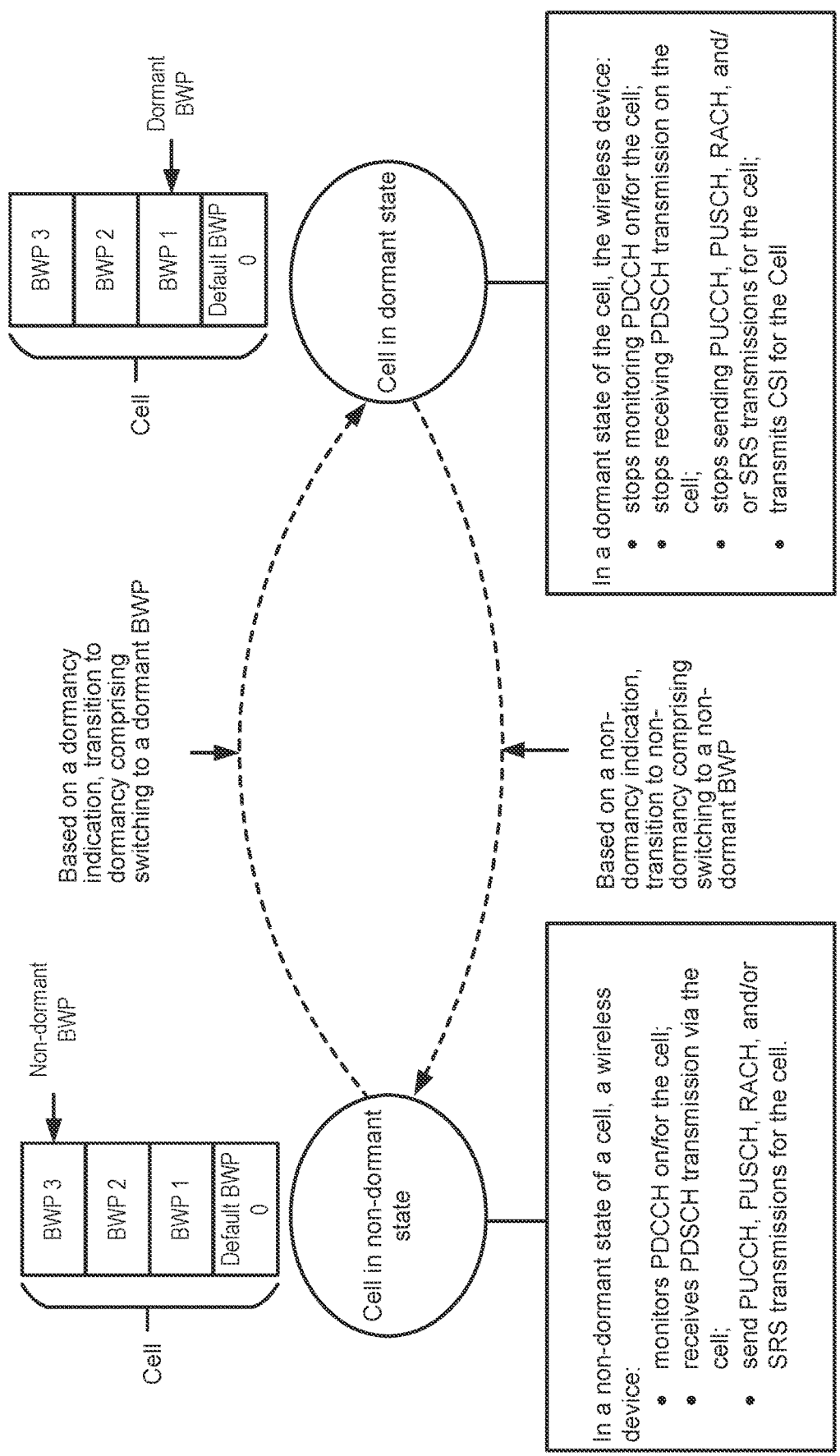
FIG. 28 shows example dormancy management.

FIG. 28 shows example cell dormancy management. Cell dormancy management may comprise transitioning between a dormant state and a non-dormant state. The example transitioning may be for operations on an SCell. A base station may send/transmit, to a wireless device, one or more RRC messages. The one or more RRC messages may comprise configuration parameters of the SCell. The SCell may comprise a plurality of BWPs. Among the plurality of BWPs, a first BWP (e.g., BWP 3) may be configured as a non-dormant BWP, and/or a second BWP (e.g., BWP 1) may be configured as a dormant BWP. A default BWP (e.g., BWP 0) may be configured in the plurality of BWPs. The non-dormant BWP may be a BWP which the wireless device may activate, for example, based on/in response to transitioning the SCell from a dormant state to a non-dormant state. The dormant BWP may be a BWP which the wireless device may switch to based on/in response to transitioning the SCell from a non-dormant state to a dormant state. The configuration parameters may indicate one or more search spaces and/or CORESETs configured on the non-dormant BWP. The configuration parameters may indicate no search spaces or no CORESETs for the dormant BWP. The configuration parameter may indicate CSI reporting configuration parameters for the dormant BWP.

An active BWP for the SCell may be a dormant BWP, a non-dormant BWP, or a default BWP. A default BWP may be different from a dormant BWP. The configuration parameters may indicate one or more search spaces and/or one or more CORESETs configured on the default BWP. A wireless device may switch to the default BWP as an active BWP, for example, if a BWP inactivity timer expires or based on receiving a DCI indicating switching to the default BWP. The wireless device may perform (e.g., if the default BWP is an active BWP), at least one of: monitoring PDCCH on the default BWP of the SCell, receiving a PDSCH transmission via the default BWP of the SCell, sending a PUSCH transmission via the default BWP of the SCell, sending an SRS via the default BWP of the SCell, and/or sending a CSI report (e.g., in a periodic, aperiodic, and/or semi-persistent manner) for the default BWP of the SCell. The wireless device may switch to the dormant BWP as an active BWP of the SCell, for example, if receiving a dormancy/non-dormancy indication indicating a dormant state for a SCell. The wireless device may (e.g., based on/in response to switching to the dormant BWP) perform at least one of: refraining from monitoring a PDCCH on the dormant BWP of the SCell (or for the SCell if the SCell is cross-carrier scheduled by another cell), refraining from receiving a PDSCH transmission via the dormant BWP of the SCell, refraining from sending a PUSCH transmission via the dormant BWP of the SCell, refraining from sending SRS via the dormant BWP of the SCell, and/or sending a CSI report (e.g., periodic, aperiodic, and/or semi-persistent CSI report) for the dormant BWP of the SCell.

A base station may send/transmit, to a wireless device, DCI via a PDCCH resource. The DCI may comprise a dormancy/non-dormancy indication indicating a dormant state or a non-dormant state for the SCell. The wireless device may (e.g., based on the dormancy/non-dormancy indication indicating a dormant state for the SCell): transition the SCell to the dormant state (e.g., if the SCell is in a non-dormant state before receiving the DCI), or maintain the SCell in the dormant state (e.g., if the SCell is in the dormant state before receiving the DCI). Transitioning the SCell to the dormant state may comprise switching to the dormant BWP (e.g., configured by the base station) of the SCell. The wireless device may (e.g., based on the dormancy/non-dormant indication indicating a non-dormant state for the SCell): transition the SCell to the non-dormant state (e.g., if the SCell is in a dormant state before receiving the DCI), or maintain the SCell in the non-dormant state (e.g., if the SCell is in the non-dormant state before receiving the DCI). Transitioning the SCell to the non-dormant state may comprise switching to a non-dormant BWP (e.g., configured by the base station) of the SCell.

The wireless device may switch to the non-dormant BWP (e.g., BWP 3), configured by the base station, as an active BWP of the SCell, for example, based on transitioning the SCell from a dormant state to a non-dormant state. The wireless device may perform (e.g., based on the switching to the non-dormant BWP as the active BWP of the SCell) at least one of: monitoring PDCCH on the active BWP of the SCell (or monitoring PDCCH for the SCell if the SCell is configured to be cross-carrier scheduled by another cell), receiving a PDSCH transmission via the active BWP of the SCell, and/or sending a PUCCH transmission, a PUSCH transmission, a RACH transmission and/or an SRS transmission via the active BWP (e.g., if the active BWP is an uplink BWP).

The wireless device may switch to the dormant BWP (e.g., BWP 1 of the SCell), configured by the base station, for example, based on transitioning the SCell from a non-dormant state to a dormant state. The wireless device may perform (e.g., based on the switching to the dormant BWP of the SCell) at least one of: refraining from monitoring PDCCH on the dormant BWP of the SCell (or refraining from monitoring PDCCH for the SCell if a the SCell is configured to be cross-carrier scheduled by another cell), refraining from receiving a PDSCH transmission via the dormant BWP of the SCell, refraining from sending a PUCCH transmission, a PUSCH transmission, a RACH transmission, and/or an SRS transmission via the dormant BWP (e.g., if the dormant BWP is an uplink BWP), and/or sending a CSI report for the dormant BWP of the SCell (e.g., based on the CSI reporting configuration parameters configured on the dormant BWP of the SCell).

FIG. 29A shows an example power saving operation. The example power saving operation of FIG. 29A may be based on a wake-up indication. A base station may send/transmit one or more messages comprising parameters of a wake-up duration (e.g., a power saving duration, or a power saving channel (PSCH) occasion), to a wireless device. The wake-up duration may be located at (e.g., start from) a time that is a quantity/number of slots (or symbols) before a DRX ON duration of a DRX cycle. The quantity/number of slots (or symbols) may be a gap between a wake-up duration and a DRX ON duration. The quantity of slots may be configured in the one or more RRC messages or may be predefined as a fixed value. The gap may be used for at least one of: synchronization with the base station, measuring reference signals, and/or retuning RF parameters. The gap may be determined based on a capability of the wireless device and/or the base station. The parameters of the wake-up duration may be pre-defined without RRC configuration. The wake-up mechanism may be based on a wake-up indication (e.g., via a PSCH). The parameters of the wake-up duration may comprise at least one of: a PSCH channel format (e.g., numerology, DCI format, PDCCH format), a periodicity of the PSCH, a control resource set, and/or a search space of the PSCH. The wireless device may monitor the PSCH for receiving the wake-up signal during the wake-up duration, for example, if configured with the parameters of the wake-up duration. The wireless device may monitor the PSCH for detecting a wake-up indication during the PSCH occasion/wake-up duration, for example, if configured with the parameters of the PSCH occasion. The wireless device may wake up to monitor PDCCHs in a DRX active time (e.g., comprising DRX ON duration) of a next DRX cycle according to the DRX configuration, for example, based on/in response to receiving the wake-up signal/channel (or a wake-up indication via the PSCH). The wireless device may monitor PDCCHs in the DRX active time (e.g., when drx-onDurationTimer is running), for example, based on/in response to receiving the wake-up indication via the PSCH. The wireless device may go back to sleep if the wireless device does not receive PDCCH transmissions in the DRX active time. The wireless device may stay in a sleep state during the DRX OFF duration of the DRX cycle. The wireless device may skip monitoring PDCCHs in the DRX active time, for example, if the wireless device doesn't receive the wake-up signal/channel (or a wake-up indication via the PSCH) during the wake-up duration (or the PSCH occasion). The wireless device may skip monitoring PDCCHs in the DRX active time, for example, if the wireless device receives, during the wake-up duration (or the PSCH occasion), an indication indicating skipping PDCCH monitoring.

FIG. 29B shows an example of a power saving operation. The power saving operation of FIG. 29B may be based on go-to-sleep indication. The wireless device may go back to sleep and skip monitoring PDCCHs during the DRX active time (e.g., during a next DRX ON duration of a DRX cycle), for example, based on/in response to receiving a go-to-sleep indication via the PSCH. The wireless device may monitor PDCCH during the DRX active time, according to the configuration parameters of the DRX operation, for example, if the wireless device doesn't receive the go-to-sleep indication via the PSCH during the wake-up duration.

The power saving mechanisms of FIGS. 29A and 29B may reduce power consumption for PDCCH monitoring during the DRX active time.

A power saving operation may be based on combining the operations described with respect to FIG. 29A and FIG. 29B. A base station may send/transmit a power saving indication, in DCI via a PSCH, indicating whether the wireless device may wake up for a next DRX ON duration or skip the next DRX ON duration. The wireless device may receive the DCI via the PSCH. The wireless device may wake up for next DRX ON duration, for example, based on/in response to the power saving indication indicating that the wireless device may wake up for next DRX ON duration. The wireless device may monitor PDCCH in the next DRX ON duration in response to the waking up. The wireless device may go to sleep during or skip the next DRX ON duration, for example, based on/in response to the power saving indication indicating the wireless device may skip (or go to sleep) for next DRX ON duration. The wireless device may skip monitoring PDCCH in the next DRX ON duration, for example, based on/in response to the power saving indication indicating the wireless device shall go to sleep for next DRX ON duration. Various examples described with respect to FIG. 28, FIG. 29A, and/or FIG. 29B may be extended and/or combined to further improve power consumption of a wireless device and/or signaling overhead of a base station.

Figure 30A:
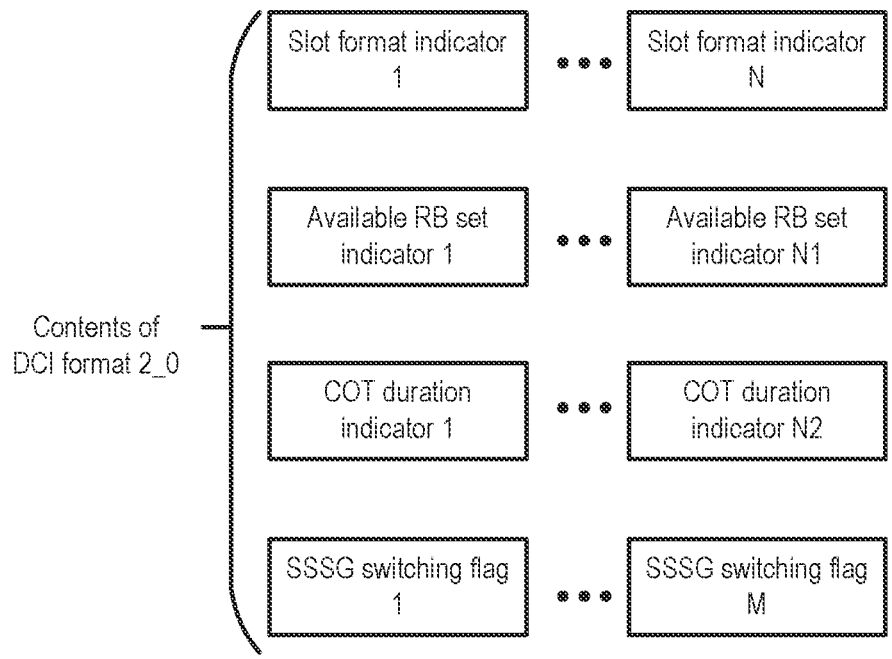
FIG. 30A shows an example DCI format.

FIG. 30A shows an example DCI format. The DCI format may correspond to DCI format 2_0 and may comprise one or more search space set groups (or SSSGs) switching indications (or SSSG switching flags). The DCI format 2_0 may comprise one or more slot format indicators (e.g., slot format indicator 1, slot format indicator 2, . . . slot format indicator N), one or more available RB set indicators, one or more channel occupancy time (COT) duration indications, and/or one or more SSSG switching flags. Each of the one or more SSSG switching flags may correspond to a respective cell group of a plurality of cell groups. Each cell group of the plurality of cell groups may comprise one or more cells. An SSSG switching flag, of the one or more SSSG switching flags, corresponding to a cell group, may indicate switching from a first SSS G to a second SSSG for each cell of the cell group, for example, if the SSSG switching flag is set to a first value. The SSSG switching flag may indicate switching from the second SSSG to the first SSSG for each cell of the cell group, for example, if the SSSG switching flag is set to a second value.

Figure 30B:
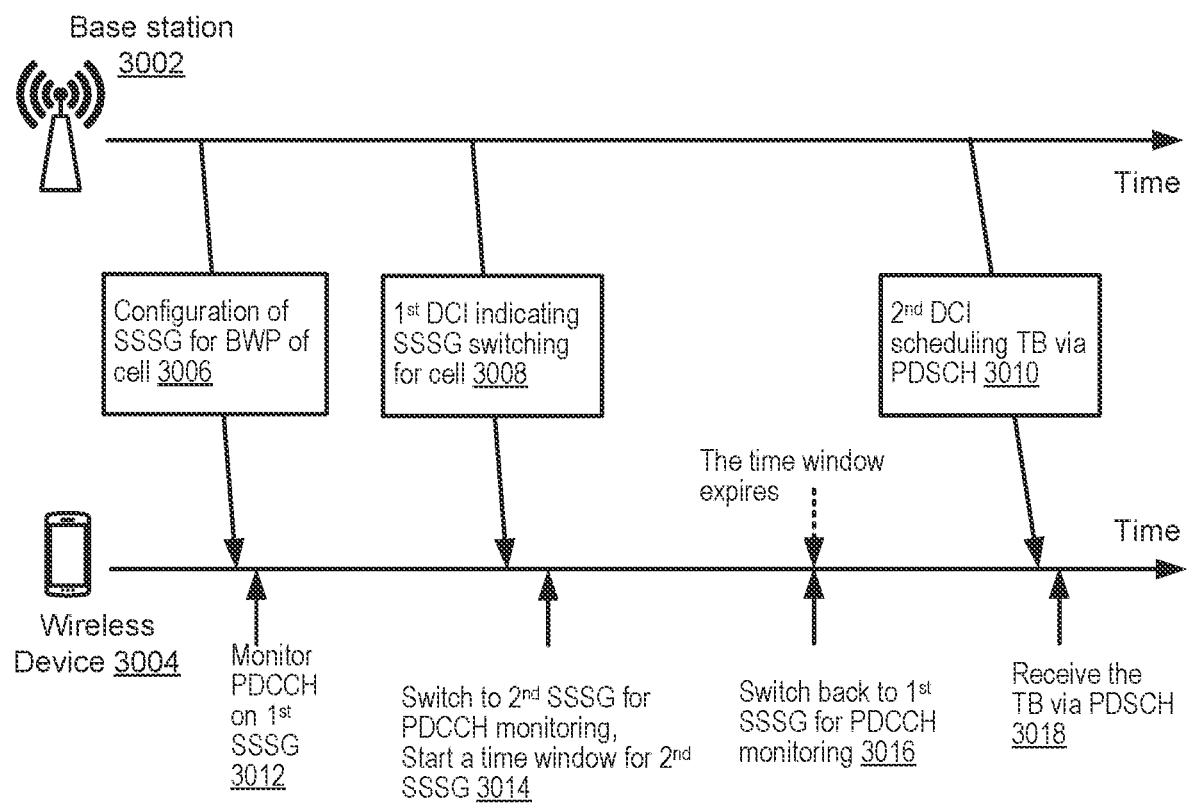
FIG. 30B shows an example search space set (SSS) group switching.

FIG. 30B shows an example SSSG switching. The SSSG switching may be based on DCI (e.g., corresponding to DCI format 2_0, or other DCI formats as described with respect to FIG. 23). A wireless device 3004 may receive configuration 3006 of SSSG for a BWP of a cell. The configuration 3006 may comprise a plurality of parameters. The configuration 3006 may be via RRC messaging and/or SIB1 messaging.

The wireless device 3004 may be provided/indicated with a group indicator/index for a search space set (e.g., a Type3-PDCCH CSS set, a USS set, or any other type of search space set) by a parameter (e.g., searchSpaceGroupIdList, as described with respect to FIG. 27) for PDCCH monitoring on a serving cell.

The wireless device 3004 may or may not be provided/indicated with the parameter searchSpaceGroupIdList for a search space set. The SSSG switching as described with respect to FIG. 30B may not be applicable for PDCCH monitoring on the search space, for example, if the search space set is not configured with searchSpaceGroupIdList. The wireless device 3004 may monitor the search space set on a BWP, without switching away from the search space set, for PDCCH monitoring, for example, if the search space set is not configured with searchSpaceGroupIdList.

SSSG switching as shown in FIG. 30B may apply to all serving cells within each group, for example, if the wireless device 3004 is provided/indicated with parameter cellGroupsForSwitchList (e.g., as described with respect to FIG. 26), indicating one or more groups of serving cells. The SSSG switching as described with respect to FIG. 30B may apply only to a serving cell for which the wireless device 3004 is provided/indicated with parameter searchSpaceGroupIdList, for example, if the wireless device 3004 is not provided/indicated with the parameter cellGroupsForSwitchList. The wireless device 3004 may reset PDCCH monitoring according to search space sets with a specific group index (e.g., group index 0), if provided/indicated with searchSpaceGroupIdList, for example, if a wireless device 3004 is provided/indicated with parameter searchSpaceGroupIdList.

The wireless device 3004 may be provided/indicated with parameter searchSpaceSwitchDelay (e.g., as shown in FIG. 26) with a quantity/number of symbols $P_{switch}$ based on wireless device processing capability (e.g., wireless device processing capability 1, wireless device processing capability 2, etc.) and sub-carrier spacing (SCS) configuration $\mu$. Wireless device processing capability 1 for SCS configuration $\mu$ may apply unless the wireless device 3004 indicates support for wireless device processing capability 2. For example, $P_{switch}$ may be 25 for wireless device capability 1 and $\mu$=0, $P_{switch}$ may be 25 for wireless device capability 1 and $\mu$=1, $P_{switch}$ may be 25 for wireless device capability 1 and $\mu$=2, $P_{switch}$ may be 10 for wireless device capability 2 and $\mu$=0, $P_{switch}$ may be 12 for wireless device capability 2 and $\mu$=1, and $P_{switch}$ may be 22 for wireless device capability 2 and $\mu$=2, etc.

The wireless device 3004 may be provided/indicated with parameter searchSpaceSwitchTimer (in units of slots, e.g., as shown in FIG. 26). The parameter searchSpaceSwitchTimer may be with a timer value for a serving cell for which the wireless device 3004 is provided with the parameter searchSpaceGroupIdList or may be for a set of serving cells indicated by parameter cellGroupsForSwitchList (e.g., if provided). The wireless device 3004 may decrement the timer value by one after each slot based on a reference SCS configuration that is a smallest SCS configuration $\mu$ among all configured downlink BWPs in the serving cell, or in the set of serving cells. The wireless device 3004 may maintain the reference SCS configuration during the timer decrement procedure.

Parameter searchSpaceSwitchTimer may be defined as a value in unit of slots. The parameter searchSpaceSwitchTimer may indicate a time duration for monitoring PDCCH in the active downlink BWP of the serving cell before moving to a default search space group (e.g., search space group 0). The timer value may be based on SCS. A valid timer value may be one of {1, . . . , 20}, for example, if SCS is 15 kHz. A valid timer value may be one of {1, . . . , 40}, for example, if SCS is 30 kHz. A valid timer value may be one of {1, . . . , 80}, for example, if SCS is 60 kHz. The base station may configure a same timer value for all serving cells in a same cell group as indicated by parameter CellGroupForSwitch.

The wireless device 3004 may monitor (e.g., step 3012) PDCCH on a first SSSG (e.g., search space sets with group index 0) based on configuration of SSSG of a BWP of a cell (e.g., via configuration 3006). The wireless device 3004 may be provided/indicated with SearchSpaceSwitchTrigger indicating a location of a SSSG switching flag field for a serving cell as present in DCI (e.g., DCI corresponding to a DCI format 2_0). The parameter SearchSpaceSwitchTrigger may be configured as shown in FIG. 27.

The wireless device 3004 may receive DCI 3008 (e.g., with DCI format 2_0). The DCI 3008 may indicate a SSSG switching for the cell, for example, if a value of the SSSG switching flag field in the DCI 3008 is 1 (or any other predefined value). The wireless device 3004 may switch (e.g., step 3014) to a second SSSG for PDCCH monitoring. The wireless device 3004 may start monitoring PDCCH on the second SSSG (e.g., search space sets with group index 1) and stop monitoring PDCCH on the first SSSG (or the search space sets with group index 0) for the serving cell. The wireless device 3004 may start monitoring PDCCH on the second SSSG (e.g., search space sets with group index 1) and stop monitoring PDCCH on the first SSSG at a first slot that is at least $P_{switch}$ symbols after a last symbol of the PDCCH comprising the DCI. The wireless device 3004 may start window (e.g., start a search space switching timer), for example, based on switching to the second SSSG. The wireless device 3004 may set the timer value of the search space switching timer to the value provided/indicated by parameter searchSpaceSwitchTimer, for example, based on receiving the DCI.

The wireless device 3004 may monitor PDCCH on the second SSSG (e.g., search space sets with group index 1) based on configuration of SSSGs of a BWP of a cell. The wireless device 3004 may be indicated, via parameter SearchSpaceSwitchTrigger, a location of a SSSG switching flag field for a serving cell in DCI (e.g., corresponding to DCI format 2_0). The wireless device 3004 may receive DCI. The DCI may indicate SSSG switching for the cell, for example, if a value of the SSSG switching flag field in the DCI is 0. The wireless device 3004 may start monitoring PDCCH on search space sets with group index 0 and stop monitoring PDCCH on search space sets with group index 1 for the serving cell, for example, if a value of the SSSG switching flag field in the DCI is 0. The wireless device 3004 may start monitoring the PDCCH on search space sets with group index 0 and stop monitoring PDCCH on search space sets with group index 1 at a first slot that is at least $P_{switch}$ symbols after the last symbol of the PDCCH comprising the DCI.

The wireless device 3004 may start monitoring PDCCH for the serving cell on the second SSSG (e.g., search space sets with group index 0), and stop monitoring PDCCH on the first SSSG (e.g., search space sets with group index 1), for example, if the wireless device 3004 initially monitors PDCCH for the serving cell on the first SSSG. The wireless device 3004 may start monitoring PDCCH for the serving cell on the second SSSG and stop monitoring PDCCH on the first SSSG at the beginning of the first slot that is at least $P_{switch}$ symbols after a slot where the timer expires or after a last symbol of a remaining channel occupancy duration for the serving cell (e.g., as indicated by the DCI 3008).

The wireless device 3004 may or may not be provided/indicated with parameter SearchSpaceSwitchTrigger for a serving cell. For example, the parameter SearchSpaceSwitchTrigger may be absent in configuration parameters corresponding to SlotFormatIndicator (e.g., wherein SlotFormatIndicator is configured for monitoring a Group-Common-PDCCH for Slot-Format-Indicators (SFI)). The DCI 3008 (e.g., corresponding to DCI format 2_0) may not comprise a SSSG switching flag field, for example, based on the parameter SearchSpaceSwitchTrigger not being provided. The wireless device 3004 may start monitoring PDCCH on the second SSSG (e.g., a search space sets with group index 1) and stop monitoring PDCCH according on the first SSSG (e.g., a search space set with group index 0) for the serving cell, for example, if the parameter SearchSpaceSwitchTrigger is not provided and if the wireless device 3004 detects DCI based on monitoring PDCCH on the first SSSG. The wireless device 3004 may start monitoring PDCCH on the second SSSG and stop monitoring PDCCH on the first SSSG at a first slot that is at least $P_{switch}$ symbols after the last symbol of the PDCCH comprising the DCI. The wireless device 3004 may set (or restart) the timer value to the value provided by parameter searchSpaceSwitchTimer, for example, if the wireless device 3004 detects DCI based on monitoring PDCCH in any search space set.

The wireless device 3004 may or may not be provided/indicated with parameter SearchSpaceSwitchTrigger for a serving cell. The wireless device 3004 may start monitoring PDCCH for the serving cell according to the second SSSG (e.g., search space sets with group index 0), and stop monitoring PDCCH according to the first SSSG (e.g., a search space sets with group index 1), for the serving cell, for example, if the parameter SearchSpaceSwitchTrigger is not provided and if the wireless device 3004 initially monitors PDCCH for a serving cell according to the first SSSG. The wireless device 3004 may start monitoring PDCCH for the serving cell according to the second SSSG and stop monitoring PDCCH according to the first SSSG at the beginning of the first slot that is at least $P_{switch}$ symbols after a slot where the timer expires. The wireless device 3004 may start monitoring PDCCH for the serving cell according to the second SSSG and stop monitoring PDCCH according to the first SSSG after a last symbol of a remaining channel occupancy duration for the serving cell that is indicated by DCI format 2_0, for example, if the wireless device 3004 is provided with a search space set to monitor PDCCH for detecting a DCI format 2_0.

The wireless device 3004 may switch back to the first SSSG for PDCCH monitoring (e.g., step 3016), for example, based on/after an expiration of the timer. The wireless device 3004 may start monitoring PDCCH on the first SSSG and stop monitoring PDCCH on the second SSSG, for example, based on expiration of the timer. The wireless device 3004 may receive second DCI 3010 based on the PDCCH monitoring. The second DCI 3010 may schedule a TB via a PDSCH. The wireless device 3004 may receive (e.g., step 3018) the TB via the PDSCH and based on the scheduling indicated via the second DCI 3010.

The wireless device 3004 may determine a slot and a symbol in a slot to start or stop PDCCH monitoring on search space sets for a serving cell for which the wireless device 3004 is provided/indicated with parameter searchSpaceGroupIdList. The wireless device 3004 may start or stop PDCCH monitoring on search space sets for a serving cell if parameter cellGroupsForSwitchList is provided/indicated for a set of serving cells, based on the smallest SCS configuration µ among all configured downlink BWPs. The downlink BWPs may be in the serving cell or in the set of serving cells and, if any, in the serving cell where the wireless device 3004 receives a PDCCH transmission and detects a corresponding DCI format 2_0 (e.g., triggering the start or stop of PDCCH monitoring on search space sets).

Figure 31:
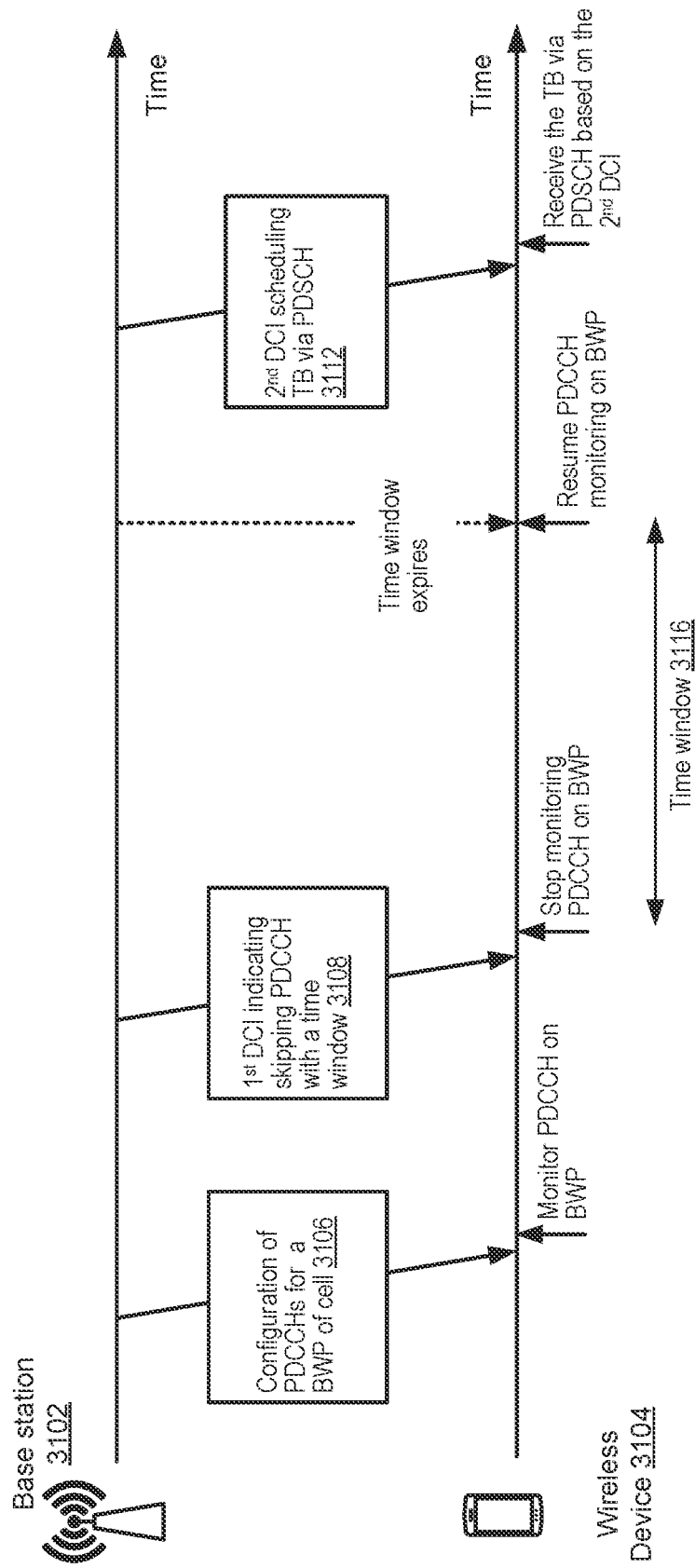
FIG. 31 shows an example PDCCH skipping-based power saving operation.

FIG. 31 shows an example PDCCH skipping-based power saving operation. A base station 3102 may send/transmit, to a wireless device 3104, one or more RRC messages comprising configuration parameters 3106. The configuration parameters 3106 may be for a PDCCH for a BWP of a cell (e.g., as described with respect to FIG. 26 and/or FIG. 27). The wireless device 3104 may monitor PDCCH on the BWP, for example, based on the configuration parameters 3106 of the PDCCH. The BWP may a downlink BWP which may be in an active state. The wireless device 3104 may activate the BWP as described with respect to FIG. 22.

The wireless device 3104 may receive first DCI 3108 indicating skipping the PDCCH (e.g., monitoring/receiving via the PDCCH) within a time window 3116. A time value (e.g., duration) for the time window 3116 may be indicated by the first DCI 3108 or configured by the one or more RRC messages. The wireless device 3104 may stop monitoring the PDCCH on the BWP, for example, based on/in response to receiving the first DCI 3108. Stopping monitoring PDCCH on the BWP may comprise stopping monitoring the PDCCH on one or more SSSGs configured on the BWP. The wireless device 3104 may maintain an active state of the BWP. The first DCI 3108 may not indicate an active BWP switching. The base station 3102 may not send/transmit a PDCCH transmission to the wireless device 3104, for example, within/during the time window 3116 (or when a timer associated with the time window 3116 is running).

The wireless device 3104 may resume PDCCH monitoring on the BWP, for example, based on/after the expiration of the time window 3116. The wireless device 3104 may receive second DCI 3112 scheduling TB via a PDSCH, for example, based on resuming PDCCH monitoring. The wireless device 3104 may receive the TB via the PDSCH scheduled by the second DCI 3112. The base station 3102 may send/transmit the second DCI 3112 to the wireless device 3104, for example, based on/in response to expiration of the time window 3116.

Figure 32A:
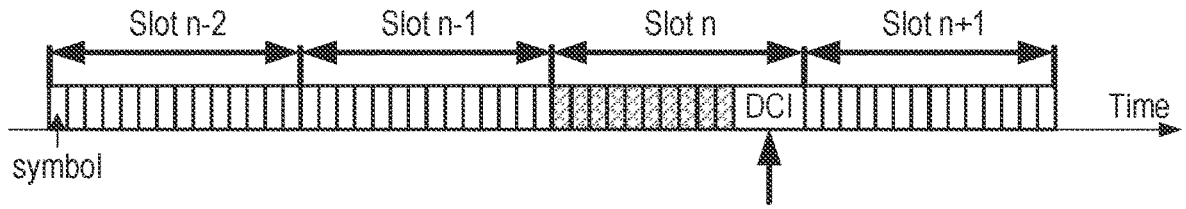
FIG. 32A shows an example downlink pre-emption.

FIG. 32A shows an example downlink pre-emption. A base station may send/transmit an RRC message comprising one or more parameters to a plurality of wireless devices. The one or more parameters may indicate a first RNTI value (e.g., INT-RNTI) for detecting first group-common DCI. The first group-common DCI may comprise a downlink pre-emption indication. The first RNTI may be different from wireless device-specific RNTI for any wireless device of the plurality of wireless devices. The RRC message may further comprise/indicate a CORESET and/or a search space (e.g., common search space or wireless device-specific search space) for detecting the group-common DCI containing the downlink pre-emption indication.

The base station may send/transmit, via the CORESET and/or the search space, the first group-common DCI. The first group-common DCI may have a corresponding DCI format (e.g., DCI format 2_1 dedicated for downlink pre-emption indication) and may comprise CRC scrambled by the INT-RNTI. The first group-common DCI may comprise fields indicating whether one or more downlink radio resources are pre-empted or not. The one or more downlink radio resources may be indicated in the at least one message (e.g., the RRC message).

The base station may transmit the first group-common DCI at the end of a slot (e.g., as shown in FIG. 32A). The first group-common DCI may indicate first downlink resources that are pre-empted. The first downlink resources may be symbols before/prior to the symbol during which the wireless device receives the first group-common DCI (e.g., the shallowed boxes in FIG. 32A). The base station may transmit other downlink signals (e.g., for urgent data packets) by using the pre-empted resources, for example, based on the downlink pre-emption indications of the first group-common DCI. A wireless device, which originally may be allocated second downlink resources comprising the first downlink resources before receiving the first group common DCI, may decode the data by using the remaining resources of the second downlink resources (e.g., resources that do not include the pre-empted first downlink resources), for example, based on receiving the first group-common DCI indicating the downlink pre-emption for the first downlink resources.

The first group-common DCI with DCI format 2_1 may comprise a downlink pre-emption indication. Each bit of the downlink pre-emption indication may correspond to one of the one or more downlink radio resources. A correspondence between a bit in the downlink pre-emption indication and a downlink radio resource may be indicated by the RRC message. A downlink radio resource associated with the bit of the downlink pre-emption indication may be pre-empted, for example, if a bit of the downlink pre-emption indicator is set to a first value (e.g., one). A downlink radio resource associated with the bit of the downlink pre-emption indication may be not pre-empted, for example, if a bit of the downlink pre-emption indicator is set to a second value (e.g., zero).

The first group-common DCI may comprise multiple pre-emption indicators, with each indicator being associated with a corresponding cell of multiple cells, for example, if multiple cells are configured. Based on the operations described with respect to FIG. 32A, a base station may prioritize downlink transmission for urgent data packets (e.g., associated with ultra-reliable low latency communications (URLLC), vehicle-to-everything (V2X) communications, etc.) by pre-empting downlink resources for ongoing low-priority downlink transmission. The pre-empted downlink resources may be then used for the transmission of the urgent data packets.

Figure 32B:
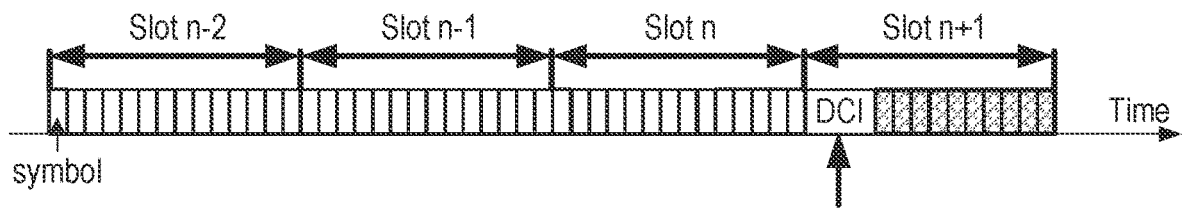
FIG. 32B shows an example uplink cancellation.

FIG. 32B shows an example uplink cancellation. A base station may send/transmit an RRC message to a plurality of wireless devices. The RRC message may comprise parameters indicating a second RNTI value (e.g., CI-RNTI) for detecting a second group-common DCI. The second group-common DCI may comprise an uplink cancellation indication. The second RNTI may be different from a wireless device-specific RNTI for any wireless device of the plurality of wireless devices, or the INT-RNTI used for downlink pre-emption indication. The RRC message may further comprise/indicate a CORESET and/or a search space (e.g., common search space or wireless device-specific search space) for detecting the second group-common DCI. The CORESET and/or the search space for the second group common DCI for uplink cancellation indication may be same as or different from the CORESET and/or the search space for the first group common DCI for downlink pre-emption indication.

The base station may send/transmit the second group-common DCI via the CORESET and/or the search space associated with the uplink cancellation indication. The second group-common DCI may have a corresponding DCI format (e.g., DCI format 2_4 dedicated for uplink cancellation indication) and may comprise CRC scrambled by the CI-RNTI. The second group-common DCI may comprise fields indicating whether one or more uplink radio resources are cancelled or not. The one or more uplink radio resources may be indicated in the at least one message (e.g., the RRC message).

The base station may transmit the second group-common DCI at the beginning of a slot (e.g., slot n+1, as shown in FIG. 32B). The second group-common DCI may indicate first uplink resources that are cancelled (e.g., the shallowed boxes in FIG. 32B). For example, the first uplink resources may be symbols after/following the symbol in which the wireless device may receive the second group-common DCI. The base station may schedule other uplink signals (e.g., for urgent data packets), via the first uplink resources, for example, based on the uplink cancellation indications by the second group common DCI and the cancelled transmission on the first resources. A wireless device, which originally may be allocated second uplink resources (e.g., comprising the first uplink resources), before receiving the second group-common DCI indicating the uplink cancellation of the first uplink resources, may transmit the uplink signals via the remaining resources of the second uplink resources (e.g., via the second uplink resources that exclude the cancelled first uplink resources).

Each bit of the uplink cancellation indication, in the second group common DCI with DCI format 2_4, may correspond to one of the one or more uplink radio resources. The correspondence between a bit in the uplink cancellation indication and an uplink radio resource may be indicated by the RRC message. An uplink radio resource associated with the bit of the uplink cancellation indication may be cancelled, for example, if a bit of the uplink cancellation indicator is set to a first value (e.g., one). An uplink radio resource associated with the bit of the uplink cancellation indicator may be not cancelled, for example, if a bit of the uplink cancellation indicator is set to a second value (e.g., zero).

The second group common DCI may comprise multiple uplink cancellation indicators, for example, if multiple cells are configured for communication. Each indicator is with a corresponding cell of the multiple cells. Based on the operations described with respect to FIG. 32B, the base station may prioritize uplink transmission for urgent data packets (e.g., URLLC, V2X communications, etc.) by cancelling uplink resources for ongoing low-priority uplink transmission. The cancelled uplink resources may then be used for scheduling of transmission of the urgent uplink data packets.

FIG. 33 shows an example slot format indication. A base station may indicate, to a wireless device, a slot format for one or more slots. The base station may indicate the slot format using a third group common DCI (e.g., comprising CRC scrambled by a slot format indication (SFI)-RNTI). The slot format may indicate whether a symbol of the one or more slots is a downlink symbol, an uplink symbol, or a flexible symbol. The third group common DCI may be different from the first group common DCI and the second group common DCI.

A base station may send/transmit, via a symbol and to a wireless device, one or more downlink signals (e.g., SSB, PBCH transmissions, CSI-RS, DM-RS, PDSCH transmission, and/or PDCCH transmission), for example, if the symbol is indicated as a downlink symbol. A wireless device may send/transmit, via the symbol and to a base station, one or more uplink signals (e.g., PRACH transmissions, DM-RS, PUSCH transmissions, PUCCH transmissions, and/or SRS), for example, if a symbol is indicated as an uplink symbol.

The wireless device may determine that a symbol is a downlink symbol, for example, if the symbol is indicated as a flexible symbol, and if the wireless device detects DCI (e.g., before or after receiving the third group common DCI) indicating to the wireless device to receive a PDSCH transmission or CSI-RS via the symbol. The DCI may have a DCI format different from the third group common DCI with CRC scrambled by the SFI-RNTI. The wireless device may receive the PDSCH transmission or CSI-RS via the symbol.

The wireless device may determine that a symbol is an uplink symbol, for example, if the symbol is indicated as a flexible symbol, and if the wireless device detects DCI, a RAR uplink grant, a fallback RAR uplink grant, or a success RAR grant indicating to the wireless device to send a PUSCH transmission, a PUCCH transmission, a PRACH transmission, or SRS via the symbol. The DCI may have a DCI format different from the third group common DCI. The wireless device may send the PUSCH transmission, PUCCH transmission, PRACH transmission, or the SRS via the symbol.

The wireless device may neither transmit nor receive via a symbol, for example, if the symbol is indicated as a flexible symbol, and if the wireless device does not detect DCI indicating, to the wireless device, to receive a PDSCH transmission or a CSI-RS, or if the wireless device does not detect DCI, a RAR uplink grant, a fallback RAR uplink grant, or a success RAR uplink grant indicating to the wireless device to transmit a PUSCH transmission, a PUCCH transmission, a PRACH transmission, or an SRS via the symbol.

A wireless device may be configured with a list of slot format configurations for a slot. For example, the wireless device may be preconfigured with the list, or the list may be indicated via RRC messages. A slot format configuration may indicate a slot format. Each slot format configuration may indicate formats of each symbol of a slot, (e.g., downlink (D), uplink (U) or flexible (F)). For example, for slot format configuration 0 (or format 0 as shown in FIG. 33), symbols 0 to 13 of a slot may be {D, D, D, D, D, D, D, D, D, D, D, D, D, D}, and for slot format configuration 1 (format 1 as shown in FIG. 33), symbols 0 to 13 of the slot may be {U, U, U, U, U, U, U, U, U, U, U, U, U, U}. Some entries (e.g., formats 55-254) of the list may be reserved (e.g., with no indication of the slot format). Some entries (e.g., format 255) may indicate that the wireless device may determine the slot format based on other indications (e.g., parameters such as tdd-UL-DL-ConfigurationCommon or tdd-UL-DL-ConfigurationDedicated, and/or based on a detected DCI format.).

A base station may send/transmit to the wireless device group common DCI (e.g., DCI with SFI-RNTI). The group-common DCI may indicate one of the list of the slot format configurations for a slot or multiple slots.

Figure 34:
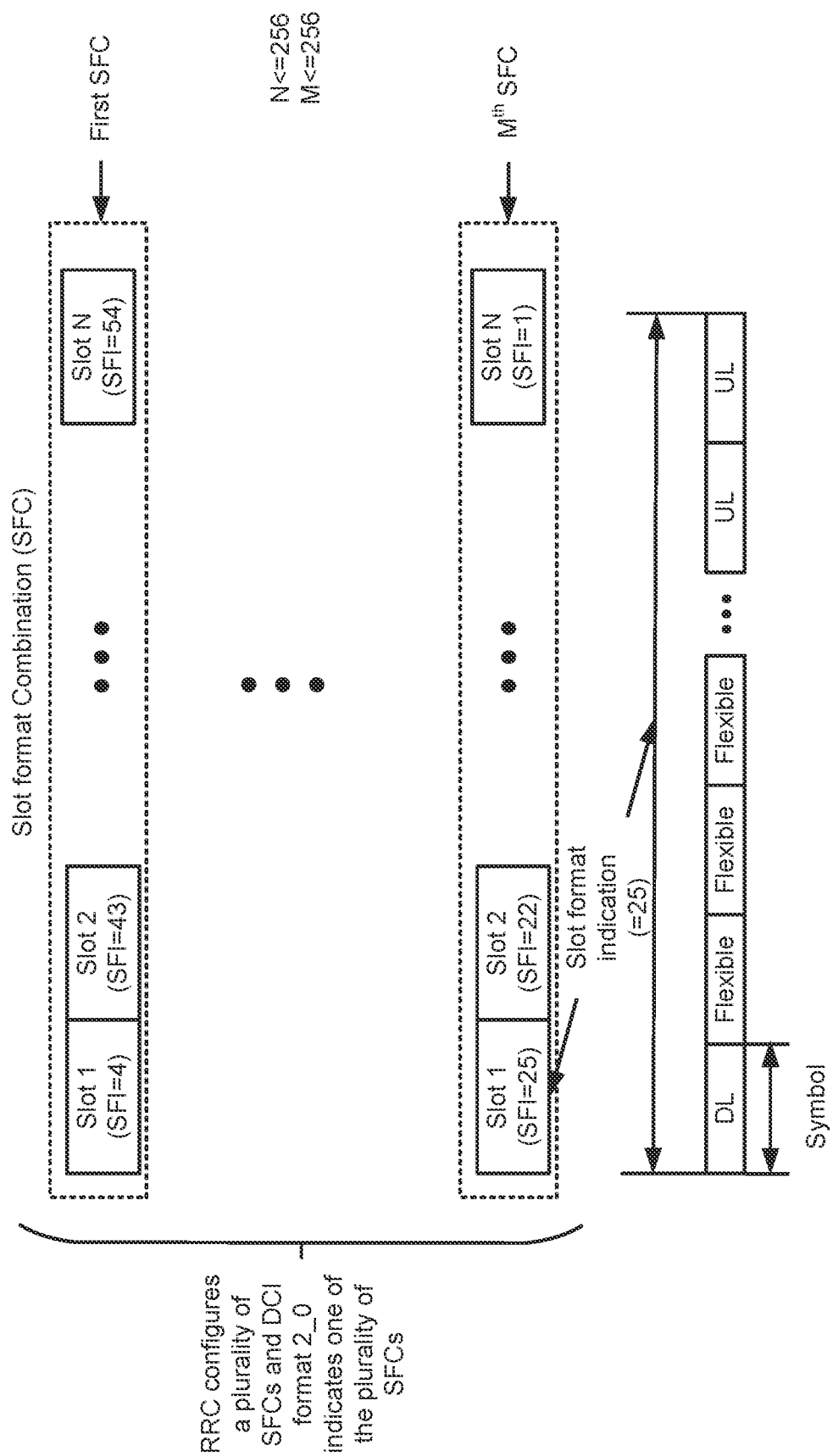
FIG. 34 shows example of slot format indications for a plurality of slots.

FIG. 34 shows example slot format indications for a plurality of slots. A base station may send/transmit, to a wireless device, one or more RRC messages. The one or more RRC messages may comprise configuration parameters indicating a plurality of slot format combinations (SFCs) (e.g., M SFCs) for a plurality of slots (e.g., N slots). M and/or N may be less than or equal to 256 (or any other quantity). Each of the plurality of SFCs may indicate a combination of slot formats for the plurality of slots. A first SFC, as shown in FIG. 34, may indicate that a slot format of slot 1 is 4. Symbol configuration of symbols of a slot (e.g., whether a symbol is downlink, uplink, or flexible), indicated with slot format 4, may be as described with respect to FIG. 33. The first SFC may indicate that slot format for slot 2 is 43. The first SFC may similarly indicate slot formats for N slots. An $M^{th}$ SFC may indicate that slot format of slot 1 is 25, slot format of slot 2 is 22, etc. Symbol configuration (e.g., whether a symbol is downlink, uplink, or flexible) of each symbol of a slot, with a specific slot format, may be as described with respect to FIG. 33.

A base station may send/transmit to a wireless device (or a plurality of wireless devices), a third group-common DCI (e.g., different from a first group-common DCI for downlink pre-emption or a second group-common DCI for uplink cancellation). The third group-common DCI may comprise an SFI indicator/index. The SFI index may indicate one of the plurality of SFCs for a plurality of slots. The plurality of slots may start from a same slot via which the base station transmits, or the wireless device receives, the third group-common DCI. The SFI index may be an 8-bit field, for example, if the total quantity/number of the SFCs is greater than 128 and equal to or less than 256. The SFI index may be a 7-bit field, for example, if the total quantity/number of the SFCs is greater than 64 and equal to or less than 128. The SFI index may be indicated via a field comprising any other quantity of bits.

The wireless device may determine, for each slot of a plurality of slots, symbol configurations based on a slot format corresponding to the slot, for example, based on receiving the third group-common DCI comprising the SFI index. For example, as shown in FIG. 34, the wireless device may determine that slot 1 has slot format 4, slot 2 has slot format 43 . . . slot N has slot format 54, based on/in response to the third group-common DCI indicating first SFC. The wireless device may determine a direction of traffic (e.g., downlink, uplink, or flexible) associated with a symbol, of each slot, in accordance with a slot format configuration associated with a corresponding slot format of each slot (e.g., as described with respect to FIG. 33). The wireless device may determine a starting slot of the plurality of slots as the same slot via which the wireless device may receive the third group-common DCI.

A base station may send/transmit one or more SSBs (e.g., periodically) to a wireless device or a plurality of wireless devices. The wireless device (in RRC idle state, RRC inactive state, or RRC connected state) may use the one or more SSBs for time and frequency synchronization with a cell of the base station. An SSB, comprising a PSS, a SSS, a PBCH, and/or a PBCH DM-RS, may be sent/transmitted (e.g., as described with respect to FIG. 11A). An SSB may occupy a quantity/number (e.g., 4, or any other quantity) of OFDM symbols. The base station may send/transmit one or more SSBs in an SSB burst (e.g., to enable beam-sweeping for PSS/SSS and PBCH). An SSB burst may comprise a set of SSBs, with each SSB potentially being transmitted via a corresponding different beam. SSBs, in the SSB burst, may be transmitted using time-division multiplexing. An SSB burst may be within a time window (e.g., a 5 ms window, or a window of any other duration) and may be either located in first-half or in the second-half of a radio frame (e.g., with a duration of 10 ms, or any other duration). An SSB burst may be equivalently referred to as a transmission window (e.g., 5 ms, or any other time duration) in which the set of SSBs are transmitted.

The base station may indicate a transmission periodicity of SSB via an RRC message (e.g., a SIB1 message). For example, the transmission periodicity may be indicated using parameter ssb-PeriodicityServingCell as present in ServingCellConfigCommonSIB of a SIB1 message (e.g., as shown in FIG. 25). A candidate value of the transmission periodicity may be in a range of {5 ms, 10 ms, 20 ms, 40 ms, 80 ms, 160 ms}. The transmission periodicity may have any other value. A maximum quantity/number of candidate SSBs ($L_{max}$) within an SSB burst may depend on a carrier frequency/band of the cell. For example, $L_{max}=4$ if $f_c<=3$ GHz. $L_{max}=8$ if 3 GHz<$f_c$<=6 GHz. $L_{max}$ 64 if $f_c>=6$ GHz, etc., wherein $f_c$ may be the carrier frequency of the cell. A starting OFDM symbol indicator/index, of a candidate SSB (e.g., occupying 4 OFDM symbols) within an SSB burst (e.g., comprised in a 5 ms time window), may depend on an SCS and a carrier frequency band of the cell.

FIG. 35 shows example SSB configurations. FIG. 35 shows an example table for determination of a starting OFDM symbol index of candidate SSBs. OFDM starting symbols may be determined as a function of a SCS and carrier frequency. For example, starting OFDM symbol indexes of SSBs in an SSB burst, for a cell configured with 15 kHz SCS and carrier frequency fc<3 GHz (e.g., $L_{max}=4$), may be 2, 8, 16, and 22. OFDM symbols in a half-frame may be indexed with the first symbol of the first slot being indexed as 0. Starting OFDM symbol indexes of SSBs in an SSB burst, for a cell configured with 15 kHz and carrier frequency 3 GHz<fc<6 GHz ($L_{max}=8$) may be 2, 8, 16, 22, 30, 36, 44 and 50. Starting OFDM symbol indexes for other SCSs and carrier frequencies may be similarly determined in accordance with the table shown in FIG. 35. The base station may send/transmit only one SSB by using the first SSB starting position, for example, if the base station is not transmitting the SSBs with beam forming.

Figure 36:
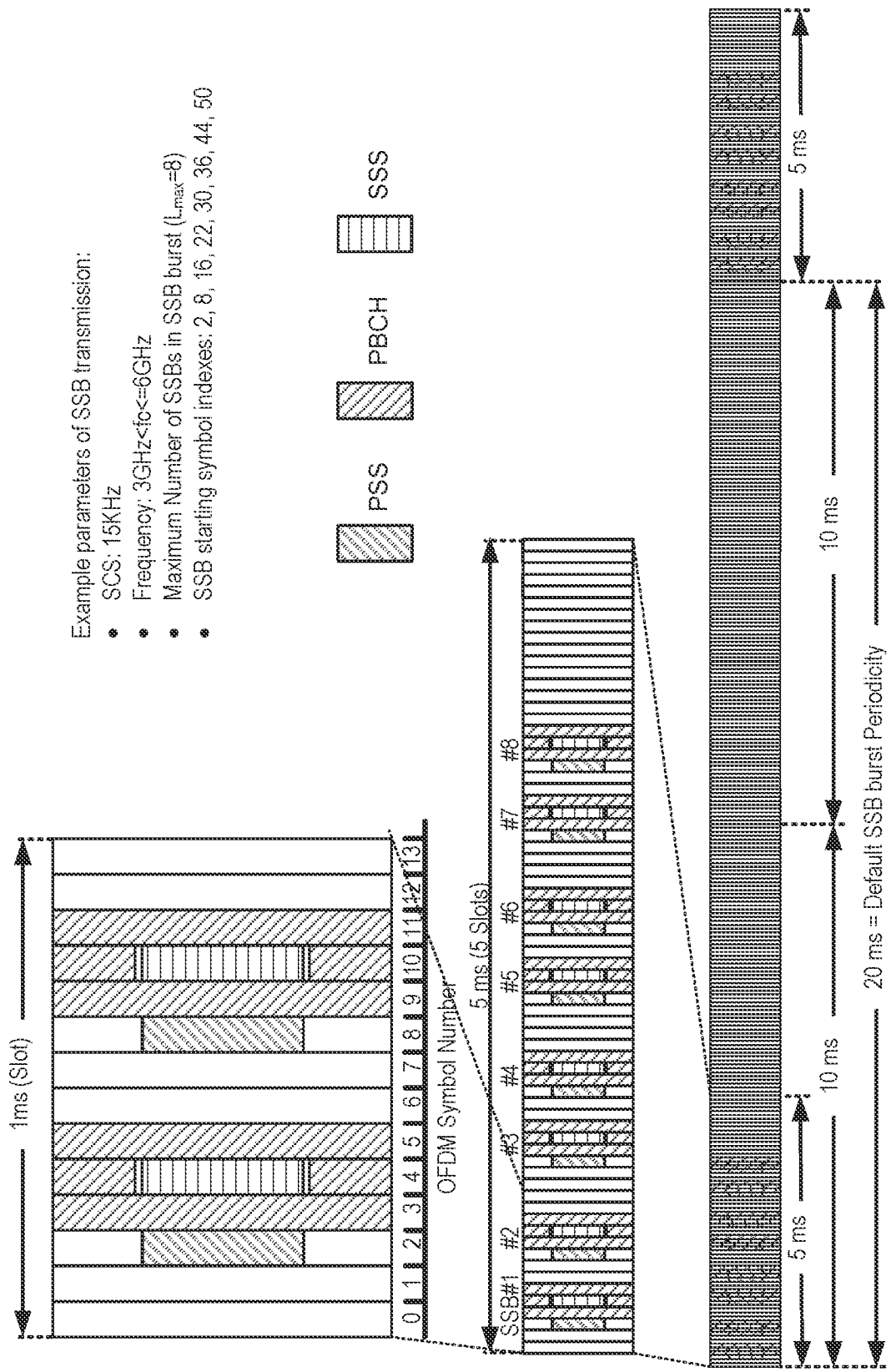
FIG. 36 shows example SSB transmissions.

FIG. 36 shows an example SSB transmission in a cell by a base station. An SCS of the cell may be 15 kHz, and the cell may be configured with carrier frequency $f_c$, such that 3 GHz<fc<=6 GHz. A maximum quantity of candidate SSBs in an SSB burst may be 8 ($L_{max}=8$), for example, based on the value of $f_c$. Starting symbols for SSB transmission may be determined in accordance with the table shown in FIG. 35. SSB #1 may start at symbol 2 (of 70 symbols included in 5 ms half-frame), SSB #2 may start at symbol #8, SSB #3 may start at symbol #16, SSB #4 may start at symbol #22, SSB #5 may start at symbol #30, SSB #6 may start at symbol #36, SSB #7 may start at symbol #44, and SSB #8 may start at symbol 50. The SSB burst may be transmitted in the first half (and not the second half) of a radio frame (with 10 ms duration).

The SSB burst (and each SSB of the SSB burst) may be transmitted with a periodicity. A default periodicity of an SSB burst may be 20 ms (e.g., as shown in FIG. 36, or any other duration of time). The default transmission periodicity may be a periodicity, for example, before a wireless device may receive a SIB1 message for initial access of the cell. For example, the base station, with 20 ms transmission periodicity of SSB (or SSB burst), may transmit the SSB burst in the first 5 ms of each 20 ms period. The base station may not transmit the SSB burst in the rest 15 ms of the each 20 ms period.

A base station may transmit RRC messages (e.g., SIB1 messages) indicating cell specific configuration parameters of SSB transmission. The cell specific configuration parameters may comprise a value for a transmission periodicity (e.g., parameter ssb-PeriodicityServingCell) of an SSB burst and locations (e.g., presence) of SSBs (e.g., active SSBs), of a plurality of candidate SSBs, in the SSB burst. The plurality of candidate SSBs (e.g., starting symbols of candidate SSBs) may be determined as described with respect to FIG. 35. The cell specific configuration parameters may comprise a position indication of an SSB in an SSB burst (e.g., parameter ssb-PositionsInBurst). The position indication may comprise a first bitmap (e.g., groupPresence) and a second bitmap (e.g., inOneGroup) indicating locations/presence of SSBs in an SSB burst.

Carrier frequency $f_c$ and SCS may determine a maximum quantity of candidate SSBs in an SSB burst (e.g., as described with respect to FIG. 35). The position indication (e.g., parameter ssb-PositionsInBurst) may indicate SSBs (e.g., active SSBs, positions of the active SSBs), of a plurality of candidate SSBs, that are sent/transmitted in the SSB burst (e.g., as further described with respect to FIG. 37). A base station may indicate the transmitted active SSBs and/or a quantity of the active SSBs, in an SSB burst, using the position indication (e.g., parameter ssb-PositionsInBurst). The position indication may be transmitted by the base station, for example, via an RRC message and/or DCI.

Figure 37:
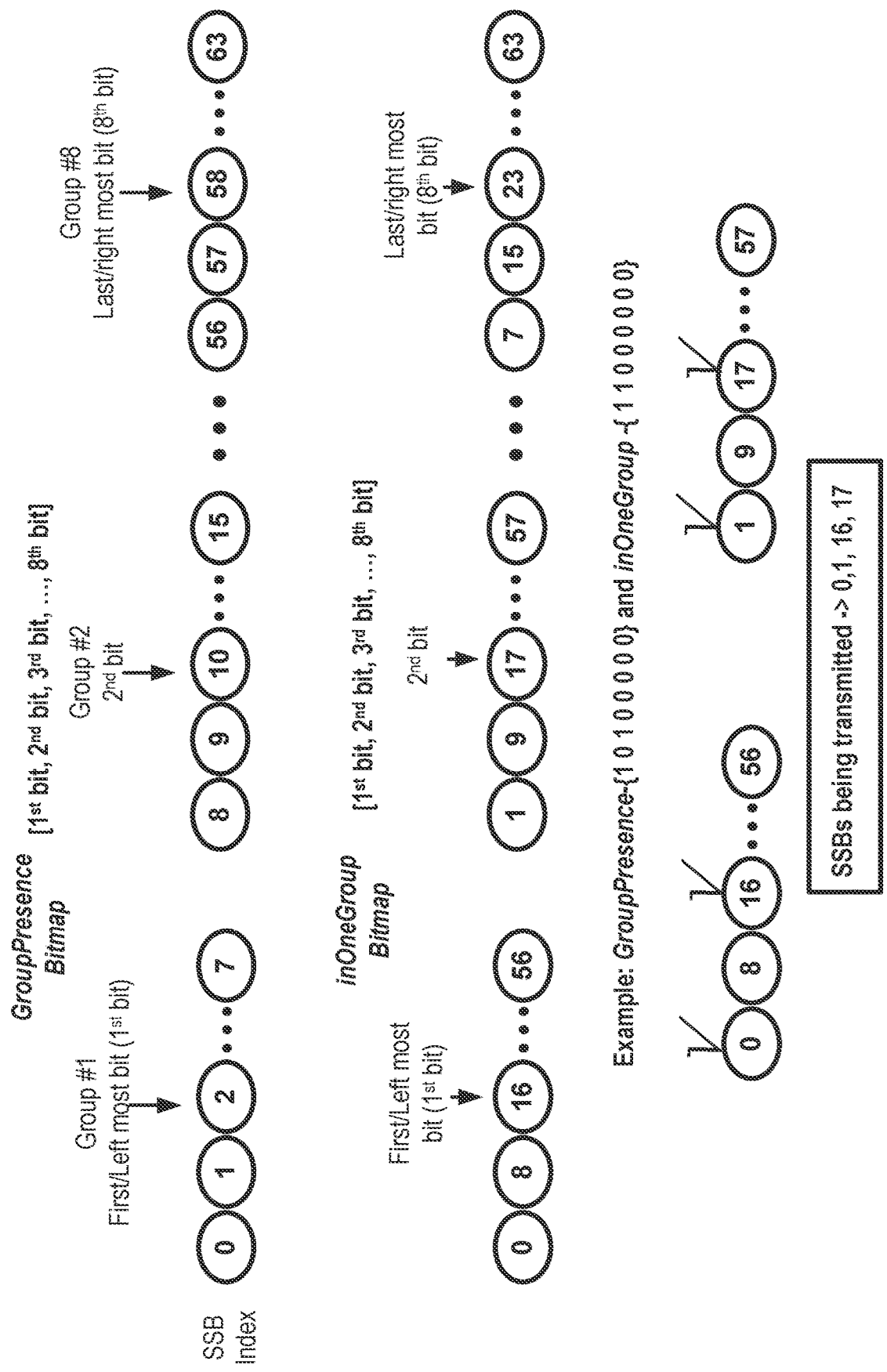
FIG. 37 shows an example indication of SSB location in an SSB burst.

FIG. 37 shows an example indication of SSB location in an SSB burst. Indication of SSB location may be in form of an indication of a presence of an SSB group among a plurality of SSB groups. Each group may comprise a subset of a plurality of candidate SSBs (e.g., maximum possible quantity of candidate SSBs) in an SSB burst. For example, a maximum possible quantity of candidate SSBs in an SSB burst may be equal to 64 (e.g., for SCS=120 kHz or 240 kHz, and $f_c$>6 GHz). The candidate SSBs in the SSB burst may comprise SSBs with indexes from 0 to 63. The candidate SSBs in an SSB burst may be divided into SSB groups.

A first bitmap (e.g., parameter groupPresence) may comprise a quantity of bits (e.g., 8, or any other quantity). The first bitmap may be configured/indicated by the SIB1 message. Each bit of the first bitmap may correspond to a respective group of SSB groups. As shown in FIG. 37, a first bit (e.g., left most bit of the first bitmap) may correspond to a first SSB group comprising $1^{st}$ SSB (with SSB index 0), $2^{nd}$ SSB (with SSB index 1), . . . and $8^{th}$ SSB (with SSB index 7). A second bit (e.g., the second bit of the first bitmap) may correspond to a second SSB group comprising $9^{th}$ SSB (with SSB index 8), $10^{th}$ SSB (with SSB index 9), . . . and 16th SSB (with SSB index 1). A last bit (e.g., right most bit of the first bitmap) may correspond to an $8^{th}$ SSB group comprising $57^{th}$ SSB (with SSB index 56), $58^{th}$ SSB (with SSB index 57), . . . and $64^{th}$ SSB (with SSB index 63), etc. An SSB may belong/correspond to at most one SSB group of the first SSB groups. A bit, of the first bitmap, may indicate whether the base station transmit an SSB group, corresponding to the bit, in an SSB burst. The bit being set to a first value (e.g., 1) may indicate that the corresponding SSB group may be transmitted in the SSB burst by the base station. The bit being set to a second value (e.g., 0) may indicate that the corresponding SSB group is not transmitted in the SSB burst by the base station, or vice versa.

A second bitmap (e.g., parameter inOneGroup) may comprise a quantity of bits (e.g., 8, or any other quantity). Each bit of the second bitmap may correspond to a respective group of SSB groups. A first bit (e.g., left most bit of the second bitmap) may correspond to a first SSB group comprising $1^{st}$ SSB (with SSB index 0), $2^{nd}$ SSB (with SSB index 8), . . . and $8^{th}$ SSB (with SSB index 56). A second bit (e.g., the second bit of the second bitmap) may correspond to a second SSB group comprising $1^{st}$ SSB (with SSB index 1), $2^{nd}$ SSB (with SSB index 9), . . . and $8^{th}$ SSB (with SSB index 57). A last bit (e.g., right most bit of the second bitmap) may correspond to an $8^{th}$ SSB group comprising $1^{st}$ SSB (with SSB index 7), $2^{nd}$ SSB (with SSB index 15), . . . and $8^{th}$ SSB (with SSB index 63), etc. An SSB may belong/correspond to at most one SSB group of the second SSB groups. A bit, of the second bitmap, may indicate whether the base station may transmit an SSB group, corresponding to the bit, in an SSB burst. The bit being set to a first value (e.g., 1) may indicate that the corresponding SSB group is transmitted in the SSB burst by the base station. the bit being setting to a second value (e.g., 0) may indicate that the corresponding SSB group is not sent/transmitted in the SSB burst by the base station, or vice versa.

The plurality of SSBs (e.g., with SSB index from 0 to 63) may be grouped, for the first bitmap, into first SSB groups. Each of the first SSB groups may comprise SSBs with continuous SSB indexes. A first SSB group of the first SSB groups may comprise SSBs with SSB indexes from 0 to 7, a second SSB group may comprise SSB indexes from 8 to 15, etc. The plurality of SSBs may be also grouped, for the second bitmap, into second SSB groups. Each of the second SSB groups may comprise SSBs with discontinuous SSB indexes. A first SSB group of the second SSB groups may comprise SSBs with SSB indexes {0, 8, 16, . . . 56}. A second SSB group of the second SSB groups comprises SSBs with SSB indexes {1, 9, 17, . . . 57}, etc. SSB index gap between two neighboring SSB indexes in a second SSB group may be equal to 8 (or any other value).

Not all bits of the first and the second bitmap may be considered for determining an SSB group is transmitted or not. A maximum quantity of SSBs within an SSB burst may be equal to four when fc≤3 GHz (e.g., in accordance with FIG. 35). A wireless device may determine that the four leftmost bits of a bitmap (e.g., the first bitmap and/or the second bitmap) are valid. The wireless device may ignore the four rightmost bits of the first bitmap and/or the second bitmap.

As shown in FIG. 37, the first bitmap may be indicated, by the base station, as {1 0 1 0 0 0 0 0} and the second bitmap may be indicated as {1 1 0 0 0 0 0 0}. The base station may transmit SSBs with indexes {0 1 16 17} in an SSB burst, for example, based on the grouping configuration of the first SSB groups and the second SSB groups and further based on the first bitmap and the second bitmap.

A base station may send/transmit a MIB via PBCH. The MIB may indicate configuration parameters (e.g., for CORESET 0), for a wireless device monitoring a PDCCH, for scheduling a SIB1 message. The base station may transmit a MIB message with a transmission periodicity of 80 ms (or with any other first periodicity). The same MIB message may be repeated (according to SSB periodicity) within the 80 ms. Contents of the MIB message may be same over the 80 ms period. The same MIB may be transmitted over all SSBs within an SSB burst. The PBCH transmission (e.g., MIB) may indicate that there is no associated SIB1. A wireless device may be pointed to/indicated another frequency from where to search for an SSB that is associated with a SIB1 as well as a frequency range where the wireless device may assume no SSB associated with SIB1 is present, for example, if the PBCH transmission indicates that there is no associated SIB1. The indicated frequency range may be confined within a contiguous spectrum allocation of the same operator in which SSB is detected.

A base station may send/transmit a SIB1 message with a periodicity of 160 ms (or with any other second periodicity). The base station may transmit the same SIB1 message with variable transmission repetition periodicity within 160 ms. A default transmission repetition periodicity of SIB1 may be 20 ms (or any other third periodicity). The base station may determine an actual transmission repetition periodicity based on network implementation. SIB1 repetition transmission period may be 20 ms, for example, for SSB and CORESET multiplexing pattern 1. SIB1 transmission repetition period may be the same as the SSB period, for example, for SSB and CORESET multiplexing patterns 2 or 3. SIB1 may comprise information regarding availability and scheduling (e.g., mapping of SIBs to system information (SI) message, periodicity, SI window size) of other SIBs and/or an indication whether one or more SIBs are only provided on demand. Configuration parameters needed by a wireless device to perform an SI request may be indicated in the SIB1 if the one or more SIBs are only provided on demand.

Network energy saving may be of great importance for environmental sustainability, to reduce environmental impact (e.g., greenhouse gas emissions), and/or for operational cost savings. As wireless communication (e.g., using 5G technology, 3GPP Release 16, earlier/later 3GPP releases or generations, LTE technology, 6G technology, and/or other technology) becomes more pervasive across industries and geographical areas, handling more advanced services and applications requiring very high data rates (e.g., for applications such as extended reality (XR), URLLC, V2X, etc.), networks may become denser, use more antennas, larger bandwidths and/or more frequency bands. Advances in wireless technology may increasingly require mitigation of its environmental impacts, and novel solutions to improve network energy savings need to be developed.

A communication device (e.g., a base station, a wireless device, a relay node) may perform signal transmissions (e.g., always-on signals) for applications such as time and frequency synchronization, phase tracking, positioning, etc. The signals may need to be transmitted even if some potential receiving devices (e.g., other base stations, other wireless devices, relay nodes) may be performing power saving operations (e.g., in accordance with examples as described with respect to FIG. 28, FIG. 29A, FIG. 29B, FIG. 30A, FIG. 30B, FIG. 31, FIG. 32, FIG. 33 and/or FIG. 34). The signals may comprise broadcast signals or multicast signals that are useable by multiple receiving devices. The signals may comprise uplink signals (e.g., from a wireless device to one or more base stations/nodes), downlink signals (e.g., from a base station to one or more wireless devices), and/or sidelink signals (e.g., from a wireless device to one or more wireless devices). The signals may contribute to significant resource utilization at a transmitting device.

For example, a base station may indicate to a wireless device to transition to a power saving operation. The base station may indicate the wireless device to transition to a power saving operation, for example, if the wireless device does not have data traffic to transmit/receive. The base station may still need to send/transmit signals (e.g., always-on, and/or periodic signals) for other wireless devices, for example, even if one or more of the wireless devices is performing a power saving operation. Power saving operations implemented by a wireless device may not be applicable for the base station.

A base station may send/transmit always-on signals (e.g., MIB, SIB1, SSBs, periodic CSI-RSs, discovery RS, etc.). A base station may send always-on signals, for example, even if there are no active wireless devices in the coverage of the base station. The base station may send/transmit a configuration message (e.g., an RRC message, SIB1), for example, if the base station needs to modify (e.g., periodicity, beams/antenna ports, etc.) the always-on downlink signal. For example, the base station may transmit a message, such as a SIB1 message, indicating a longer periodicity (e.g., a larger value for parameter ssb-PeriodicityServingCell) and/or a reduced quantity/number of beams (e.g., by using parameter ssb-PositionsInBurst) for the always-on downlink signal.

Configuration messages and/or always-on downlink signals may be sent/transmitted using/with a transmission periodicity. For example, SIB1 messages (e.g., from a base station) may be transmitted using/with a transmission periodicity 160 ms and using/with repetition transmissions within the 160 ms time period. The contents of SIB transmission may be the same among the repetition transmissions within 160 ms. SIB1 messages may be used to indicate a change/modification of always-on downlink signals (e.g., change in parameters associated with the always-on downlink signals). For example, the base station may send/transmit, at least 160 ms after sending/transmitting a first SIB1, a second SIB1 indicating a change of SSB periodicity and/or SSB locations in an SSB burst. Sending/Transmission of configuration messages, such as SIB1 messages that may cause high resource overhead and/or high-power consumption, for indicating a change/modification of always-on downlink signals may not be power-efficient. For example, a dynamic and/or fast-changing traffic pattern of different wireless devices in a communication system may require frequent transmission of SIB1 messages for indicating a change of always-on downlink signals. Frequent transmission of SIB1 messages for indicating a change of always-on downlink signals may increase power consumption. Any energy saving associated with configuration and/or transmission of always-on downlink signals may advantageously reduce power consumption and signaling overhead in a communication system.

Various examples herein describe resource-efficient modification of signaling, such as modification of always-on downlink signals. A base station may dynamically modify signaling (e.g., always-on downlink signals and/or any other type of signaling) using resource-efficient signals (e.g., DCI messages) with reduced energy and/or reduced channel overhead. For example, a base station may dynamically adjust one or more parameters of always-on downlink signals (e.g., a transmission periodicity of SSB bursts, SSBs to be transmitted in an SSB burst, a quantity of SSBs in an SSB burst, beams and/or antenna ports of an SSB burst etc.). A base station may dynamically adjust one or more parameters by sending/transmitting DCI (e.g., group-common DCI and/or wireless device-specific DCI). The DCI may be sent via a search space that is configured for energy saving operation of the base station.

Various examples described herein may further optimize power consumption for transmission of always-on downlink signals (e.g., SSB bursts) based on a traffic load at the base station. Various examples described herein may reduce power consumption of the base station for transmission of always-on downlink signals, for example, if there is no load or light load in coverage of a cell of the base station.

A base station may configure a plurality of configurations of an always-on downlink signal in RRC messages. The base station may send/transmit DCI (e.g., group-common DCI and/or wireless device-specific DCI), via a search space configured for energy saving operation of the base station, for dynamically selecting a configuration (of the plurality of configurations) of the always-on downlink signal. For example, an always-on downlink signal may be an SSB burst, and a configuration (of the plurality of configurations) of the SSB burst may comprise/indicate one or more of: a transmission periodicity of SSB bursts, SSBs to be transmitted in an SSB burst, quantity of SSBs in an SSB burst, beams and/or antenna ports of an SSB burst, etc. The base station may dynamically adjust a transmission periodicity of the SSB burst via DCI. For example, the base station may send DCI indicating one of a plurality of SSB configurations to adjust the transmission periodicity of the SSB burst. The DCI may indicate an increase or a decrease in the transmission periodicity of the SSB burst. Dynamic adjustment of a configuration (e.g., of an always-on downlink signal) via DCI may optimize (e.g., reduce) power consumption of the base station. Further, a longer transmission periodicity of always-on downlink signals may reduce power consumption at the base station, for example, if there is no load or light load in coverage of a cell of the base station.

A base station may switch back to a first (e.g., shorter) transmission periodicity of the always-on downlink signal by sending/transmitting a SIB1 message indicating the first periodicity, for example, after sending/transmitting DCI indicating a second (e.g., longer) transmission periodicity. The base station and/or a wireless device may apply/use the second transmission periodicity for transmission/reception of the always-on downlink signal, as indicated by the DCI, at least until transmission/reception of the SIB1 message.

A base station may send/transmit DCI to dynamically reduce a quantity/number of SSBs in an SSB burst. Reduced quantity/number of SSBs in an SSB burst may result in transmission energy saving at the base station. Various examples as described herein may provide advantages such as improved alignment between a base station and one or more wireless devices regarding SSB transmission adjustment (e.g., adjustment of SSB burst periodicity, quantity of SSBs in an SSB burst) for energy saving, reduced power consumption (e.g., by a base station and/or by one or more wireless devices), and/or reduced signaling overhead (e.g., of a base station and/or of one or more wireless devices).

Various examples relating to efficient resource usage may also be applied for other types of transmissions (e.g., uplink signal transmission, sidelink signal transmission, transmissions via any other link) by communication devices other than a base station. For example, a wireless device may transmit control information (e.g., UCI, sidelink control information (SCI)), to a base station and/or other wireless devices, to dynamically indicate a change in parameters (e.g., increase in transmission periodicity, reduction in quantity of transmissions in a transmission burst) for an always-on uplink signal and/or an always-on sidelink signal. The control information may be sent via a search space that is configured for energy saving operation.

Figure 38A:
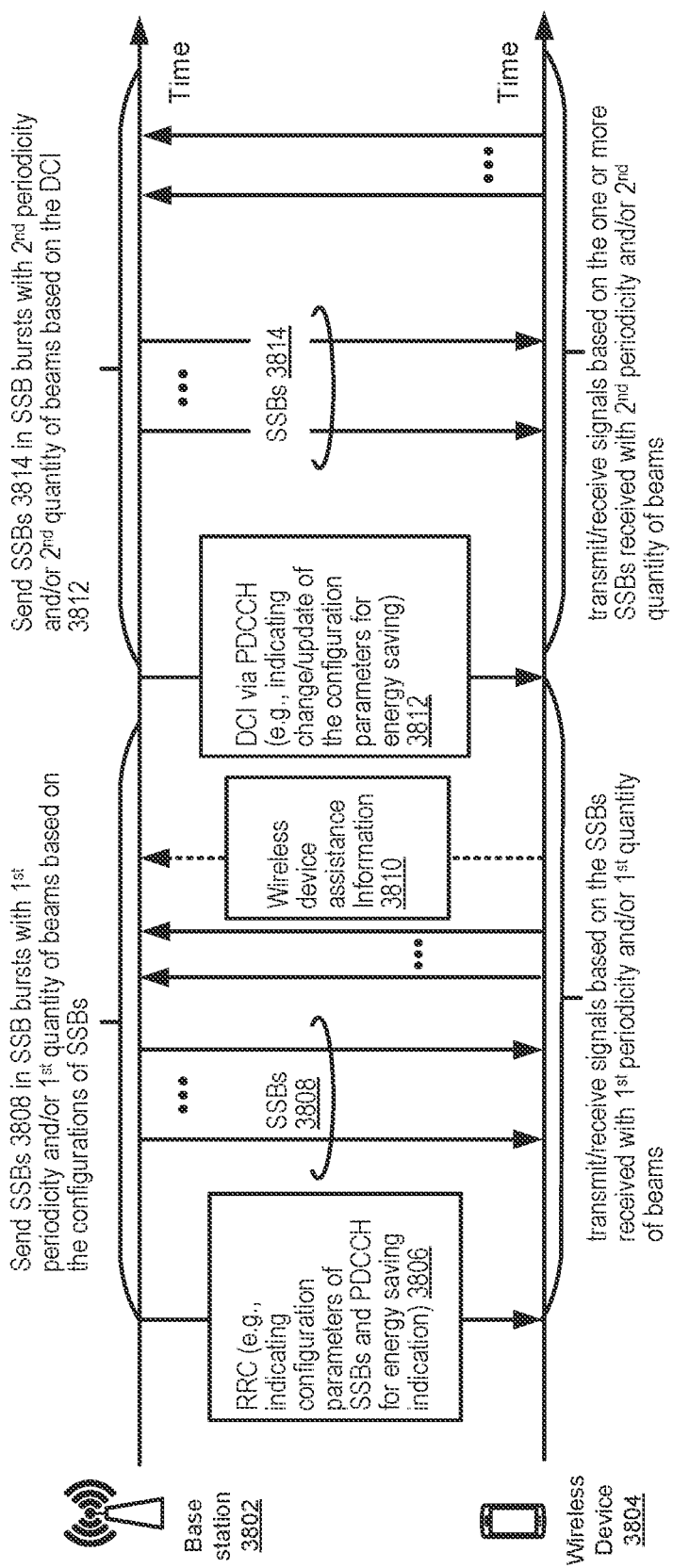
FIG. 38A shows example dynamic SSB transmission for energy saving.
Figure 38B:
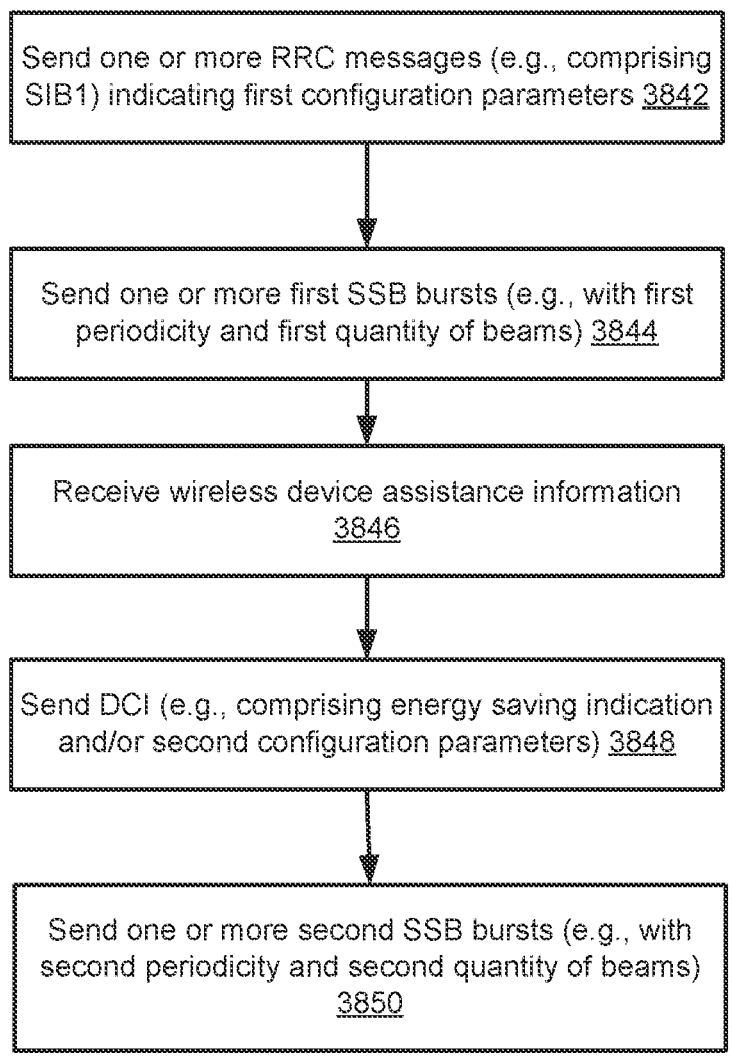
FIG. 38B shows an example method of dynamic SSB transmission.
Figure 38C:
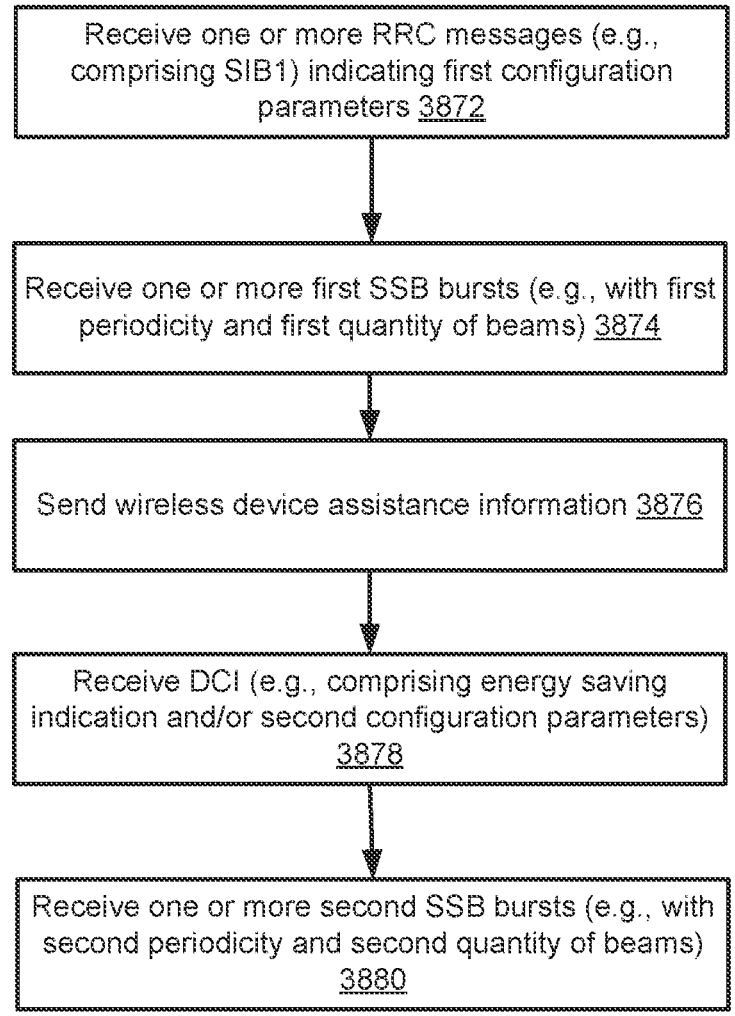
FIG. 38C shows an example method for reception of dynamic SSB transmission.

FIG. 38A shows example dynamic SSB transmission. A base station 3802 may configure SSB bursts using a configuration message. The base station 3802 may dynamically adjust the SSB bursts using control messages (e.g., DCI messages) for reduced power consumption. FIG. 38B shows an example method of dynamic SSB transmission. The example method 3840 of FIG. 38B may be performed by a base station. FIG. 38C shows an example method for reception of a dynamic SSB transmission. The example method 3870 of FIG. 38C may be performed by a wireless device.

The base station 3802 may send/transmit (e.g., step 3842), to a wireless device 3804 (or a group of wireless devices), one or more RRC messages 3806 (e.g., MIB, SIB1, cell-specific RRC message(s), and/or wireless device-specific RRC message(s)). The one or more RRC messages 3806 comprising first configuration parameters for SSB transmissions. The first configuration parameters may be implemented based on various examples as described with respect to FIG. 25, FIG. 35, FIG. 36 and/or FIG. 37. The one or more RRC messages 3806 may further comprise second configuration parameters of a search space for DCI comprising an energy saving indication. The wireless device 3804 may receive (e.g., step 3872) the one or more RRC message(s) 3806.

The first configuration parameters may indicate a first transmission periodicity of an SSB burst and locations of a plurality of SSBs in the SSB burst. The base station 3802 may apply/use the first configuration parameters for SSB transmission in a non-energy-saving state (and/or a normal power state).

A non-energy-saving state may be in a time duration during which the base station is not in an energy saving state. The base station, when in a non-energy-saving state, may: send/transmit downlink signals/channels (e.g., SIBx, SSB, CSI-RS, PBCH transmissions, PDCCH transmissions, PDSCH transmissions etc.) and/or receive uplink signals/channels (e.g., RACH transmissions, PUCCH transmissions, PUSCH transmissions, SRS, etc.).

A base station, when in an energy saving (e.g., sleep, dormant, inactive) state (e.g., mode, configuration, etc.), may: stop downlink transmissions (e.g., SIBx, SSB, CSI-RS, PBCH transmissions, PDCCH transmissions and/or PDSCH transmissions, etc.) and/or stop uplink receptions (e.g., of RACH transmissions, PUCCH transmissions, PUSCH transmissions, and/or SRS, etc.). SIBx may comprise at least one of: SIB1, SIB2, SIB3, and/or any type of SIB message(s). The base station, when in an energy saving state, may reduce a transmission power, quantity of downlink signals (e.g., in a transmission burst), and/or a quantity of transmission beams/ports of downlink signals (e.g., SIBx, SSBs, CSI-RSs, etc.), compared with a non-energy-saving state. The base station, when in an energy saving state, may send/transmit periodic downlink signals (e.g., SIBx, SSBs, CSI-RSs, etc.) with longer transmission periodicity than in a non-energy-saving state. The base station, in the energy saving state, may maintain RRC connections (and/or may not break RRC connections) with one or more wireless devices which have set up RRC connections with one or more cells of the base station. The base station, in the energy saving state, may turn-off RF modules and/or baseband unit (BBU) modules. The base station, in the energy saving state, may maintain existing interface(s) with other network entities (e.g., another base station, an AMF, a UPF, other entities as shown in FIG. 1B, etc.).

A base station 3802 may send, to a wireless device 3804, SSBs 3808 in one or more first SSB bursts (e.g., step 3844). The one or more first SSB bursts may be sent/transmitted (e.g., periodically) using/with a first transmission periodicity and/or may each comprise a first number/quantity of transmission beams. For example, the base station 3802 may send/transmit, via/in a cell a first SSB burst, of the one or more first SSB bursts, comprising the indicated plurality of SSBs (e.g., as indicated in the first configuration parameters). The plurality of SSBs may be sent/transmitted using the first quantity of transmission beams (e.g., in a non-energy-saving state). The plurality of SSBs may be sent/transmitted using different transmission beams. A number/quantity of the plurality of SSBs in the first SSB burst may be equal to the first number/quantity.

The base station 3802 may send/transmit a second SSB burst, of the one or more first SSB bursts, after sending/transmitting the first SSB burst. The second SSB burst may comprise the indicated plurality of SSBs. The time gap between the first SSB of the first SSB burst and the first SSB of the second SSB burst may be the first transmission periodicity. Each SSB burst, of the one or more first SSB bursts, may comprising a same quantity of SSBs (e.g., in accordance with various examples as described with respect to FIG. 35, FIG. 36 and/or FIG. 37). The wireless device 3804 may receive, from the base station 3802, the SSBs 3808 in the one or more first SSB bursts (e.g., step 3874).

The wireless device 3804, based on the one or more RRC messages 3806, may measure (and/or monitor) one or more SSBs, of the plurality of SSBs, in an SSB burst. The wireless device 3804 may measure (and/or monitor) one or more SSBs, of the plurality of SSBs in an SSB burst, based on the first transmission periodicity and locations of the plurality of SSBs in the SSB burst. The wireless device, based on measurement(s) (e.g., one or more measurements associated with beam direction, TCI state, pathloss, L1-RSRP, L3-RSRP, CSI, etc.) of the one or more SSBs, may perform downlink reception (e.g., PDSCH reception, PDCCH reception, and/or CSI-RS reception), or uplink transmission (e.g., RACH transmission, PUSCH transmission, PUCCH transmission, and/or SRS transmission).

The base station 3802 may determine to transition from the normal power state (or a non-energy-saving state) to an energy saving state. The base station 3802 may determine the transitioning based on wireless device assistance information 3810 from the wireless device 3804. The wireless device assistance information 3810 may comprise information on traffic pattern, data volume, etc. The wireless device 3804 may send/transmit (e.g., step 3876) the wireless device assistance information 3810 to the base station 3802 (e.g., step 3876). The wireless device 3804 may send/transmit the wireless device assistance information 3810 in an RRC message, a MAC CE and/or UCI. The wireless device assistance information 3810 may comprise a data volume of data packets of the wireless device 3804, a power state of the wireless device 3804, etc. The base station 3802 may receive the wireless device assistance information 3810 from the wireless device 3804 (e.g., step 3846).

Other information may be used by the base station 3802 to determine to transition from the normal power state to the energy saving state. The base station 3802 may determine the transitioning based on uplink signal measurement (e.g., assessment, detection) at the base station. The base station 3802 may determine the transitioning based on information exchange with a neighboring base station (e.g., via an X2 interface). The information exchange may comprise indication of the transitioning, traffic load information, etc.

The base station 3802 may transmit (e.g., step 3848), via a search space of the cell, DCI 3812 (e.g., comprising an energy saving indication and/or second configuration parameters for SSB transmission). The second configuration parameters may be implemented based on various examples as described with respect to FIG. 25, FIG. 35, FIG. 36 and/or FIG. 37. The base station 3802 may transmit the DCI 3812, for example, based on transitioning to the energy saving state. The base station 3802 may transmit the DCI 3812, for example, based on determining that the data volume (e.g., as indicated in the wireless device assistance information 3810) is less than a threshold value. The energy saving indication may indicate a transition from the non-energy-saving state to the energy saving state. The one or more RRC messages 3806 may comprise configuration parameters of the search space. A search space may be implemented as described with respect to FIG. 14A, FIG. 14B and/or FIG. 27. The wireless device 3804 may receive (e.g., step 3878), via the search space of the cell, the DCI 3812.

The search space may be a type 0 common search space. The DCI 3812 (e.g., comprising the energy saving indication) may share a same type 0 common search space with other DCIs (e.g., scheduling SIBx message). The base station 3802 may send/transmit configuration parameter of the type 0 common search space in a MIB message or a SIB1 message. The base station 3802 may send/transmit the MIB message via a PBCH. The MIB message may indicate system information of the base station 3802. The base station 3802 may send/transmit the SIB1 message scheduled by a group-common PDCCH. The SIB1 message may indicate at least one of: information for evaluating if a wireless device is allowed to access a cell of the base station, information for scheduling of other system information, radio resource configuration information that is common for all wireless devices, and/or barring information applied to access control.

The search space may be a type 2 common search space. The DCI 3812 (e.g., comprising the energy saving indication) may share a same type 2 common search space with other DCIs (e.g., scheduling paging message).

The search space may be a type 3 common search space. The DCI 3812 (e.g., comprising the energy saving indication) may share the same type 3 common search space with a plurality of group-common DCIs. The plurality of group-common DCIs may comprise one or more of: DCI with DCI format 2_0 indicating slot format based on CRC bits scrambled by SFI-RNTI, DCI with DCI format 2_1 indicating a downlink pre-emption based on CRC being scrambled by an INT-RNTI, DCI with DCI format 2_4 indicating an uplink cancellation based on CRC being scrambled by a CI-RNTI, DCI with DCI format 2_2/2_3 indicating uplink power control based on CRC bits being scrambled with TPC-PUSCH-RNTI, TPC-PUCCH-RNTI, or TPC-SRS-RNTI, and/or DCI with DCI format 2_6 indicating a power saving operation (wake-up/go-to-sleep and/or SCell dormancy) based on CRC bits being scrambled by PS-RNTI. The search space may be a wireless device-specific search space, different from common search spaces (e.g., type 0, type 0, type 1, type 2, type 3).

The DCI 3812 (e.g., indicating energy saving for the base station) may correspond to a legacy DCI format (e.g., DCI format 1_0, DCI format 1_1, DCI format 1_2, DCI format 0_0, DCI format 0_1, DCI format 0_2, DCI format 2_0, DCI format 2_1, DCI format 2_2, DCI format 2_3, DCI format 2_4, DCI format 2_5, or DCI format 2_6). The DCI 3812 may correspond to a new DCI format, with a same DCI size as DCI format 2_0, DCI format 2_1, DCI format 2_2, DCI format 2_3, DCI format 2_4, DCI format 2_5, or DCI format 2_6. The DCI 3812 may correspond to a new DCI format with a same DCI size as DCI format 1_0 or DCI format 0_0. The DCI 3812 may correspond to a new DCI format with a same DCI size as DCI format 1_1 or DCI format 0_1.

The wireless device 3804 may monitor the search space for receiving the DCI 3812 (e.g., indicating the energy saving for the base station 3802). The base station 3802 may transmit the DCI 3812 (e.g., comprising the energy saving indication for the base station 3802).

The DCI 3812 may comprise/indicate the second configuration parameters of the SSB burst. The second configuration parameters may comprise a second transmission periodicity of the SSB burst. The second transmission periodicity may be longer than the first transmission periodicity. The second configuration parameters may indicate that one or more SSBs, from the plurality of SSBs (e.g., configured, by the one or more RRC messages 3806, for the SSB burst) may be transmitted in the energy saving state. A total quantity of the one or more SSBs transmitted in the energy saving state (e.g., second quantity), may be smaller than a total quantity of the plurality of SSBs transmitted in the non-energy-saving state (e.g., first quantity).

The base station 3802 may transition from the non-energy-saving state to an energy saving state, for example, based on transmitting the DCI 3812. The base station 3802, when in an energy saving state, may reduce transmission power and/or, a quantity of transmission beams/ports of downlink signals (e.g., SIBx, SSBs, CSI-RSs, etc.), compared with a non-energy-saving state. The base station 3802, when in an energy saving state, may stop sending downlink signals (e.g., PDCCH transmissions and/or PDSCH transmissions) and/or may stop receiving uplink signals (e.g., PUCCH transmissions, PUSCH transmissions, SRS). The base station 3802, when in an energy saving state, may transmit periodic downlink signals (e.g., SIBx, SSBs, CSI-RSs, etc.) with/using a longer transmission periodicity than a transmission periodicity in a non-energy-saving state. The base station 3802, in the energy saving state, may maintain RRC connections (and/or may not break RRC connections) with one or more wireless devices (e.g., which may have set up RRC connections with one or more cells of the base station 3802). The base station 3802, in the energy saving state, may maintain existing interface(s) with other network entities (e.g., another base station, an AMF, a UPF, other entities as shown in FIG. 1B, etc.).

The base station 3802 may transition from the non-energy-saving state to an energy saving state, for example, based on transmitting the DCI 3812. The transition from the non-energy-saving state to the energy saving state may comprising switching an active BWP from a first active BWP to a second BWP of the cell (e.g., which may comprise a plurality of BWPs). A BWP may be implemented as described with respect to FIG. 9, FIG. 23 and/or FIG. 26. The first active BWP may be a BWP, of the plurality of BWPs, via which the base station may send/transmit downlink signals. The second BWP may be a default BWP, a dormant BWP, or a configured BWP (e.g., different from the default BWP and the dormant BWP) dedicated for energy saving for the base station. The one or more RRC messages 3806 may indicate the second BWP, from the plurality of BWPs of the cell, as a BWP to use in the energy saving state. The second BWP may have smaller bandwidth than the first active BWP. The second BWP may not be configured with PDCCH, PDSCH and/or CSI-RS, while the first active BWP may be configured with PDCCH, PDSCH and/or CSI-RS.

The base station 3802 (e.g., in a non-energy-saving state) may send/transmit, via the first active BWP of the cell, the SSBs 3808 in one or more first SSB bursts with/using the first transmission periodicity. The base station 3802 may switch from the first active BWP to the second BWP, for example, based on transitioning to the energy-saving state and/or based on receiving the DCI 3812.

The base station 3802 may send/transmit, to the wireless device 3804, SSBs 3814 in one or more second SSB bursts (e.g., step 3850). The base station 3802 may send/transmit, to the wireless device 3804, SSBs 3814, for example, based on transitioning to the energy-saving state and/or based on receiving the DCI 3812. The one or more second SSB bursts may be transmitted via the second BWP of the cell. The one or more second SSB bursts may be transmitted (e.g., periodically) with/using a second transmission periodicity and/or may each comprise a second quantity of transmission beams.

For example, the one or more second SSB bursts may comprise a third SSB burst and a fourth SSB burst. The base station 3802 may transmit one or more SSBs (e.g., as indicated by the second configuration parameters), of the plurality of SSBs, in a third SSB burst. The base station 3802 may transmit a fourth SSB burst, comprising the one or more SSBs, after transmitting the third SSB burst. The time gap between a first SSB of the third SSB burst and a first SSB of the fourth SSB burst may be the second transmission periodicity. Each SSB burst, of the one or more second SSB bursts, may comprise a same quantity of SSBs (e.g., in accordance with various examples as described with respect to FIG. 35, FIG. 36 and/or FIG. 37). The wireless device 3804 may receive, from the base station 3802, the SSBs 3814 in the one or more second SSB bursts (e.g., step 3880).

The wireless device 3804 may receive (e.g., measure and/or monitor) the one or more SSBs in an SSB burst (e.g., of the one or more second SSB bursts). The wireless device 3804 may measure (and/or monitor) the one or more SSBs in an SSB burst based on the second transmission periodicity and locations of the one or more SSBs in the SSB burst. The wireless device 3804, based on one or more measurements (e.g., measurement(s) associated with one or more of beam direction, TCI state, pathloss, L1-RSRP, L3-RSRP, CSI, etc.) of the one or more SSBs, may perform downlink reception (e.g., PDSCH reception, PDCCH reception, and/or CSI-RS reception), and/or uplink transmission (e.g., RACH transmission, PUSCH transmission, PUCCH transmission, and/or SRS transmission).

A base station may dynamically adjust a transmission periodicity of an SSB burst and transmission beams/ports of SSBs in the SSB burst, by transmitting DCI (e.g., group-common DCI or wireless device-specific DCI). The DCI transmission may be via a search space configured for energy saving operation of the base station. Various examples herein may reduce power consumption of the base station for SSB transmission (e.g., if there is no load or light load in coverage of a cell of the base station).

Figure 39A:
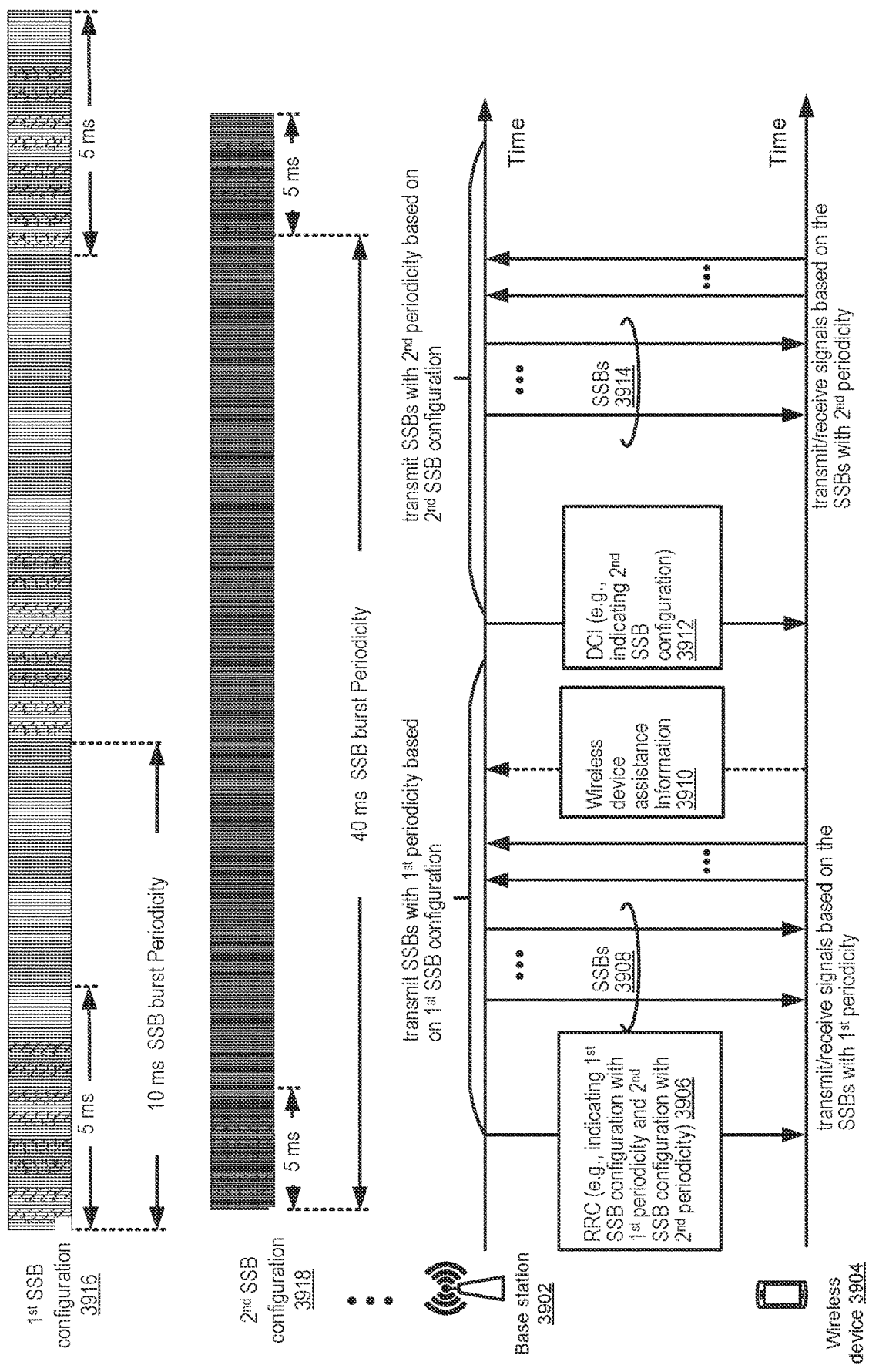
FIG. 39A shows an example dynamic adjustment of SSB transmission.
Figure 39B:
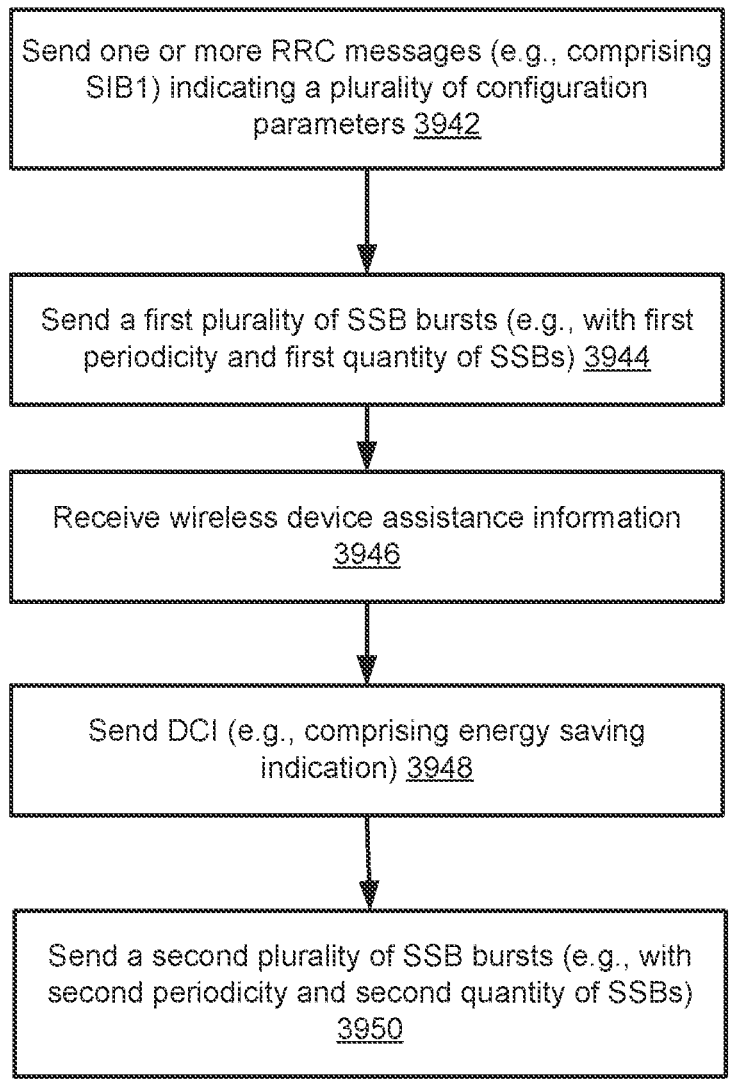
FIG. 39B shows an example method of dynamic adjustment of SSB transmission.
Figure 39C:
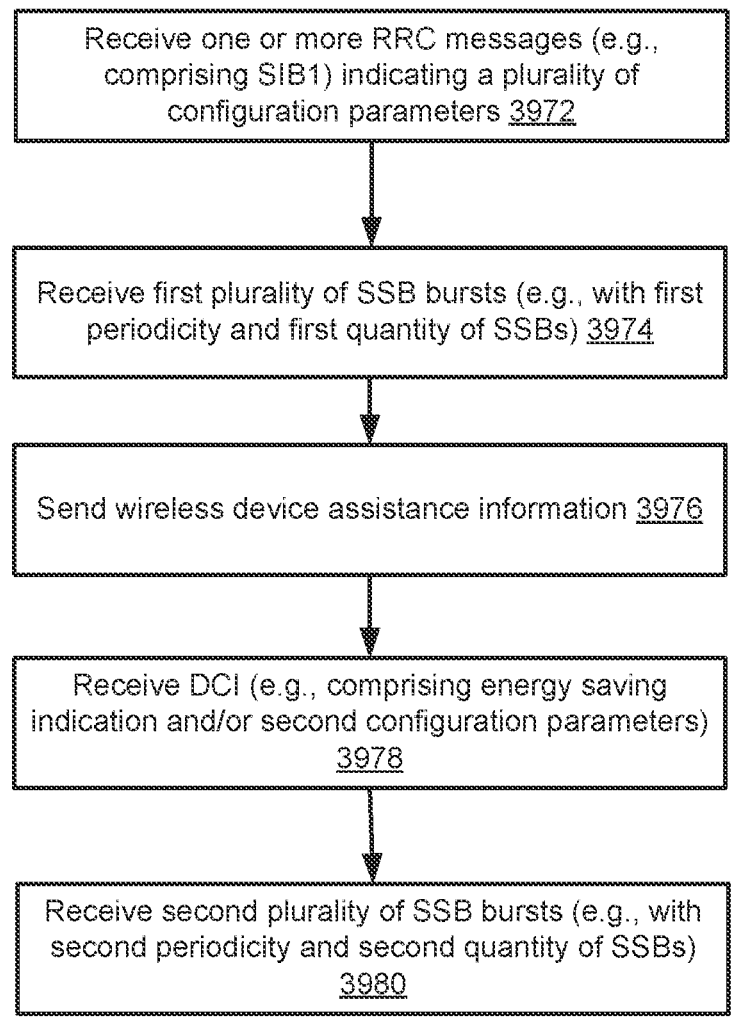
FIG. 39C shows an example method for reception of a dynamically adjusted SSB transmission.

FIG. 39A shows an example dynamic adjustment of SSB transmission for energy saving. A base station 3902 may dynamically adjust a periodicity of SSB burst transmission, for example, using DCI messages (e.g., to a wireless device 3904). FIG. 39B shows an example method of dynamic adjustment of SSB transmission. The example method 3940 of FIG. 39B may be performed by a base station. FIG. 39C shows an example method for reception of a dynamically adjusted SSB transmission. The example method 3970 of FIG. 39C may be performed by the wireless device 3904.

The base station 3902 may transmit (e.g., step 3942), to the wireless device 3904 (and/or a group of wireless devices), one or more RRC messages 3906 (e.g., MIB, SIB1, or cell specific RRC, UE-specific RRC messages). The one or more RRC messages may indicate at least/comprise a first SSB configuration 3916 and a second SSB configuration 3918. An SSB configuration may indicate/be associated with a transmission periodicity, indication of locations of SSBs in an SSB burst, and/or an indication of a quantity of SSBs in an SSB burst. An SSB configuration may be implemented in accordance with examples described with respect to FIG. 25, FIG. 35, FIG. 36 and/or FIG. 37. The RRC message 3906 may further comprise second configuration parameters of a search space. The second configuration parameters of the search space may be for DCI for an energy saving indication (e.g., as described with respect to FIGS. 38A-C). The wireless device 3904 may receive the one or more RRC messages (e.g., step 3972).

The first SSB configuration 3916 (e.g., indicating a first transmission periodicity, a first quantity of SSBs) may be used for a non-energy-saving state of the base station 3902. The second SSB configuration 3918 (e.g., indicating a second transmission periodicity, a second quantity of SSBs) may be used for an energy saving state of the base station 3902. The non-energy-saving state and the energy saving state may be implemented by the base station as described with respect to FIG. 38. As shown in FIG. 39A, the first periodicity may be 10 ms, the second periodicity may be 40 ms, and the first quantity of SSBs in an SSB burst may be 8. The first transmission periodicity, the second transmission periodicity, and the first quantity of SSBs in an SSB burst may have any other values. The second quantity of SSBs may be less than or equal to the first quantity of SSBs. The second transmission periodicity may be higher than the first transmission periodicity.

The base station 3902 may send/transmit, via a cell, SSBs 3908 in a first plurality of SSB bursts (e.g., step 3944). SSB bursts, in the first plurality of SSB bursts, may be transmitted periodically with/using the first transmission periodicity, for example, in a non-energy-saving state. A plurality of SSBs in an SSB burst, of the first plurality of SSB bursts, may be transmitted via different transmission beams. The base station 3902 may send/transmit a first SSB burst of the first plurality of SSB bursts. The base station 3902 may send/transmit a second SSB burst of the first plurality of SSB bursts, for example, after transmitting the first SSB burst. A time gap between a first SSB of the first SSB burst and a first SSB of the second SSB burst may be the first transmission periodicity (e.g., 10 ms, or any other transmission periodicity). The base station 3902 may transmit the first plurality of SSB bursts, with each SSB burst comprising the first quantity (e.g., 8, or any other quantity) of SSBs. The first plurality of SSB bursts may be transmitted periodically with/using the first transmission periodicity (e.g., as described with respect to FIG. 35, FIG. 36 and/or FIG. 37). The wireless device 3904 may receive SSBs 3908 in the first plurality of SSB bursts (e.g., step 3974).

The wireless device 3904, based on the one or more RRC messages 3906, may measure (and/or monitor) one or more SSBs, of the plurality of SSBs, in an SSB burst (e.g., in a first plurality of SSB bursts). The wireless device 3904 may measure (and/or monitor) one or more SSBs of the plurality of SSBs in an SSB burst based on the first transmission periodicity and locations of the plurality of SSBs in the SSB burst. The wireless device, based on one or more measurements (e.g., measurement(s) associated with one or more of beam direction, TCI state, pathloss, L1-RSRP, L3-RSRP, CSI, etc.) of the one or more SSBs, may perform downlink reception (e.g., PDSCH reception, PDCCH reception, CSI-RS reception, etc.), or uplink transmission (e.g., RACH transmission, PUSCH transmission, PUCCH transmission, SRS transmission, etc.).

The base station 3902 may determine to transition from the normal power state (or a non-energy-saving state) to an energy saving state (e.g., as described with respect to FIG. 38). The wireless device 3904 may send (e.g., step 3976), to the base station 3902, wireless device assistance information 3910 (e.g., in a manner similar to as described with respect to FIGS. 38A-C). The base station 3902 may receive the wireless device assistance information 3910 (e.g., step 3946). The base station 3902 may determine to transition from the normal power state (or a non-energy-saving state) to an energy saving state, for example, based on receiving the wireless device assistance information 3910 from the wireless device. The base station 3902 may transmit (e.g., step 3948), via a search space of the cell, DCI 3912 comprising an energy saving indication (e.g., as described with respect to FIG. 38). The wireless device 3904 may receive the DCI 3912 (e.g., step 3978).

The base station 3902 may transition from the non-energy-saving state to an energy saving state, for example, based on transmitting the DCI 3912. The base station 3902 may send/transmit SSBs 3914 in a second plurality of SSB bursts (e.g., step 3950). Each SSB burst, in the second plurality of SSB bursts, may comprise the second quantity of SSBs and may be transmitted with/using the second transmission periodicity. The wireless device 3904 may receive the second plurality of SSB bursts (e.g., step 3980).

For example, the base station 3902 may send/transmit, via the cell, one or more SSBs in a third SSB burst (e.g., of the second plurality of SSB bursts) based on the second SSB configuration. The base station 3902 may transmit the second plurality of SSB bursts with/using the second periodicity (e.g., 40 ms, or any periodicity higher than the first transmission periodicity). The one or more SSBs transmitted in the third SSB burst may be same as the plurality of SSBs transmitted in the first SSB burst (e.g., the same 8 SSBs with indexes from 0 to 7). The one or more SSBs transmitted in the third SSB burst in the energy saving state may be a subset of (e.g., less than) the plurality of SSBs transmitted in the first SSB burst in the non-energy-saving state (e.g., further described herein with respect to FIG. 41, FIG. 42A, FIG. 42B, FIG. 43 and/or FIG. 44).

The wireless device 3904 may receive the SSBs 3814 the second plurality of SSB bursts. The wireless device 3904 may measure (and/or monitor) the one or more SSBs in an SSB burst (e.g., of the second plurality of SSB bursts). The wireless device 3904 may measure (and/or monitor) the one or more SSBs in a SSB burst based on the second transmission periodicity and locations of the one or more SSBs in the SSB burst. The wireless device 3904, based on one or more measurement(s) (e.g., measurement(s) associated with one or more of beam direction, TCI state, pathloss, L1-RSRP, L3-RSRP, CSI) of the one or more SSBs, may perform downlink reception (e.g., PDSCH reception, PDCCH reception and/or CSI-RS reception), or uplink transmission (e.g., RACH transmission, PUSCH transmission, PUCCH transmission, and/or SRS transmission).

The one or more RRC messages 3206 may comprise a plurality of SSB configurations. Each SSB configuration may be associated with a respective periodicity and/or location indication of SSBs in an SSB burst. The DCI 3912, indicating the energy saving state of the base station 3902, may indicate which one of the plurality of SSB configurations may be used in the energy saving state of the base station. The base station 3902 may send/transmit SSBs in an SSB burst based on a periodicity and location indication of the SSBs in the SSB burst, for example, in accordance with the indicated SSB configuration of the plurality of SSB configurations.

The one or more RRC messages 3206 may comprise a plurality of SSB configurations. Each SSB configuration may be associated with a respective periodicity and/or location indication of SSBs in an SSB burst. The one or more RRC messages 3206 may further indicate a default SSB configuration, from the plurality of SSB configurations, to use in the energy saving state of the base station 3902. The DCI 3912, indicating the energy saving state of the base station, may or may not indicate which one of the plurality of SSB configurations is to be used in the energy saving state of the base station 3902. The base station 3902 may transmit SSBs in an SSB burst based on the default SSB configuration of the plurality of SSB configurations (e.g., in accordance to a periodicity and location indication of the SSBs indicated by the default SSB configuration), for example, if the DCI 3912 does not indicate which one of the plurality of SSB configurations is to be used in the energy saving state.

The one or more RRC messages 3906 may comprise a plurality of SSB configurations. Each SSB configuration may be associated with a respective periodicity and/or location indication of SSBs in a SSB burst (e.g., as described with respect to FIG. 25, FIG. 36 and/or FIG. 37). The one or more RRC messages 3906 may further indicate a default SSB configuration, from the plurality of SSB configurations, to be used in the non-energy-saving state of the base station

3902. The default SSB configuration used for the non-energy-saving state by the base station 3902 may be different from a default SSB configuration used for the energy-saving state of the base station 3902. DCI (e.g., DCI 3912), indicating a non-energy-saving state of the base station or indicating a transitioning from an energy saving state to a non-energy-saving state for the base station, may or may not indicate which one of the plurality of SSB configurations is used in the non-energy-saving state of the base station 3902. The base station 3902 may send/transmit SSBs in an SSB burst based on the default SSB configuration of the plurality of SSB configurations (e.g., in accordance to a periodicity and location indication of the SSBs indicated by the default SSB configuration), for example, if the base station 3902 activates (and/or configures or reconfigures) the cell, or if the base station 3902 transitions from an energy saving state to a non-energy-saving state.

The base station 3902 may transition from a non-energy-saving state to an energy saving state, for example, based on sending the DCI 3912. The transition from the non-energy-saving state to the energy saving state may comprising switching an active BWP from a first active BWP to a second BWP of a cell (e.g., comprising a plurality of BWPs). A BWP may be implemented as described with respect to FIG. 9, FIG. 23 and/or FIG. 26. The first active BWP may be a BWP, of the plurality of BWPs, via which the base station 3902 is sending downlink signals. The second BWP may be a default BWP, a dormant BWP, or a configured BWP (e.g., different from the default BWP and the dormant BWP) dedicated for energy saving for the base station. The one or more RRC messages 3906 may indicate the second BWP, of the plurality of BWPs of the cell, as a BWP to use in the energy saving state. The one or more RRC messages 3906 may indicate a first SSB configuration with a first periodicity (e.g., associated with the first active BWP) and second SSB configuration with a second periodicity (e.g., associated with the second BWP). The base station 3902 may transmit (e.g., in a non-energy-saving state), via the first active BWP of the cell and based on first SSB configuration, the plurality of SSBs in a first SSB burst with the first periodicity. The base station 3902 (e.g., based on transitioning to the energy saving state) may switch from the first active BWP to the second BWP and transmit, via the second BWP of the cell and based on the second SSB configuration, one or more SSBs of the plurality of SSBs in a second SSB burst with the second periodicity.

A base station (e.g., in accordance with various examples described with respect to FIGS. 39A-C) may dynamically adjust transmission periodicity and quantity of beams/ports of SSBs in an SSB burst. The base station may perform the adjustment by configuring a plurality of SSB configurations and transmitting DCI (e.g., group-common DCI or wireless device-specific DCI) via a search space configured for energy saving operation of the base station. Various examples herein may reduce power consumption of the base station for SSB transmission (e.g., when there is no load or light load in coverage of a cell of the base station).

Figure 40A:
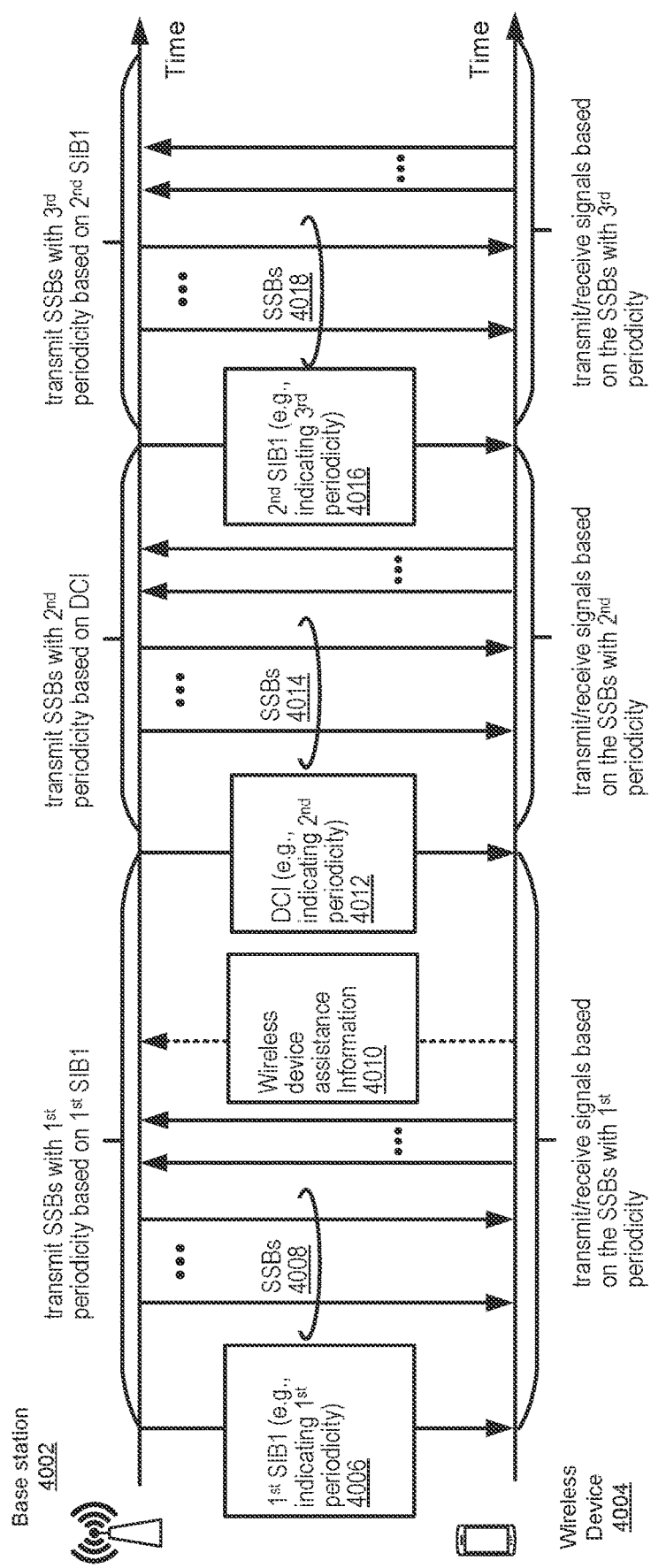
FIG. 40A shows example periodicity adjustment of SSB transmission.
Figure 40B:
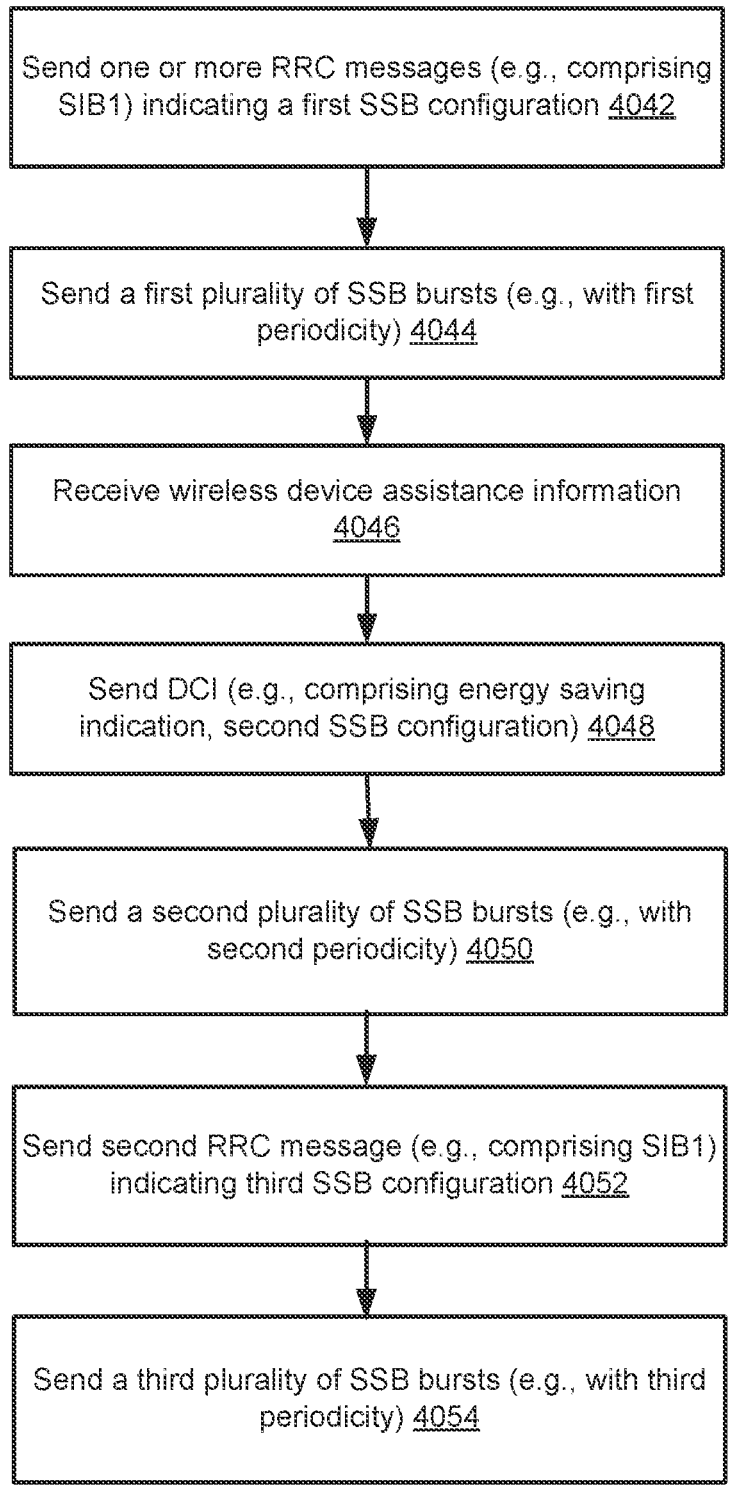
FIG. 40B shows an example method of dynamic adjustment of SSB burst periodicity.
Figure 40C:
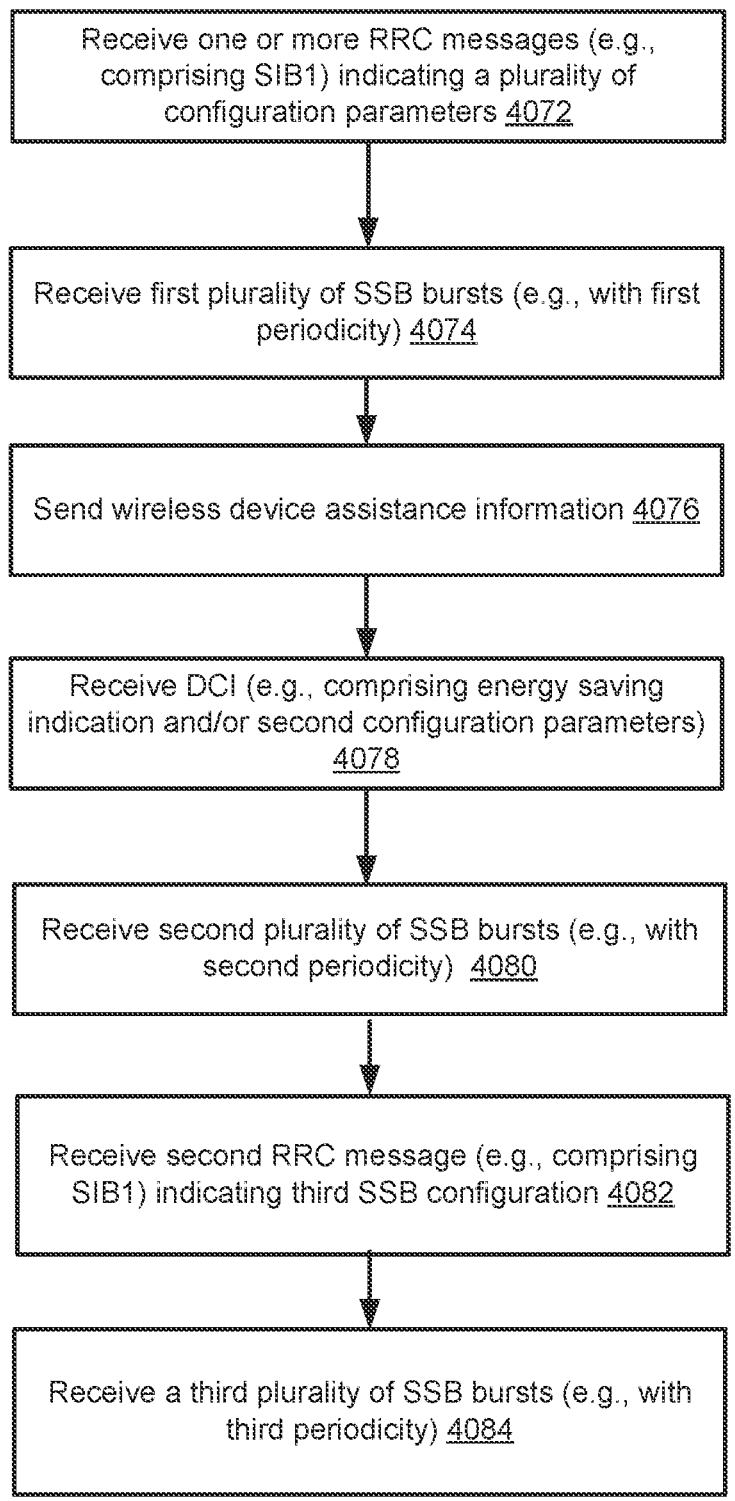
FIG. 40C shows an example method for reception of a dynamically adjusted SSB transmission.

FIG. 40A shows example periodicity adjustment of SSB transmission. A base station 4002 may dynamically adjust a periodicity of SSB burst transmission, for example, using one or more messages (e.g., RRC messages, SIB messages, and/or DCI messages). FIG. 40B shows an example method of dynamic adjustment of SSB burst periodicity. The example method 4040 of FIG. 40B may be performed by a base station. FIG. 40C shows an example method for reception of a dynamically adjusted SSB transmission. The example method 4070 of FIG. 40C may be performed by the wireless device 4004.

The base station 4002 may send/transmit (e.g., step 4042), to the wireless device 4004 (or a group of wireless devices), one or more RRC messages (e.g., MIB, SIB1, or cell specific RRC, UE-specific RRC messages). The one or more RRC messages may comprise a SIB1 4006 indicate a first SSB configuration. The first SSB configuration may be associated with/indicate a first transmission periodicity and indication of locations of SSBs in an SSB burst. The first SSB configuration may be implemented/indicated as described with respect to FIG. 25, FIG. 35, FIG. 36 and/or FIG. 37. The RRC message 4004 may further comprise second configuration parameters of a search space for DCI for an energy saving indication (e.g., described with respect to FIG. 38A, FIG. 38B, and/or FIG. 38C). The wireless device 4004 may receive the one or more RRC messages (e.g., step 4072).

The first SSB configuration (e.g., with the first transmission periodicity) may be used for a non-energy-saving state of the base station. Operations in the non-energy-saving state may be performed by the base station in a manner similar to as described with respect to FIG. 38A, FIG. 38B, and/or FIG. 38C.

The base station 4002 may send/transmit, via a cell, SSBs 4008 in a first plurality of SSB bursts (e.g., step 4044). SSB bursts, in the first plurality of SSB bursts, may be transmitted periodically with/using the first transmission periodicity, for example, in a non-energy-saving state. A plurality of SSBs in an SSB burst, of the first plurality of SSB bursts, may be transmitted via different transmission beams. The base station 4002 may send/transmit a first SSB burst of the first plurality of SSB bursts. The base station 4002 may send/transmit a second SSB burst of the first plurality of SSB bursts, for example, after transmitting the first SSB burst. A time gap between a first SSB of the first SSB burst and a first SSB of the second SSB burst may be the first transmission periodicity (e.g., 10 ms, or any other transmission periodicity). The base station 4002 may transmit the first plurality of SSB bursts, with each SSB burst comprising the first quantity (e.g., 8 or any other quantity) of SSBs. The first plurality of SSB bursts may be transmitted periodically with/using the first transmission periodicity (e.g., as described with respect to FIG. 35, FIG. 36 and/or FIG. 37). The wireless device 4004 may receive SSBs 4008 in the first plurality of SSB bursts (e.g., step 4074).

The wireless device 4004, based on the one or more RRC messages, may measure (and/or monitor) one or more SSBs, of the plurality of SSBs, in an SSB burst (e.g., among the first plurality of SSB bursts). The wireless device 4004 may perform downlink reception (e.g., PDSCH reception, PDCCH reception, CSI-RS reception), or uplink transmission (e.g., RACH transmission, PUSCH transmission, PUCCH, SRS transmission) (e.g., as described with respect to FIGS. 38A-C and 39A-C).

The base station 4002 may determine to transition from the normal power state (or a non-energy-saving state) to an energy saving state based on example embodiments described with respect to FIGS. 38A-C and 39A-C. The wireless device 4004 may send (e.g., step 4076), to the base station 4002, wireless device assistance information 4010 (e.g., in a manner similar to as described with respect to FIGS. 38A-C and 39A-C). The base station 4002 may receive the wireless device assistance information 4010 (e.g., step 4046). The base station 4002 may determine to transition from the normal power state (or a non-energysaving state) to an energy saving state, for example, based on receiving the wireless device assistance information 4010 from the wireless device 4004.

The base station 4002 may send/transmit, via a search space of the cell, DCI 4012 (e.g., step 4048). The DCI 4012 may comprise an energy saving indication. The DCI 4012 may in accordance with DCIs as described with respect to FIGS. 38A-C and 39A-C. The DCI 4012 may indicate a second SSB configuration (e.g., a second transmission periodicity for an SSB burst). The wireless device 4004 may receive the DCI 4012 (e.g., step 4078)

The base station 4002 may transition from the non-energy-saving state to an energy saving state, for example, based on transmitting the DCI 4012. The base station 4002 may send/transmit, via the cell, SSBs 4014 in a second plurality of SSB bursts (e.g., step 4050). The base station 4002 may send/transmit the SSBs 4014 in the second plurality of SSB bursts, for example, based on the transitioning to the energy-saving state. The base station 4002 may transmit the second plurality of SSB bursts with/using a second transmission periodicity. The second transmission periodicity may be lower than the first transmission periodicity. The wireless device 4004 may receive the second plurality of SSB bursts (e.g., step 4070).

The wireless device 4004, based on the DCI 4012, may measure (and/or monitor) one or more SSBs, of a plurality of SSBs, in an SSB burst (e.g., among the second plurality of SSB bursts). The wireless device 4004 may perform downlink reception (e.g., PDSCH reception, PDCCH reception, CSI-RS reception), or uplink transmission (e.g., RACH transmission, PUSCH transmission, PUCCH, SRS transmission) (e.g., as described with respect to FIGS. 38A-C and 39A-C).

The base station 4002 may determine to reset SSB configuration parameters. The base station 4002 may reset the SSB configuration parameters by transmitting a second RRC messages (e.g., comprising SIB1 4016). (e.g., step 4052) The second RRC message may indicate third SSB configuration. The third SSB configuration may indicate a third transmission periodicity and location indication of SSBs in an SSB burst. The third SSB configuration may be implemented/indicated as described with respect to FIG. 25, FIG. 35, FIG. 36 and/or FIG. 37. The wireless device 4004 may receive the second RRC messages (e.g., step 4082).

The base station 4002 may continue transmitting SSB bursts with/using the second transmission periodicity, for example prior to transmitting the second RRC message. The wireless device 4004 may perform downlink transmission and/or uplink transmission, for example, based on the SSB bursts transmitted with/using the second transmission periodicity (e.g., as described with respect to FIGS. 38A-C).

The base station 4002 may stop applying the second transmission periodicity, indicated by the DCI 4012, for SSB transmission, for example, based on transmitting the second RRC message. The base station 4002 may send/transmit SSBs 4018 in third plurality of SSB bursts (e.g., step 4054). The base station 4002 may transmit the third plurality of SSB bursts with/using the third transmission periodicity and using the location indication of the SSBs. The base station 4002 may continue transmitting the third plurality of SSB bursts with/using the third periodicity. The wireless device 4004 may receive the third plurality of SSB bursts (e.g., step 4084).

The cell may be configured with multiple BWPs. The base station 4002 may transition from the non-energy-saving state to an energy saving state, for example, based on transmitting the DCI 4012. The transitioning from the non-energy-saving state to the energy saving state may comprise switching an active BWP from a first active BWP to a second BWP of the cell. The cell may comprise a plurality of BWPs. The base station 4002 may transmit SSBs via the first active BWP in the non-energy-saving state and via the second BWP in the energy saving state (e.g., as described with respect to FIGS. 38A-C and 39A-C).

A base station may switch back to an original SSB burst transmission periodicity by sending/transmitting a new SIB1 message indicating the SSB burst transmission periodicity. The base station may transmit the new SIB1 message, for example, after transmitting the DCI indicating a new SSB burst transmission periodicity. The base station and/or a wireless device may apply the new SSB burst transmission periodicity for SSB burst transmission/reception (e.g., indicated by the DCI) until transmission/reception of the new SIB1 message.

Figure 41A:
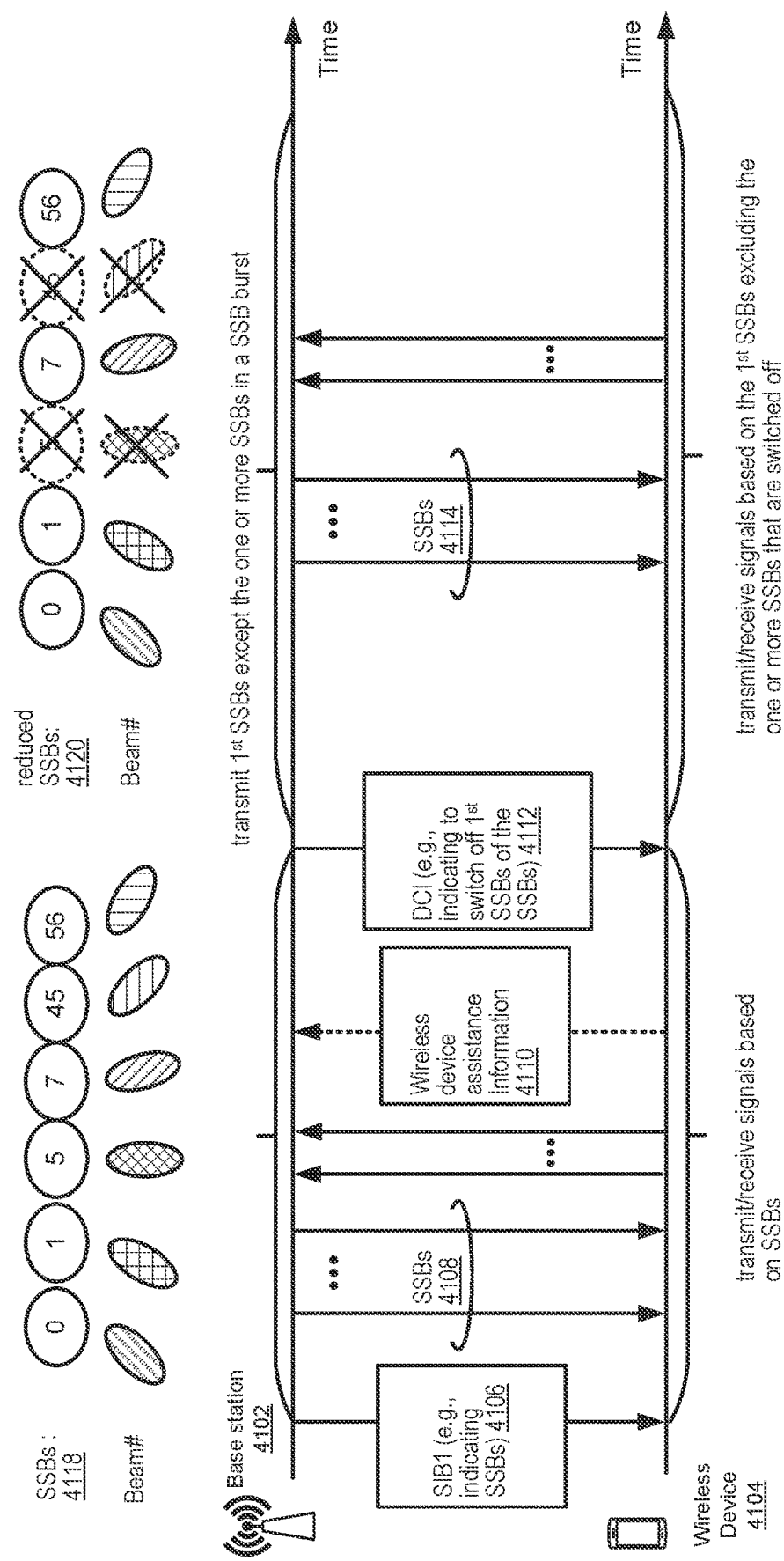
FIG. 41A shows an example of selective transmission of SSBs.
Figure 41B:
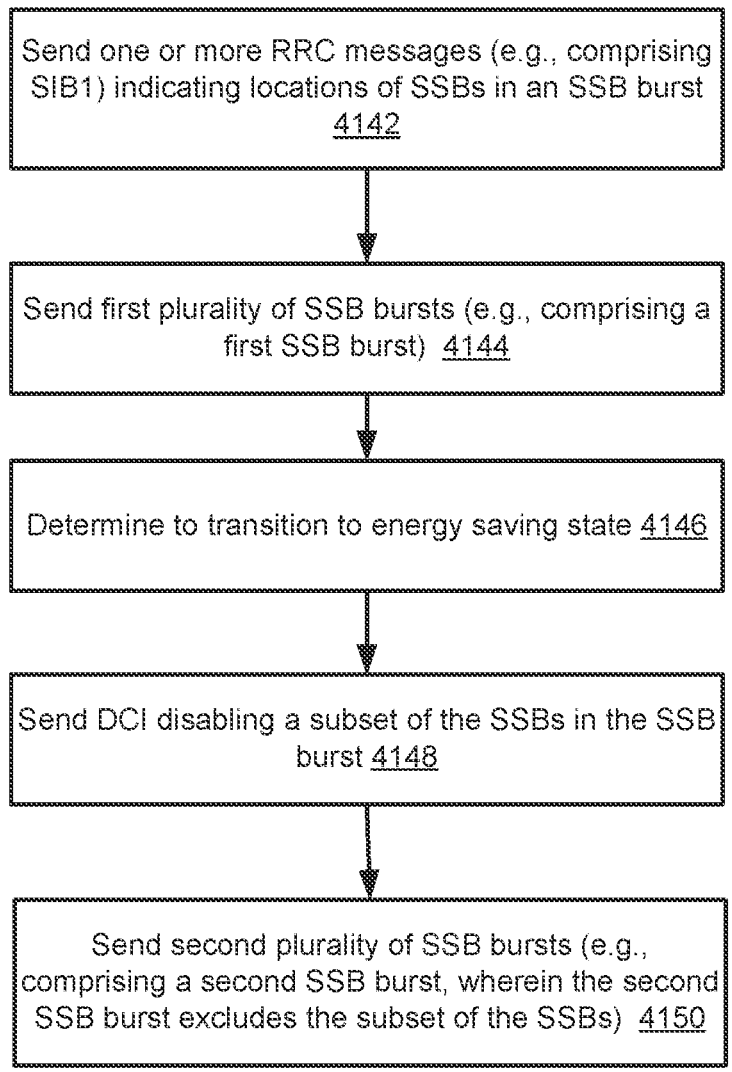
FIG. 41B shows an example method of selective transmission of SSBs.
Figure 41C:
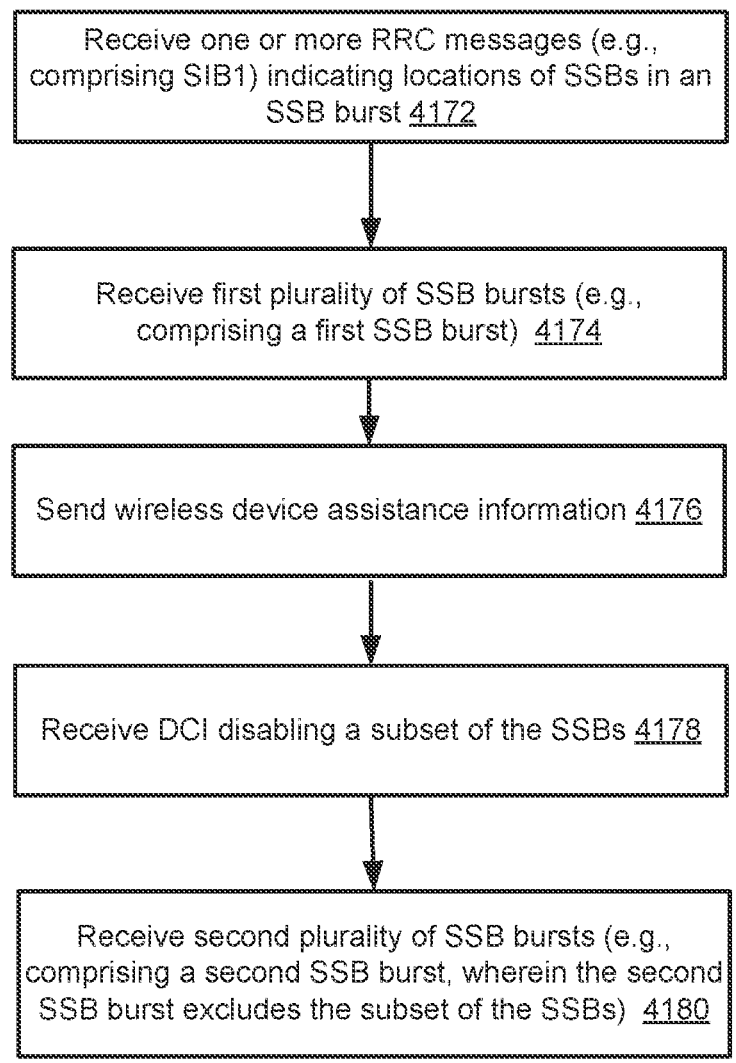
FIG. 41C shows an example method for reception of selectively transmitted SSBs.

FIG. 41A shows an example of selective transmission of SSBs. FIG. 41B shows an example method of selective transmission of SSBs. The example method 4140 of FIG. 41B may be performed by a base station 4102. FIG. 41C shows an example method for reception of selectively transmitted SSBs. The example method 4170 of FIG. 40C may be performed by the wireless device 4104.

The base station 4102 may send/transmit, to the wireless device 4104 (or a group of wireless devices), one or more RRC messages (e.g., MIB, SIB1, or cell specific RRC, UE-specific RRC messages) (e.g., step 4142). The one or more RRC messages may comprise a SIB1 message 4106. The one or more RRC messages may indicate locations of SSBs in an SSB burst. An SSB location indication, as sent via the one or more RRC messages, may be implemented as described with respect to FIG. 25, FIG. 35, FIG. 36 and/or FIG. 37. The one or more RRC messages may further comprise second configuration parameters of a search space. The search space may be for DCI for an energy saving indication (e.g., as described with respect to FIGS. 38A-C). The wireless device may receive the one or more RRC messages (e.g., step 4172).

An SSB burst, to be sent/transmitted by the base station 4102 (e.g., in a non-energy-saving state) may comprise a plurality of SSBs 4118 (e.g., SSB #0, SSB #1, SSB #5, SSB #7, SSB #45 and SSB #56, etc.). The SSBs 4118 may be configured by the RRC/SIB1 message. The SSBs 4118 may be based on the SSB location indication in the RRC message/SIB1 message. Each of the SSBs 4118 in the SSB burst may be sent/transmitted via/with different beams (e.g., corresponding to different beam directions for different cell coverage). Contents of a MIB message (and/or a SIB1 message) may be the same when transmitted with different beams.

The base station 4102 may send/transmit (e.g., step 4144) the SSBs 4108 in a first plurality of SSB bursts (e.g., described with respect to FIG. 35-40). The first plurality of SSB bursts may comprise a first SSB burst. The first plurality of SSB bursts may comprise the first SSB burst transmitted with/using a first transmission periodicity. The first SSB burst may comprise the SSBs 4118. The wireless device 4104 may receive (e.g., step 4174) the first plurality of SSB bursts.

The wireless device 4104, based on the one or more RRC messages, may measure (and/or monitor) one or more SSBs, of the SSBs 4118, in the first SSB burst. The wireless device 4104 may measure (and/or monitor) one or more SSBs, of the SSBs 4118, in the first SSB burst, for example, based on the first transmission periodicity and locations of the SSBs 4118 in the first SSB burst. The wireless device 4104, based on one or more measurement(s) (e.g., measurements associated with one or more of beam direction, TCI state, pathloss, L1-RSRP, L3-RSRP, CSI) of the one or more SSBs, may perform downlink reception (e.g., PDSCH reception, PDCCH reception, CSI-RS reception), and/or uplink transmission (e.g., RACH transmission, /PUSCH transmission, PUCCH transmission, SRS transmission).

The base station 4102 may determine (e.g., step 4146) to transition from the normal power state (or a non-energy-saving state) to an energy saving state (e.g., as described with respect to FIGS. 38A-C). For example, the wireless device may send wireless device assistance information 4110 (e.g., step 4176). The base station 4102 may determine to transition from the normal power state (or a non-energy-saving state) to the energy saving state, for example, based on receiving the wireless device assistance information 4110. The base station 4102 may send/transmit (e.g., step 4148), via a search space of the cell, DCI 4112 comprising an energy saving indication, (e.g., as described with respect to FIGS. 38A-C). The wireless device 4104 may receive the DCI 4112 (e.g., step 4178).

The DCI 4112 may indicate switching off (e.g., disabling, excluding) a subset of SSBs, from the SSBs 4118, in an SSB burst transmission. For example, the DCI 4112 indicate switching off (disabling) SSB #5 and SSB #45 (e.g., as shown in FIG. 41). The DCI 4112 indicating switching off the subset of SSBs from the SSBs 4118 (e.g., as configured by SIB1 message) may be implemented/formatted in accordance with the various examples as described with respect to FIG. 42A, FIG. 42B, FIG. 43 and/or FIG. 44.

The base station 4102 may transition from the non-energy-saving state to an energy saving state, for example, based on transmitting the DCI 4112. The base station 4102 may send/transmits, via the cell and based on the DCI, the SSBs 4114 in a second plurality of SSB bursts (e.g., step 4150). The second plurality of SSB bursts may comprise a second SSB burst. The second SSB burst may comprise one or more SSBs (e.g., reduced SSBs 4120). The second SSB burst may not comprise/may exclude the subset of SSBs from the SSB burst. For example, the base station 4102 may transmit SSB #0, SSB #1, SSB #7 and SSB #56 in the second SSB burst and skip transmitting SSB #5 and SSB #45 in the second SSB burst. The base station 4102 may stop using the transmission beams corresponding to transmissions of SSB #5 and SSB #45. The base station 4102 may the second plurality of SSB bursts with/using a second transmission periodicity (e.g., if indicated by the DCI 4112) or a same periodicity as indicated by the one or more RRC messages (e.g., first transmission periodicity). The wireless device 4104 may receive the second plurality of SSB bursts (e.g., step 4180).

The wireless device 4104 may measure (and/or monitor) the one or more SSBs (e.g., SSB #0, SSB #1, SSB #7 and SSB #56) in the second SSB burst, for example, based on receiving the DCI. The wireless device 4104 may measure (and/or monitor) the one or more SSBs in the second SSB burst based on the second transmission periodicity and locations of the one or more SSB s in the second SSB burst. The wireless device 4104, based on one or more measurement(s) (e.g., measurements associated with one or more of beam direction, TCI state, pathloss, L1-RSRP, L3-RSRP, CSI) of the one or more SSBs, may perform downlink reception (e.g., PDSCH reception, PDCCH reception, CSI-RS reception), and/or uplink transmission (e.g., RACH transmission, /PUSCH transmission, PUCCH transmission, SRS transmission).

The cell may be configured with multiple BWPs. The base station 4102 may transition from the non-energy-saving state to an energy saving state, for example, based on transmitting the DCI 4112. The transitioning from the non-energy-saving state to the energy saving state may comprise switching an active BWP from a first active BWP to a second BWP of the cell. The cell may comprise a plurality of BWPs. The base station 4102 may transmit SSBs via the first active BWP in the non-energy-saving state and via the second BWP in the energy saving state (e.g., as described with respect to FIGS. 38A-C and 39A-C).

A base station may dynamically adjust quantity of beams/ports of SSBs in a SSB burst, for example, by transmitting DCI. The DCI may indicate a change of quantity of beams/ports of the SSBs in the SSB burst. Various examples as described herein may reduce power consumption of the base station for SSB transmission (e.g., when there is no load or light load in coverage of a cell of the base station).

Figure 42A:
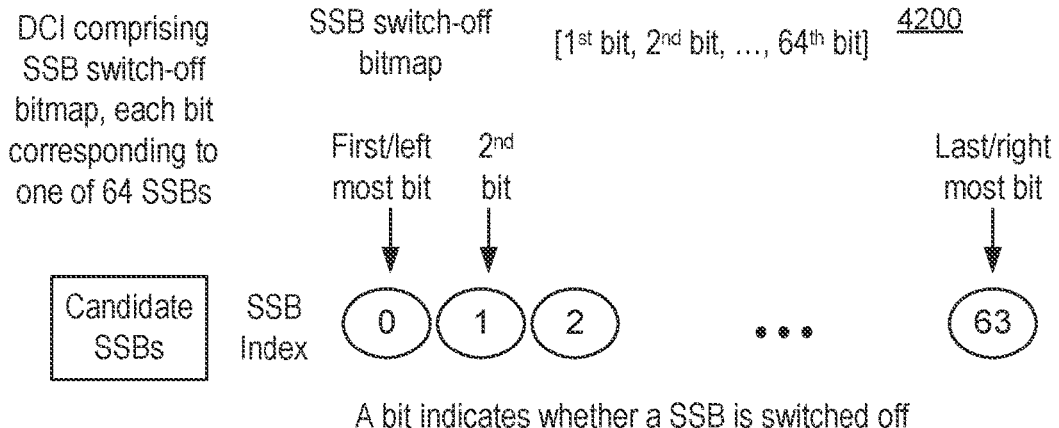
FIG. 42A and FIG. 42B show examples for indication of selective transmission of SSBs.
Figure 42B:
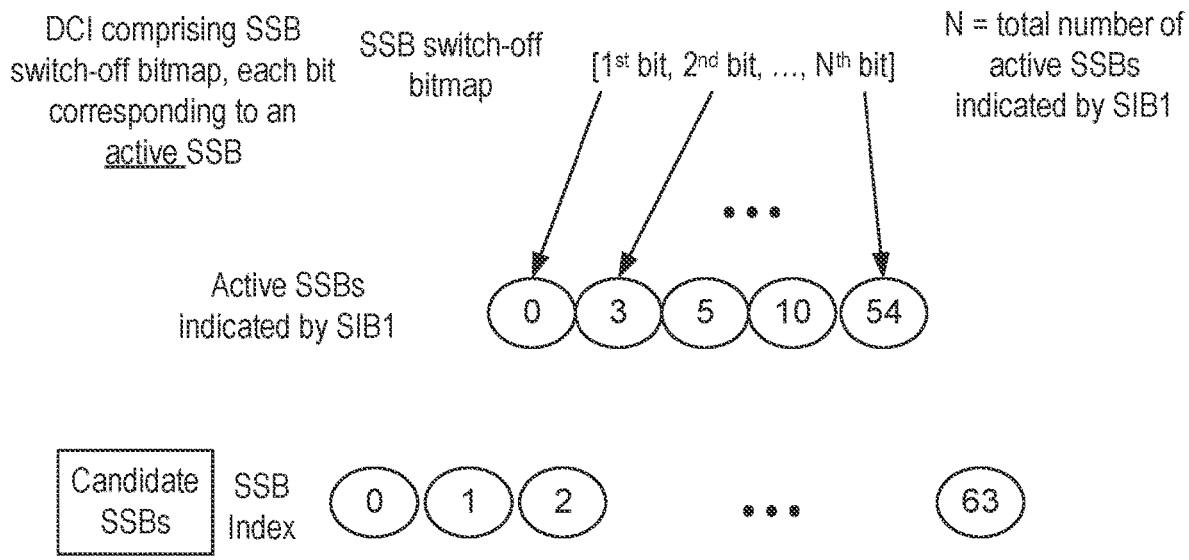

FIG. 42A and FIG. 42B show example indication of selective transmission of SSBs. FIG. 42A shows an example bitmap for selective transmission of SSBs. A base station may transmit, via a search space of the cell, DCI comprising an energy saving indication. The DCI may be implemented in accordance with examples as described with respect to FIGS. 41A-C. The DCI may comprise the bitmap (e.g., SSB switch-off bitmap, SSB OFF bitmap, SSB skipping indication bitmap, etc.) comprising a plurality of bits. Each bit, of the plurality of bits, may correspond to a respective SSB of a plurality of candidate SSBs. The plurality of candidate SSBs may be determined based on subcarrier spacing and/or carrier frequency of a cell. The plurality of candidate SSBs may be in accordance with various examples as described with respect to FIG. 35. A quantity of bits in the bitmap may be equal to the quantity of the plurality of candidate SSBs. For example, when SCS=15 kHz, fc<=3 GHz, a maximum quantity of the plurality of candidate SSBs may be 4 ($L_{max}$=4). The bitmap may have 4 bits, with each bit corresponding to a respective SSB of the at most 4 SSBs in a SSB burst, for example, if the maximum quantity of the plurality of candidate SSBs is 4. A maximum quantity of the plurality of candidate SSBs may be 8 (Lmax=8), for example, if SCS=30 kHz, 3 GHz<fc<=6 GHz. The bitmap may have 8 bits, with each bit corresponding to a respective SSB of the at most 8 SSBs in a SSB burst, for example, if the maximum quantity of the plurality of candidate SSBs is 8.

As shown in FIG. 42A, the bitmap may have 64 bits, for example, if $L_{max}$=64. Each bit of the bitmap may correspond to an SSB of 64 candidate SSBs in an SSB burst. A first (or left most) bit may correspond to SSB #0, a second bit may correspond to SSB #1, etc. A last (or right most) bit may correspond to SSB #63. A bit of the bitmap in the DCI may indicate whether the base station may transmit or skip transmitting a corresponding SSB, of the plurality of candidate SSBs, in an SSB burst. A bit, set to a first value (e.g., 1, or any other first value), may indicate that the base station may transmit a corresponding SSB in an SSB burst. The bit, set to a second value (e.g., 0, or any other second value different from the first value) may indicate that the base station may skip transmitting (and/or switch off a transmission of) the SSB in the SSB burst, or vice versa.

The base station may not be allowed to activate/turn on (e.g., by setting a corresponding bit to 1) a transmission of an SSB via DCI if the SSB is configured, by SIB1 message, to not be transmitted. An SSB may be configured, by SIB1 message, to not be transmitted in accordance with examples as described with respect to FIGS. 37-41. The base station may only be allowed to deactivate/switch off (e.g., by setting a corresponding bit to 0) a transmission of an SSB via the DCI if the SSB is configured, by SIB1 message, to be transmitted. An SSB may be configured, by SIB1 message, to be transmitted in accordance with examples as described with respect to FIGS. 37-41. The base station may ensure a bit (e.g., corresponding to an SSB), of the bitmap of the DCI, is not set to 1, for example, based on (e.g., in response to) SIB1 (e.g., comprising SSB location indication bitmaps as shown in FIG. 37) indicating that the SSB is not transmitted.

A wireless device may ignore a bit, of the bitmap of the DCI, that is set to 1 (e.g., indicating that a corresponding SSB is transmitted in an SSB burst), for example, based on SIB1 (e.g., comprising SSB location indication bitmaps as shown in FIG. 37) indicating that the SSB is not transmitted. The wireless device may determine that a bit, of the bitmap, is valid, for example, based on SIB1 (e.g., comprising SSB location indication bitmaps as shown in FIG. 37) indicating that the SSB corresponding to the bit is transmitted. The wireless device, based on the bit being valid, may determine whether an SSB corresponding to the bit is transmitted (or not transmitted) after receiving the DCI.

FIG. 42B shows an example bitmap for selective transmission of SSBs. A base station may transmit, via a search space of the cell, DCI comprising an energy saving indication. The DCI may be implemented in accordance with various examples as described with respect to FIGS. 38A-C, 39A-C, 40A-C, and 41A-C. The DCI may comprise a bitmap (e.g., SSB switch-off bitmap, SSB OFF bitmap, SSB skipping indication bitmap, etc.) comprising a plurality of bits. Each bit, of the bitmap, may correspond to an active SSB (e.g., among a plurality of candidate SSBs). The plurality of candidate SSBs may be determined based on subcarrier spacing and/or carrier frequency of a cell. A quantity of bits in the bitmap may be equal to a quantity of active SSBs.

The plurality of candidate SSBs may be in accordance with various examples as described with respect to FIG. 35. For example, a maximum quantity of the plurality of candidate SSBs may be 4 ($L_{max}$=4) if SCS=15 kHz, fc<=3 GHz. A maximum quantity of the plurality of candidate SSBs may be 8 ($L_{max}$=8), for example, if SCS=30 kHz, 3 GHz<fc<=6 GHz. As shown in FIG. 42B, a maximum quantity of the plurality of candidate SSBs may be 64 ($L_{max}$=64). The plurality of candidate SSBs may start from SSB indicator/index 0 and end at SSB indicator/index 63.

The base station may send/transmit a SIB1 message. The base station may send/transmit a SIB1 message, for example, before the transmitting the DCI. The DCI may indicate locations of one or more SSBs of the plurality of candidate SSBs in an SSB burst. The SIB1 message may be in accordance with examples as described herein (e.g., with respect to FIG. 25). An SSB, comprised in the SSB burst transmitted by the base station, indicated by groupPresence bitmap and inOneGroup bitmap in a SIB1 message, may be referred to as an active SSB. An SSB, not being comprised in the SSB burst, may be referred to as an inactive SSB. With respect to the example of FIG. 42B, a total quantity of active SSBs in an SSB burst may be 5 (e.g., SSB #0, SSB #3, SSB #5, SSB #10 and SSB #54).

The bitmap may have 5 bits, for example, based on the total quantity of active SSBs in an SSB burst being 5. Each bit of the bitmap may correspond to an SSB of the active SSBs (e.g., SSB #0, SSB #3, SSB #5, SSB #10 and SSB #54) in the SSB burst. A first (or left most bit) of the bitmap may correspond to SSB #0, a second bit may correspond to SSB #3, etc. The last (or right most bit) may correspond to SSB #54. A bit of the bitmap in the DCI may indicate whether the base station transmits or skip transmitting a corresponding active SSB. A bit, set to a first value (e.g., 1, or any other first value), may indicate that the base station may send/transmit a corresponding active SSB in an SSB burst. A bit set to a second value (e.g., 0, or any other second value different from the first value) may indicate that the base station may skip transmitting (and/or switch off a transmission of) the SSB in the SSB burst. The bitmap of the DCI of FIG. 42B may comprise a smaller number of bits than the bitmap of FIG. 42A. A total quantity of the bits of the bitmap in FIG. 42A may correspond to a total quantity of active SSBs in an SSB burst (and not a total quantity of candidate SSBs as predefined for an SSB burst). The bitmap corresponding to FIG. 42B may further reduce signaling overhead of the DCI for indicating SSB skipping/switching-off. The bitmap corresponding to FIG. 42A may be advantageous for blind decoding of a wireless device, because the quantity of bits of the bitmap may be fixed to a predefined quantity (e.g., based on SCS and carrier frequency).

The cell may be configured with multiple BWPs. A base station may transition from the non-energy-saving state to an energy saving state, for example, based on transmitting the DCI. The transitioning from the non-energy-saving state to the energy saving state may comprise switching an active BWP from a first active BWP to a second BWP of the cell. The cell may comprise a plurality of BWPs. The base station may transmit SSBs via the first active BWP in the non-energy-saving state and via the second BWP in the energy saving state (e.g., as described with respect to FIGS. 38A-C and/or 39A-C).

Figure 43:
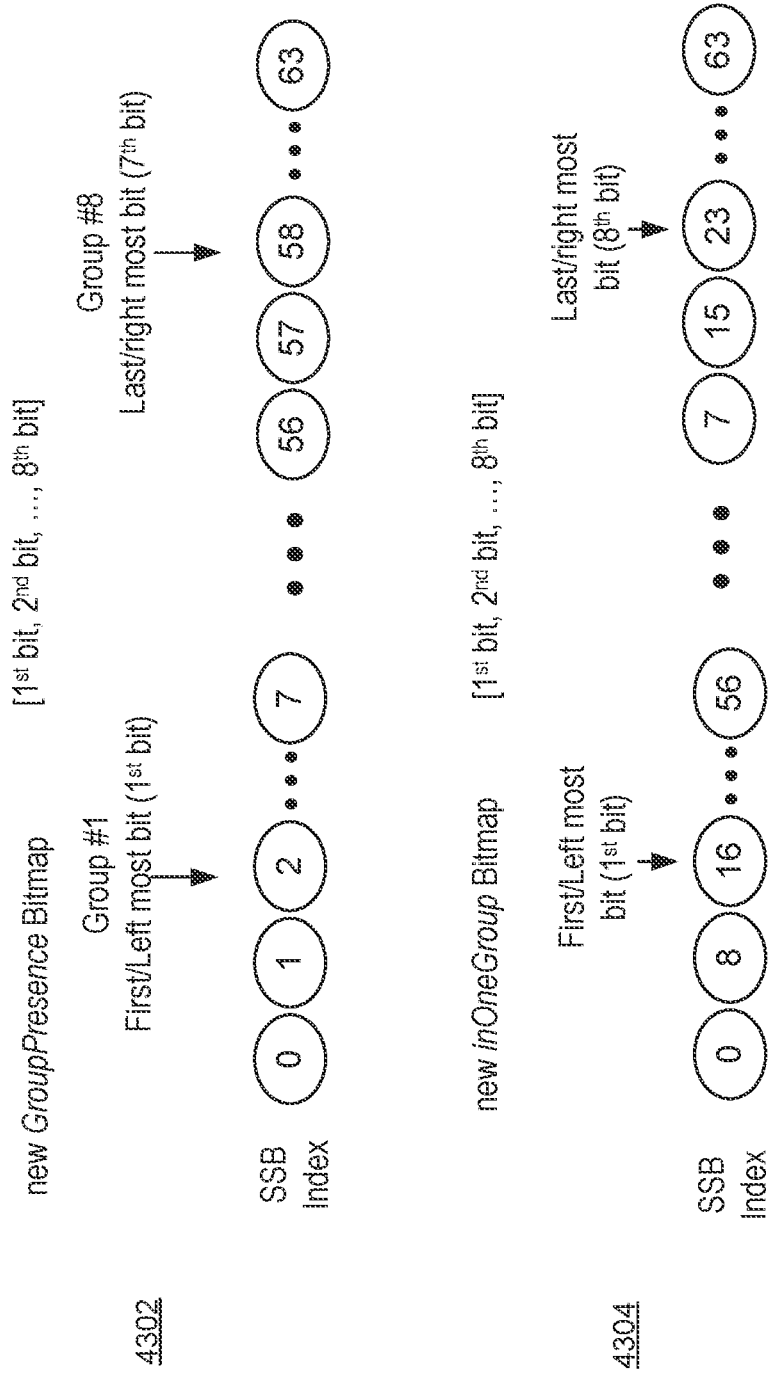
FIG. 43 shows an example indication of selective transmission of SSB.

FIG. 43 shows an example indication of selective transmission of SSB. A base station may transmit, via a search space of the cell, DCI comprising an energy saving indication. The DCI may be in accordance with various examples described herein (e.g., with respect to FIG. 38A-C, FIG. 39A-C, FIG. 40A-C and/or FIG. 41A-C).

The DCI may comprise two bitmaps comprising a first bitmap 4302 (e.g., a new GroupPresence bitmap) and a second bitmap 4304 (e.g., a new inOneGroup bitmap). The first bitmap 4302 may have a same structure (e.g., a quantity of bits) as the GroupPresence bitmap configured in SIB1 (e.g., as shown in FIG. 37). The second bitmap 4304 may have a same structure (e.g., a quantity of bits) of the inOneGroup bitmap configured in SIB1 (e.g., as shown in FIG. 37). The first bitmap 4302 and the second bitmap 4304, in the DCI, may jointly indicate whether an SSB, of a plurality of candidate SSBs, is transmitted in an SSB burst.

With respect to the example of FIG. 43, a maximum quantity of a plurality of candidate SSBs in an SSB burst may be 64. This is merely exemplary and the maximum quantity may be any other value (e.g., and may be determined as described with respect to FIG. 35). The first bitmap 4302 (e.g., new GroupPresence bitmap) may comprise a first quantity of bits (e.g., 8, or any other first quantity). Each bit of the first bitmap 4302 may correspond to a respective group of first SSB groups (e.g., comprising a plurality of candidate SSBs in an SSB burst). A first bit (e.g., left most bit of the first bitmap 4302) may correspond to a first SSB group. The first SSB group may comprise $1^{st}$ SSB (with SSB index 0), $2^{nd}$ SSB (with SSB index 1), . . . and $8^{th}$ SSB (with SSB index 7). A second bit (e.g., the second bit of the first bitmap 4302) may correspond to a second SSB group. The second SSB group may comprise $9^{th}$ SSB (with SSB index 8), $10^{th}$ SSB (with SSB index 9), . . . and 16th SSB (with SSB index 15). A last bit (e.g., right most bit of the first bitmap 4302) may correspond to an eighth SSB group. The eighth SSB group may comprise $57^{th}$ SSB (with SSB index 56), $58^{th}$ SSB (with SSB index 57, . . . and $64^{th}$ SSB (with SSB index 63), etc. An SSB may belong/correspond to at most one SSB group of the first SSB groups. A bit, of the first bitmap 4302, may indicate whether the base station transmits an SSB group, corresponding to the bit, in a SSB burst. The bit being set to a first value (e.g., 1, or any other value) may indicate that the corresponding SSB group is transmitted in the SSB burst by the base station. The bit setting to a second value (e.g., 0, or any other value different from the first value) may indicate that the corresponding SSB group is not transmitted in the SSB burst by the base station, or vice versa.

The second bitmap 4304 (e.g., new inOneGroup) may comprise a second quantity of bits (e.g., 8, or any other quantity). Each bit of the second bitmap may correspond to a respective group of second SSB groups (e.g., comprising a plurality of candidate SSBs in an SSB burst). A first bit (e.g., left most bit of the second bitmap 4304) may correspond to a first SSB group comprising $1^{st}$ SSB (with SSB index 0), $2^{nd}$ SSB (with SSB index 8), . . . and $8^{th}$ SSB (with SSB index 56). A second bit (e.g., the second bit of the second bitmap 4304) may correspond to a second SSB group comprising $1^{st}$ SSB (with SSB index 1), $2^{nd}$ SSB (with SSB index 9), . . . and $8^{th}$ SSB (with SSB index 57). A last bit (e.g., right most bit of the second bitmap 4304) may correspond to an $8^{th}$ SSB group comprising $1^{st}$ SSB (with SSB index 7), $2^{nd}$ SSB (with SSB index 15, . . . and $8^{th}$ SSB (with SSB index 63), etc. An SSB may belong/correspond to at most one SSB group of the second SSB groups. A bit, of the second bitmap 4304, may indicate whether the base station may transmit an SSB group, corresponding to the bit, in an SSB burst. The bit being set to a first value (e.g., 1, or any other first value) may indicate that the corresponding SSB group is transmitted in the SSB burst by the base station. The bit being set to a second value (e.g., 0, or any other second value different from the first value) may indicate that the corresponding SSB group is not transmitted in the SSB burst by the base station, or vice versa.

A base station may send/transmit a plurality of SSBs in a first SSB burst, for example, based on a first GroupPresence bitmap and a first inOneGroup bitmap configured by SIB1 message. The base station may transmit one or more SSBs, of the plurality of SSBs, in a second SSB burst, for example, based on a second GroupPresence bitmap and a second inOneGroup bitmap comprised in a DCI.

The cell may be configured with multiple BWPs. A base station may transition from the non-energy-saving state to an energy saving state, for example, based on transmitting the DCI. The transitioning from the non-energy-saving state to the energy saving state may comprise switching an active BWP from a first active BWP to a second BWP of the cell. The cell may comprise a plurality of BWPs. The base station may transmit SSBs via the first active BWP in the non-energy-saving state and via the second BWP in the energy saving state (e.g., as described with respect to FIGS. 38A-C and 39A-C).

FIG. 44 shows an example indication of selective transmission of SSB. The example indication may correspond to the bitmaps as described with respect to FIG. 43. A base station may send/transmit a SIB message (e.g., SIB1 message) comprising a first bitmap (e.g., GroupPresence: {1 0 1 0 0 0 0 0}) and a second bitmap (e.g., inOneGroup: {1 1 0 0 0 0 0 0}). The base station may transmit SSBs (SSB #0, SSB #1, SSB #16 and SSB #17) in an SSB burst with/using a transmission periodicity, for example, based on the first bitmap and the second bitmap (e.g., in accordance with the examples as described with respect to FIG. 37). SSB #0, SSB #1, SSB #16 and SSB #17 may be referred to as active SSBs.

The base station may send/transmit DCI comprising two bitmaps (e.g., a new GroupPresence bitmap and a new inOneGroup bitmap). The DCI may indicate an energy saving indication (e.g., as described with respect to FIGS. 38-41).

The new GroupPresence bitmap in the DCI may select one or more SSB groups, from a plurality of SSB groups, to transmit in a SSB burst. For example, the $1^{st}$ SSB group with SSB indexes from 0 to 7 may be selected from the $1^{st}$ SSB group and $3^{rd}$ SSB group as configured by SIB1 message if the new GroupPresence bitmap is set to {1 0 0 0 0 0 0 0}.

The new inOneGroup bitmap in the DCI may select one or more SSB groups, from a plurality of SSB groups, to transmit in a SSB burst. The $1^{st}$ SSB group with SSB indexes {, 8, 16, . . . , 56} may be selected from the $1^{st}$ SSB group and $3^{rd}$ SSB group as configured by SIB1 message, for example, if the new inOneGroup bitmap is set to {1 0 0 0 0 0 0 0}. As shown in FIG. 44, SSB #1, SSB #16 and SSB #17, configured by SIB1, may be skipped from transmission. The base station may transmit SSB #0 in an SSB burst. The base station may skip transmission of SSB #1, SSB #16 and SSB #17, in addition to other SSBs that are configured, by SIB1, to not be transmitted in the SSB burst.

The base station may switch off (and/or skip) transmission of one or more active SSBs in an SSB burst using the DCI. The base station may not be allowed to switch on or transmit an inactive SSB using the DCI. An SSB group, indicated not to be transmitted by SIB1 message, is not allowed to be indicated as an active SSB group by the DCI. For example, if SIB1 indicates that $1^{st}$ SSB group (SSB #0~SSB #7) and $3^{rd}$ SSB group (SSB #16~SSB #23) are active by GroupPresence bitmap with {1 0 1 0 0 0 0 0}, the first bitmap of the DCI may only change one or more of $1^{st}$ SSB group and $3^{rd}$ SSB group to inactive (power off, skip transmission, etc.). Similarly, if SIB1 indicates SSB group 1 (SSB #0, 8, 16 . . . 56) and SSB group 2 (SSB #1,9, 17 . . . , 57) as active SSB groups, the second bitmap of the DCI may only change one or more of SSB group 1 and SSB group 2 to become inactive SSB groups.

A base station may transmit a DCI to dynamically reduce a transmission of a number of SSBs in a burst for energy saving (e.g., as described with respect to FIGS. 43 and 44). DCI signaling (e.g., as described with respect to FIG. 43 and FIG. 44) may be further combined with the various procedures and examples described herein (e.g., with respect to FIG. 38A-C, FIG. 39A-C, FIG. 40A-C and/or FIG. 41A-C) to dynamically adjust a transmission periodicity and a quantity of SSBs in an SSB burst. Examples as described herein may align a base station and a wireless device regarding SSB transmission adjustment for energy saving. Various examples as described herein may reduce power consumption of a base station and/or a wireless device.

Exemplary operations as described with respect to FIGS. 38A-C, 39A-C, 40A-C, 41A-C, 42A, 42B, 43, and 44 may be applied for other types of transmissions (e.g., periodic CSI-RS transmission). A CSI-RS transmission may be implemented as described with respect to FIG. 11B. A base station may send/transmit one or more CSI-RSs with/using a first periodicity based on one or more RRC messages. The one or more RRC messages may configure parameters of the one or more CSI-RS. The base station may transmit DCI indicating an energy saving indication for the base station (e.g., as described with respect to FIGS. 38A-C, 39A-C, 40A-C, 41A-C, 42A, 42B, 43, and 44). The base station may transmit a subset of the one or more CSI-RSs with a second periodicity based on the DCI.

The cell may be configured with multiple BWPs. A base station may transition from the non-energy-saving state to an energy saving state, for example, based on transmitting the DCI. The transitioning from the non-energy-saving state to the energy saving state may comprise switching an active BWP from a first active BWP to a second BWP of the cell. The cell may comprise a plurality of BWPs. The base station may transmit SSBs via the first active BWP in the non-energy-saving state and via the second BWP in the energy saving state (e.g., as described with respect to FIGS. 38A-C and/or FIGS. 39A-C).

A base station may send/transmit, to a wireless device (or a group of wireless devices), a SIB1 message. The SIB1 message may comprise: a search space for DCI for an energy saving indication, and first parameters of an SSB burst. The first parameters may indicate a first transmission periodicity of the SSB burst and a plurality of SSBs in the SSB burst. The base station may transmit, via a cell, the plurality of SSBs in a first SSB burst with/using the first transmission periodicity. The base station may transmit, via the search space, the DCI comprising the energy saving indication. The DCI may indicate second parameters of the SSB burst. The second parameters may indicate: a second transmission periodicity of the SSB burst, and one or more SSBs from the plurality of SSBs. The base station may transmit, based on the DCI and via the cell, the one or more SSBs in a second SSB burst with/using the second transmission periodicity.

A base station may send/transmit, to a wireless device (or a group of wireless devices), RRC messages. The RRC messages may comprise first parameters of SSBs of a SSB burst. The first parameters may indicate: a first transmission periodicity of the SSB burst, and first transmission locations of the SSBs in the SSB burst. The base station may send/transmit the SSBs in a first SSB burst with/using the first transmission periodicity. The base station may send/transmit DCI comprising an energy saving indication. The energy saving indication may indicate: a second transmission periodicity of a second SSB burst, and second transmission locations of one or more SSBs of the SSBs. The base station may send/transmit, based on the DCI, the one or more SSBs in the second SSB burst with/using the second transmission periodicity.

A base station may send/transmit, to a wireless device (or a group of wireless devices), RRC messages comprising first parameters of SSBs of a SSB burst in a cell. The base station may send/transmit the SSBs in a first SSB burst with/using a first transmission periodicity. The base station may send/transmit DCI comprising an energy saving indication. The base station may send/transmit, in response to the transmitting the DCI, one or more SSBs of the SSBs in a second SSB burst with/using a second transmission periodicity and on the cell.

The base station may skip a transmission of at least one of the SSBs in the second SSB burst. The at least one of the SSBs may not be comprised in the one or more SSBs. The second transmission periodicity may be higher than the first transmission periodicity. A total quantity of the one or more SSBs may be smaller than a total quantity of the SSBs. The first parameters may indicate: the first SSB burst comprising the SSBs transmitted with/using the first transmission periodicity, and the second SSB burst comprising the one or more SSBs transmitted with/using the second transmission periodicity.

The DCI may be different from at least one of: DCI format 2_0 (e.g., for indication of slot format, available RB sets, COT duration and search space set group switching), DCI format 2_1 (e.g., for indication of downlink pre-emption), DCI format 2_4 (e.g., for indication of uplink cancellation), and DCI format 2_6 (e.g., for indication of power saving information outside DRX active time for one or more wireless devices). The DCI may have a same DCI size as at least one of: DCI format 2_0, DCI format 2_1, DCI format 2_4 and DCI format 2_6.

The base station may send/transmit each of the SSBs with/using the first transmission periodicity. The sending/transmitting the SSBs may comprise sending/transmitting a first SSB of the SSBs with a first transmission beam and transmitting a second SSB of the SSBs with/using a second transmission beam.

The base station may send/transmit the DCI via a second cell. The second cell may be a primary cell. The cell may be a secondary cell. The base station may send/transmit the DCI via the cell. The cell may be a primary cell of a plurality of cells comprising one or more secondary cells.

The base station may send/transmit, after the transmitting the DCI, a second RRC message. The second RRC message may comprise second parameters of the SSBs of the SSB burst in the cell. The base station may send/transmit, based on the second RRC message, the SSBs in a third SSB burst in the cell.

The base station may receive, from a wireless device, wireless device assistance information indicating a transition of the base station from a non-energy-saving state to an energy saving state. The base station may send/transmit the DCI based on receiving the wireless device assistance information.

The wireless device assistance information may be a second RRC message transmitted from the wireless device to the base station. The wireless device assistance information may be UCI sent/transmitted via a physical uplink channel to the base station. The wireless device assistance information may be a MAC CE transmitted from the wireless device to the base station.

The RRC messages may comprise a SIB1 message. The SIB1 message may comprise configuration parameters of a cell. The configuration parameters may comprise the first parameters. The first parameters may comprise the first transmission periodicity. The first parameters may comprise a first bitmap. Each bit of the bitmap may correspond to a respective first SSB group, of first SSB groups, and may indicate whether the first SSB group is transmitted in the SSB burst. The first parameters may comprise a second bitmap. Each bit may correspond to a respective SSB second group, of second SSB groups, and may indicate whether the second SSB group is transmitted in the SSB burst.

A plurality of SSBs, each SSB being associated with a corresponding SSB index, may grouped into the first SSB groups. Each SSB group, of the first SSB groups, may comprise one or more SSBs with continuous SSB indexes. The plurality of SSBs may be predefined at the base station and a wireless device. An SSB of the plurality of SSBs may belong to at most one SSB group of the first SSB groups. The plurality of SSBs may be grouped into the second SSB groups. Each SSB group, of the second SSB groups, may comprise one or more SSBs with non-contiguous SSB indexes. An SSB of the plurality of SSBs may belong to at most one SSB group of the second SSB groups. The base station may send/transmit an SSB, of the plurality of SSBs, based on: a first bit, of the first bitmap, corresponding to a first SSB group (comprising the SSB) of the first SSB groups, being set to a first value, and a second bit, of the second bitmap, corresponding to a second SSB group (comprising the SSB) of the second SSB groups, being set to the first value.

The base station may send/transmit the SSBs with/using the first transmission periodicity based on the base station being in a non-energy-saving state. The non-energy-saving state may comprise a time duration during which the base station may transmit downlink signals (e.g., with/using a first transmission power and a first quantity of beams) and may receive uplink signals. The downlink signals may comprise at least one of: one or more SSBs, SIBs, a PDSCH transmission, a PDCCH transmission, a CSI-RS, and/or a DM-RS. The uplink signals comprise at least one of: CSI reports, a PUSCH transmission, a PUCCH transmission, a SRS, and/or a RACH transmission.

The energy saving indication may indicate a transition of the base station from the non-energy-saving state to an energy saving state. The energy saving state may comprise a second time duration during which the base station may transmit the downlink signals with/using a second transmission power. The second transmission power may be less than the first transmission power. The energy saving state may comprise a second time duration during which the base station may transmit the downlink signals with/using a second quantity of beams. The second quantity may be smaller than the first quantity. The energy saving state may comprise a second time duration during which the base station may stop receiving uplink signals.

The base station may transition from the non-energy-saving state to the energy saving state based on the transmitting the DCI. The base station may transition the cell from the non-energy-saving state to the energy saving state based on the transmitting the DCI.

The RRC messages may comprise configuration parameters of a search space. The search space may be for transmitting the DCI comprising the energy saving indication. The search space may be a type 0 common search space. The configuration parameters may be comprised in a MIB message. The base station may send/transmit the MIB message via a PBCH indicating system information of the base station.

The search space may be a type 0 common search space. The configuration parameters may be comprised in a SIB1 message. The base station may transmit the SIB1 message, scheduled by a PDCCH, indicating at least one of: information for evaluating if a wireless device is allowed to access a cell of the base station, information for scheduling of other system information, radio resource configuration information that is common for all wireless devices, and/or barring information applied to access control.

The search space may be a type 2 common search space. The type 2 common search space may be further used for downlink paging message transmission.

The search space may be a type 3 common search space. The type 3 common search space may be further used for transmission, via a cell, of second group-common DCI with CRC bits scrambled by at least one of: INT-RNTI, SFI-RNTI, CI-RNTI, TPC-PUSCH-RNTI, TPC-PUCCH-RNTI, and TPC-SRS-RNTI. The type 3 common search space may be further used for transmission of a second group-common DCI (e.g., with CRC bits scrambled by at least one of: PS-RNTI, C-RNTI, MCS-C-RNTI, and CS-RNTI), for example, based on the cell being a primary cell of a plurality of cells of the base station.

The configuration parameters may comprise an RNTI for transmission of the DCI comprising the energy saving indication. The DCI may be a group common DCI. The base station may transmit the DCI based on CRC bits of the DCI being scrambled by the RNTI.

The DCI may have a same DCI format as DCI format 1_0. The RNTI associated with the DCI may be different from a C-RNTI identifying a specific wireless device. The DCI may have a same DCI format as at least one of: DCI format 2_0 (e.g., for indication of slot format, available RB sets, COT duration and search space set group switching), DCI format 2_1 (e.g., for indication of downlink pre-emption), DCI format 2_4 (e.g., for indication of uplink cancellation), and DCI format 2_6 (e.g., for indication of power saving information outside DRX Active time for one or more wireless devices). The RNTI associated with the DCI may be different from: a slot format indication RNTI (SFI-RNTI) associated with the DCI format 2_0, an interruption RNTI (INT_RNTI) associated with DCI format 2_1, a cancellation RNTI (CI-RNTI) associated with the DCI format 2_4, and/or a power saving RNTI (PS-RNTI) associated with the DCI format 2_6.

The configuration parameters may comprise a PDCCH monitoring periodicity value for the search space. The PDCCH monitoring periodicity value indicates a quantity of slots between two contiguous transmissions of two DCIs for the energy saving indication. The base station may transmit the DCI at a beginning/starting slot of the quantity of slots.

The DCI may comprise a DCI field indicating the second transmission periodicity. The DCI field may indicate a ratio between the second transmission periodicity and the first transmission periodicity.

The DCI may comprise a bitmap for the SSBs. Each bit of the bitmap, corresponding to a respective SSB of the SSBs in the first SSB burst, may indicate whether the base station may stop a transmission of the respective SSB in the second SSB burst. A bit of the bitmap, being set to a first value, may indicate that the base station may transmit a corresponding SSB in the second SSB burst. A bit of the bitmap, being set to a second value, may indicate that the base station may skip the transmission of a corresponding SSB in the second SSB burst. Each of the one or more SSBs may be associated with a corresponding bit, of the bitmap, indicating that the base station may transmit the SSB in the second SSB burst. The one or more SSBs may not comprise an SSB, of the SSBs, with a corresponding bit, of the bitmap, indicating that the base station skips the transmission of the SSB in the second SSB burst.

A wireless device may receive, from a base station, RRC messages. The RRC messages may comprise first parameters of SSBs of an SSB burst. The wireless device may receive the SSBs in a first SSB burst with/using a first transmission periodicity. The wireless device may receive DCI comprising an energy saving indication. The wireless device may receive, based on the receiving the DCI, one or more SSBs, of the SSBs, in a second SSB burst with/using a second transmission periodicity.

A base station may perform a method comprising multiple operations. The base station may transmit a configuration message. The configuration message may comprise a search space for downlink control information (DCI) associated with an energy saving indication; and first parameters. The first parameters may indicate a first transmission periodicity associated with SSB burst; and a plurality of SSBs in at least one SSB burst. The base station may transmit a first SSB burst comprising the plurality of SSBs and using the first transmission periodicity. The base station may transmit, via the search space, DCI comprising second parameters. The second parameters may indicate: a second transmission periodicity associated with SSB burst; and one or more SSBs of the plurality of SSBs. The base station may transmit, based on the DCI, a second SSB burst comprising the one or more SSBs and using the second transmission periodicity. The base station may also perform one or more additional operations. The transmitting the DCI may be based on receiving, from a wireless device, an indication of data volume. The base station may skip a configured transmission, in the second SSB burst, of at least one of the plurality of SSBs. The second transmission periodicity may be greater than the first transmission periodicity. A total quantity of the one or more SSBs may be less than a total quantity of the plurality of SSBs. The transmitting the DCI may be based on receiving wireless device assistance information indicating a transition from a non-energy-saving state to an energy saving state. The configuration message may comprise at least one of: a radio resource control (RRC) message, or a system information block (SIB). The DCI may comprise an indication of a reduced power mode in which the base station performs less frequent transmission of the configuration message. The DCI may comprise a bitmap for the SSBs. Each bit of the bitmap, corresponding to a respective SSB transmitted in the first SSB burst, may indicate whether the base station may transmit the respective SSB in the second SSB burst. The transmitting the first SSB burst may comprise transmitting the first SSB burst in a non-energy-saving state. The transmitting the second SSB burst may comprise transmitting the second SSB burst in an energy-saving state. The transmitting the first SSB burst may comprise transmitting the first SSB burst using a first quantity of beams. The transmitting the second SSB burst may comprise transmitting the second SSB burst using a second quantity of beams. The transmitting the first SSB burst may comprise transmitting the first SSB burst using a first transmission power. The transmitting the second SSB burst may comprise transmitting the second SSB burst using a second transmission power lower than the first transmission power. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to receive at least one of the first SSB burst or the second SSB burst. A computer-readable medium may store instructions that, when executed, cause performance of the described method, additional operations and/or include the additional elements.

A base station may perform a method comprising multiple operations. The base station may transmit a first synchronization signal block (SSB) burst comprising a plurality of SSBs and using a first transmission periodicity. The base station may receive, from a wireless device, an indication of data volume. The base station may transmit, based on the data volume, downlink control information (DCI) comprising first parameters. The first parameters may indicate: a second transmission periodicity for an energy saving state of the base station; and one or more SSBs of the plurality of SSBs. The second transmission periodicity may be greater than the first transmission periodicity. The base station may transmit, based on the DCI, a second SSB burst comprising the one or more SSBs and using the second transmission periodicity. The base station may also perform one or more additional operations. The base station may transmit a configuration message comprising: a search space for DCI; and second parameters. The second parameters may indicate: the first transmission periodicity; and the plurality of SSBs. The transmitting the DCI may comprise transmitting the DCI via the search space. A total quantity of the one or more SSBs may be less than a total quantity of the plurality of SSBs. The base station may skip a configured transmission, in the second SSB burst, of at least one of the plurality of SSBs. The transmitting the DCI may be based on receiving wireless device assistance information indicating a transition from a non-energy-saving state to an energy saving state. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to receive at least one of the first SSB burst or the second SSB burst. A computer-readable medium may store instructions that, when executed, cause performance of the described method, additional operations and/or include the additional elements.

A wireless device may perform a method comprising multiple operations. The wireless device may receive a configuration message comprising: a search space for downlink control information (DCI) associated with an energy saving indication; and first parameters. The first parameters may indicate: a first transmission periodicity associated with SSB burst; and a plurality of SSBs in at least one SSB burst. The wireless device may receive a first SSB burst comprising the plurality of SSBs and using the first transmission periodicity. The wireless device may receive, via the search space, DCI comprising second parameters. The second parameters may indicate: a second transmission periodicity associated with SSB burst; and one or more SSBs of the plurality of SSBs. The wireless device may receive, based on the DCI, a second SSB burst comprising the one or more SSBs and using the second transmission periodicity. The wireless device may also perform one or more additional operations. The wireless device may transmit an indication of data volume. The receiving the DCI may comprise receiving the DCI after transmitting the indication of data volume. The second transmission periodicity may be greater than the first transmission periodicity. A total quantity of the one or more SSBs may be less than a total quantity of the plurality of SSBs. The wireless device may transmit wireless device assistance information indicating a transition from a non-energy-saving state to an energy saving state. The receiving the DCI may comprise receiving the DCI after transmitting the wireless device assistance information. The configuration message may comprise at least one of: a radio resource control (RRC) message, or a system information block (SIB). The DCI may comprise an indication of a reduced power mode in which a base station performs less frequent transmission of the configuration message. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to transmit at least one of the first SSB burst or the second SSB burst. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    transmitting, by a base station, a configuration message comprising:
        a search space for downlink control information (DCI) associated with an energy saving indication; and
        first parameters indicating:
            first transmission periodicity associated with synchronization signal block (SSB) burst; and
            a plurality of SSBs in at least one SSB burst;
    transmitting a first SSB burst comprising the plurality of SSBs and using the first transmission periodicity;
    transmitting, via the search space, DCI comprising second parameters indicating:
        second transmission periodicity associated with SSB burst; and
        one or more SSBs of the plurality of SSBs; and
    transmitting, based on the DCI, a second SSB burst comprising the one or more SSBs and using the second transmission periodicity.

2. The method of claim 1, wherein the transmitting the DCI is based on receiving, from a wireless device, an indication of data volume.

3. The method of claim 1, further comprising skipping a configured transmission, in the second SSB burst, of at least one of the plurality of SSBs.

4. The method of claim 1, wherein the second transmission periodicity is greater than the first transmission periodicity.

5. The method of claim 1, wherein a total quantity of the one or more SSBs is less than a total quantity of the plurality of SSBs.

6. The method of claim 1, wherein the transmitting the DCI is based on receiving wireless device assistance information indicating a transition from a non-energy-saving state to an energy saving state.

7. The method of claim 1, wherein the configuration message comprises at least one of: a radio resource control (RRC) message, or a system information block (SIB).

8. The method of claim 1, wherein the DCI comprises an indication of a reduced power mode in which the base station performs less frequent transmission of the configuration message.

9. A method comprising:
    transmitting, by a base station, a first synchronization signal block (SSB) burst comprising a plurality of SSBs and using a first transmission periodicity;
    receiving, from a wireless device, an indication of data volume;
    transmitting, based on the data volume, downlink control information (DCI) comprising first parameters indicating:
        a second transmission periodicity for an energy saving state of the base station, wherein the second transmission periodicity is greater than the first transmission periodicity; and
        one or more SSBs of the plurality of SSBs; and
    transmitting, based on the DCI, a second SSB burst comprising the one or more SSBs and using the second transmission periodicity.

10. The method of claim 9, further comprising:
    transmitting a configuration message comprising:
        a search space for DCI; and
        second parameters indicating:
            the first transmission periodicity; and
            the plurality of SSBs,
    wherein the transmitting the DCI comprises transmitting the DCI via the search space.

11. The method of claim 9, wherein a total quantity of the one or more SSBs is less than a total quantity of the plurality of SSBs.

12. The method of claim 9, further comprising skipping a configured transmission, in the second SSB burst, of at least one of the plurality of SSBs.

13. The method of claim 9, wherein the transmitting the DCI is based on receiving wireless device assistance information indicating a transition from a non-energy-saving state to an energy saving state.

14. A method comprising:
    receiving, by a wireless device, a configuration message comprising:
        a search space for downlink control information (DCI) associated with an energy saving indication; and
        first parameters indicating:
            first transmission periodicity associated with synchronization signal block (SSB) burst; and
            a plurality of SSBs in at least one SSB burst;
    receiving a first SSB burst comprising the plurality of SSBs and using the first transmission periodicity;
    receiving, via the search space, DCI comprising second parameters indicating:
        second transmission periodicity associated with SSB burst; and
        one or more SSBs of the plurality of SSBs; and
    receiving, based on the DCI, a second SSB burst comprising the one or more SSBs and using the second transmission periodicity.

15. The method of claim 14, further comprising transmitting an indication of data volume, wherein the receiving the DCI comprises receiving the DCI after transmitting the indication of data volume.

16. The method of claim 14, wherein the second transmission periodicity is greater than the first transmission periodicity.

17. The method of claim 14, wherein a total quantity of the one or more SSBs is less than a total quantity of the plurality of SSBs.

18. The method of claim 14, further comprising transmitting wireless device assistance information indicating a transition from a non-energy-saving state to an energy saving state, wherein the receiving the DCI comprises receiving the DCI after transmitting the wireless device assistance information.

19. The method of claim 14, wherein the configuration message comprises at least one of: a radio resource control (RRC) message, or a system information block (SIB).

20. The method of claim 14, wherein the DCI comprises an indication of a reduced power mode in which a base station performs less frequent transmission of the configuration message.

* * * * *